United States Patent
Zheng et al.

(10) Patent No.: US 12,495,292 B2
(45) Date of Patent: Dec. 9, 2025

(54) INFORMATION SENDING AND RECEIVING METHOD, APPARATUS, AND SYSTEM

(71) Applicant: HUAWEI TECHNOLOGIES CO., LTD., Shenzhen (CN)

(72) Inventors: Juan Zheng, Beijing (CN); Chaojun Li, Beijing (CN); Hailong Hou, Beijing (CN); Yongqiang Fei, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 373 days.

(21) Appl. No.: 17/986,313

(22) Filed: Nov. 14, 2022

(65) Prior Publication Data

US 2023/0087902 A1    Mar. 23, 2023

Related U.S. Application Data

(63) Continuation of application No. PCT/CN2021/093965, filed on May 14, 2021.

(30) Foreign Application Priority Data

May 15, 2020  (CN) .......................... 202010415293.5
Aug. 7, 2020   (CN) .......................... 202010791135.X

(51) Int. Cl.
   *H04W 8/22*    (2009.01)
   *H04W 52/02*   (2009.01)
(52) U.S. Cl.
   CPC ......... *H04W 8/22* (2013.01); *H04W 52/0235* (2013.01)
(58) Field of Classification Search
   CPC ...... H04W 8/22; H04W 52/0235; H04W 8/24
   See application file for complete search history.

(56) References Cited

U.S. PATENT DOCUMENTS 11,877,226 B2 *  1/2024  Koskinen .............. H04W 12/06
2019/0215119 A1  7/2019  Kim et al.
(Continued)

FOREIGN PATENT DOCUMENTS

CN   101489218 A   7/2009
CN   110035426 A   7/2019
(Continued)

OTHER PUBLICATIONS

Chinese Office Action issued in corresponding Chinese Application No. 202010791135.X, dated May 18, 2024, pp. 1-6.
(Continued)

*Primary Examiner* — Mounir Moutaouakil
(74) *Attorney, Agent, or Firm* — HAUPTMAN HAM, LLP

(57) ABSTRACT

A communication method and apparatus to reduce a waiting latency in a retransmission process. A terminal device receives a first PDSCH from a network device. In response to failing to decode data carried on the first PDSCH, the terminal device sends an SRS to the network device on a first time-frequency resource. In response to the network device not receiving feedback information of the first PDSCH, or receiving feedback information of the first PDSCH that is a NACK, the network device retransmits the first PDSCH based on a result of measuring the SRS. After determining that the first PDSCH fails to be decoded, the terminal device directly sends the SRS to the network device by using the first time-frequency resource.

18 Claims, 3 Drawing Sheets

(56) References Cited

U.S. PATENT DOCUMENTS

| | | | |
|---|---|---|---|
| 2023/0071926 A1* | 3/2023 | Liu | H04W 24/02 |
| 2023/0198705 A1* | 6/2023 | Almquist | H04L 5/0016 370/330 |

FOREIGN PATENT DOCUMENTS

| | | | |
|---|---|---|---|
| CN | 110557749 A | 12/2019 | |
| CN | 110730480 A | 1/2020 | |
| CN | 110786030 A | 2/2020 | |
| CN | 112242893 A | 1/2021 | |
| EP | 3917185 A1 * | 12/2021 | H04B 7/0417 |
| WO | 2019237303 A1 | 12/2019 | |

OTHER PUBLICATIONS

Ericsson, Summary of email discussion on NR-Light. 3GPP TSG RAN Meeting #85, Newport Beach, US, Sep. 16-19, 2019, RP-192160, 56 pages.

Ericsson, New SID on support of reduced capability NR devices. 3GPP TSG RAN Meeting #86, Sitges, Spain, Dec. 9-12, 2019, RP-193238, 5 pages.

3GPP TS 38.213 V16.1.0 (Mar. 2020-03), 3rd Generation Partnership Project; Technical Specification Group Radio Access Network; NR; Physical layer procedures for control(Release 16), 156 pages.

3GPP TS 38.306 V16.0.0 (Mar. 2020), 3rd Generation Partnership Project; Technical Specification Group Radio Access Network; NR; User Equipment (UE) radio access capabilities(Release 16), 64 pages.

3GPP TR 38.822 V15.0.1 (Jul. 2019), 3rd Generation Partnership Project; Technical Specification Group Radio Access Network; NR; User Equipment (UE) feature list(Release 15), 64 pages.

3GPP TS 38.331 V16.0.0 (Mar. 2020), 3rd Generation Partnership Project; Technical Specification Group Radio Access Network; NR; Radio Resource Control (RRC) protocol specification(Release 16), 835 pages.

International Search Report issued in corresponding International Application No. PCT/CN2021/093965, dated Jul. 26, 2021, pp. 1-11.

LG Electronics: "Random Access for coverage enhanced UEs with normal bandwidth", 3GPP Draft; R2-152309, May 24, 2015, XP050971092, total 3 pages.

Extended European Search Report issued in corresponding European Application No. 21804925.2, dated Oct. 9, 2023, pp. 1-9.

* cited by examiner

INFORMATION SENDING AND RECEIVING METHOD, APPARATUS, AND SYSTEM

CROSS-REFERENCE TO RELATED APPLICATIONS

This application is a continuation of International Application No. PCT/CN2021/093965, filed on May 14, 2021, which claims priority to Chinese Patent Application No. 202010415293.5, filed on May 15, 2020 and Chinese Patent Application No. 202010791135.X, filed on Aug. 7, 2020. All of the aforementioned patent applications are hereby incorporated by reference in their entireties.

TECHNICAL FIELD

This application relates to the field of communications technologies, and in particular, to an information sending and receiving method, an apparatus, and a system.

BACKGROUND

New radio (new radio, NR) is a global fifth generation (fifth generation, 5G) mobile communications technology standard with a new air interface design based on orthogonal frequency division multiplexing (orthogonal frequency division multiplexing, OFDM), and is also a foundation of a next-generation cellular mobile technology. Services related to the NR are quite diversified, and for example, may include an enhanced mobile broadband (enhanced mobile broadband, eMBB) service, an ultra-reliable low-latency communication (ultra-reliable low-latency communication, URLLC) service, and a massive machine-type communications (massive machine-type communications, mMTC) service/a machine type communication (machine type communication, MTC) service. The mMTC/MTC service may include a service in an industrial wireless sensor network (industrial wireless sensor network, IWSN) scenario, a service in a video surveillance (video surveillance) scenario, a service in a wearable/intelligent wearable (wearable) scenario, and the like.

Currently, the 3rd generation partnership project (3rd generation partnership project, 3GPP) initiates research on a reduced-capability (reduced-capability, REDCAP) terminal device in an NR system, to design, for an increasingly large quantity of Internet of Things markets such as the IWSN scenario, the video surveillance scenario, and the wearable scenario that are mentioned above, a terminal device that meets a performance requirement in the Internet of Things market and has low costs/low implementation complexity, so as to extend application of the NR system in the Internet of Things market.

For the REDCAP terminal device, how to report a related parameter is not defined in a current standard.

SUMMARY

Embodiments of this application provide an information sending and receiving method, an apparatus, and a system, to reduce resource overheads used by a (reduced-capability) terminal device to report a capability parameter.

According to a first aspect, an embodiment of this application provides an information sending method, including: A terminal device sends first information to a network device, where the first information indicates that the terminal device is a first-type terminal device, a capability parameter corresponding to the first-type terminal device includes a first capability set, the first capability set includes a channel bandwidth supported by the terminal device and a quantity of transmit antennas of the terminal device, the channel bandwidth of the terminal device is less than 100 megahertz (MHz), and the quantity of transmit antennas of the terminal device is less than 4.

Based on the method provided in this embodiment of this application, the terminal device may report a device type of the terminal device to the network device by using the first information, so that the network device determines, based on the type of the terminal device, a plurality of capability parameters corresponding to the terminal device, thereby reducing resource overheads used by the terminal device to report the capability parameter.

In a possible implementation, the channel bandwidth of the terminal device is 20 megahertz or 50 megahertz, the quantity of transmit antennas of the terminal device is 1, and a quantity of receive antennas of the terminal device is 2.

In a possible implementation, the first capability set further includes at least one of a quantity of hybrid automatic repeat request (hybrid automatic repeat request, HARQ) processes supported by the terminal device, a maximum modulation scheme for uplink data transmission, a maximum modulation scheme for downlink data transmission, a physical downlink shared channel (physical downlink shared channel, PDSCH) processing capability, or a physical uplink shared channel (physical uplink shared channel, PUSCH) processing capability. The PDSCH processing capability corresponds to a first time offset between a PDSCH and a physical uplink control channel (physical uplink control channel, PUCCH), and the PUSCH processing capability corresponds to a second time offset between a PDCCH and a physical uplink shared channel (physical uplink shared channel, PUSCH). The quantity of HARQ processes is less than or equal to 16, such as 8, the maximum modulation scheme for uplink data transmission is 64 quadrature amplitude modulation (quadrature amplitude modulation, QAM), the maximum modulation scheme for downlink data transmission is 64QAM, the first time offset is greater than or equal to a first preset threshold, and the second time offset is greater than or equal to a second preset threshold.

In a possible implementation, the capability parameter corresponding to the first-type terminal device further includes at least one of the following capability sets: a second capability set, where the second capability set is used to represent a power saving capability of the terminal device; a third capability set, where the third capability set is used to represent a coverage enhancement capability and/or a data transmission rate improvement capability of the terminal device; a fourth capability set, where the fourth capability set is used to represent a short-latency processing capability of the terminal device; a fifth capability set, where the fifth capability set is used to represent a small data transmission capability and/or an inactive data transmission capability of the terminal device; a sixth capability set, where the sixth capability set is used to represent a transmission reliability capability of the terminal device; or a seventh capability set, where the seventh capability set is used to represent an ultra-reliable low-latency communication (ultra-reliable low-latency communication, URLLC) data transmission capability of the terminal device. In this embodiment of this application, a capability set of the first-type terminal device may be defined based on different data transmission requirements, to meet different requirements in aspects such as energy saving, coverage, and a data transmission rate in different scenarios.

Based on the method provided in this embodiment of this application, the terminal device reports, by using the first information, that the terminal device is the first-type terminal device. The capability parameter corresponding to the first-type terminal device includes a channel bandwidth and a quantity of antennas, and the quantity of antennas may be a quantity of transmit antennas or a quantity of receive antennas or a sum thereof. In addition, the capability parameter corresponding to the first-type terminal device may further include one or more of the second capability set to the seventh capability set. The network device determines, by using the first information, that the terminal device is the first-type terminal device, and therefore can determine a bandwidth, an antenna, and another capability parameter such as a power saving capability of the terminal device, thereby further improving efficiency of reporting the capability parameter by the terminal device and reducing resource overheads for reporting the capability parameter.

In a possible implementation, the first information indicates that the capability parameter corresponding to the first-type terminal device further includes at least one of the second capability set, the third capability set, the fourth capability set, the fifth capability set, the sixth capability set, or the seventh capability set. The first information may explicitly indicate (directly indicate) or implicitly indicate (indirectly indicate) the first capability set. This is not limited in this application.

In a possible implementation, the method further includes: The terminal device sends second information to the network device, where the second information indicates that the capability parameter corresponding to the first-type terminal device further includes at least one of the second capability set, the third capability set, the fourth capability set, the fifth capability set, the sixth capability set, or the seventh capability set. In other words, the first information indicates only the first capability set, and the second information explicitly indicates at least one of the second capability set, the third capability set, the fourth capability set, the fifth capability set, the sixth capability set, or the seventh capability set. It may be considered that the first capability set indicated by the first information is a mandatory capability set, and that another capability set is autonomously implemented by each terminal manufacturer, and therefore is reported by using the second information. A capability set indicated by the second information may be an optional capability set or a mandatory capability set.

In a possible implementation, the first information is sent in an initial access phase, and the second information is sent in a connected state.

In a possible implementation, the method further includes: The terminal device sends third information to the network device, where the third information indicates an application scenario of the terminal device, and the application scenario of the terminal device has an association relationship with at least one of the second capability set, the third capability set, the fourth capability set, the fifth capability set, the sixth capability set, or the seventh capability set. In this way, the first-type terminal device may be associated with different capability sets by reporting the application scenario of the first-type terminal device, to assist the network device in implementing adapted data transmission, thereby meeting requirements in different application scenarios.

In a possible implementation, when the application scenario of the terminal device is an industrial wireless sensor network IWSN scenario, the application scenario of the terminal device has an association relationship with the second capability set, the fourth capability set, and the seventh capability set.

In a possible implementation, the second capability set includes at least one of the following: a maximum quantity of pieces of downlink control information (downlink control information, DCI) with different DCI sizes that is supported by the terminal device, the terminal device supports cross slot scheduling, the terminal device supports reception of a wakeup signal (wakeup signal, WUS), or the terminal device supports radio resource management (radio resource management, RRM) measurement relaxation of a neighboring cell. The maximum quantity of pieces of DCI is less than 4.

In a possible implementation, the third capability set includes at least one of the following: the terminal device supports supplement uplink (supplement uplink, SUL), the terminal device supports repeated transmission of a physical downlink control channel PDCCH, the terminal device supports a time domain resource corresponding to the PDCCH to be greater than three orthogonal frequency division multiplexing OFDM symbols, the terminal device supports a virtual carrier, or the terminal device supports a bandwidth part (bandwidth part, BWP) switching latency to be not longer than radio frequency retuning time.

In a possible implementation, the fourth capability set includes at least one of the following: the terminal device supports mini-slot based uplink data transmission, the terminal device supports mini-slot based downlink data transmission, the terminal device supports grant free uplink data transmission, or the terminal device supports grant free downlink data transmission.

In a possible implementation, the fifth capability set includes at least one of the following: the terminal device supports a 2-step random access transmission manner, the terminal device supports an early data transmission manner, or the terminal device supports a preconfigured uplink resource transmission manner.

In a possible implementation, the sixth capability set includes at least one of the following: the terminal device supports a data transmission manner of receiving a plurality of transmission and reception points (transmission reception point, TRP) based on a single PDCCH, the terminal device supports a time domain resource corresponding to the PDCCH to be greater than three OFDM symbols, the terminal device supports repeated transmission of a PUSCH, or the terminal device supports repeated transmission of a (physical downlink shared channel, PDSCH).

In a possible implementation, the seventh capability set includes at least one of the following: the terminal device supports grant free uplink data transmission, the terminal device supports grant free downlink data transmission, the terminal device supports mini-slot based PUSCH/PDSCH transmission, the terminal device supports transmission in a physical uplink control channel PUCCH format 0/2, the terminal device supports repeated transmission of a PDSCH/PUSCH, the terminal device supports transmission of a PDCCH with an aggregation level of 16, or the terminal device supports a modulation coding scheme cell radio network temporary identifier (modulation coding scheme cell radio network temporary identifier, MCS-C-RNTI) table corresponding to a block error rate (block error rate, BLER) of 1e-5.

In a possible implementation, the capability parameter corresponding to the terminal device further includes at least one of the following: a capability set used in an IWSN scenario, a capability set used in a wearable scenario, and a capability set used in a video surveillance scenario.

Based on the method provided in this embodiment of this application, capability parameters may be further divided by using an application scenario, that is, the first-type terminal device corresponds to capability sets having different capability parameters in different application scenarios, thereby improving flexibility of reporting the capability parameter by a terminal.

In a possible implementation, the capability set used in the IWSN scenario includes at least one of the following: a maximum quantity of pieces of DCI with different DCI sizes that is supported by the terminal device, the terminal device supports cross slot scheduling, the terminal device supports mini-slot based uplink data transmission, the terminal device supports mini-slot based downlink data transmission, the terminal device supports grant free uplink data transmission, the terminal device supports grant free downlink data transmission, the terminal device supports a 2-step random access transmission manner, the terminal device supports an EDT transmission manner, or the terminal device supports a PUR transmission manner.

In a possible implementation, the capability parameter corresponding to the terminal device further includes a capability set corresponding to uplink transmission.

In a possible implementation, the terminal device further includes at least one of the following capabilities: the terminal device supports separate common signaling data transmission, the terminal device supports a high-precision synchronization function, the terminal device supports network slice data transmission, the terminal device supports non-public network (non-public network, NPN) data transmission, the terminal device supports fifth generation 5G local area network (local area network, LAN) data transmission, the terminal device supports uplink time difference of arrival (uplink time difference of arrival, UTDOA) positioning, or the terminal device supports multicast/broadcast data transmission.

In a possible implementation, the method further includes: The terminal device sends fourth information to the network device, where the fourth information indicates a first parameter f1, a maximum downlink data rate that is of the terminal device and that corresponds to f1 is less than or equal to X megabits/second, and X is 10.

In a possible implementation, the quantity of transmit antennas of the terminal device is 1, the quantity of receive antennas is 2, the channel bandwidth is 20 MHz, the maximum modulation scheme for uplink data transmission is 64QAM or 16QAM, and the maximum modulation scheme for downlink data transmission is 64QAM. A value range of f1 is 0.062-0.10 on a frequency division duplex FDD band, or a value range of f1 is 0.088-0.10 on a time division duplex TDD band.

In a possible implementation, that the terminal device sends fourth information to the network device includes: The terminal device reports, on at least one band supported by the terminal device, at least one piece of fourth information corresponding to the at least one band.

In a possible implementation, the method further includes: The terminal device sends fifth information to the network device, where the fifth information indicates a second parameter f2, a maximum uplink data rate that is of the terminal device and that corresponds to f2 is not higher than Y megabits/second, and Y is 5.

In a possible implementation, the quantity of transmit antennas of the terminal device is 1, the quantity of receive antennas is 1 or 2, the channel bandwidth is 20 MHz, the maximum modulation scheme for uplink data transmission is 64QAM, and the maximum modulation scheme for downlink data transmission is 64QAM. A value range of f2 is 0.058-0.10 on an FDD band, or a value range of f2 is 0.191-0.20, 0.29-0.30, or 0.191-0.30 on a TDD band.

In a possible implementation, that the terminal device sends fifth information to the network device includes: The terminal device reports, on at least one band supported by the terminal device, at least one piece of fifth information corresponding to the at least one band.

According to a second aspect, an embodiment of this application provides an information receiving method, including: A network device receives first information from a terminal device, where the first information indicates that the terminal device is a first-type terminal device, a capability parameter corresponding to the first-type terminal device includes a first capability set, the first capability set includes a channel bandwidth supported by the terminal device and a quantity of transmit antennas of the terminal device, the channel bandwidth of the terminal device is less than 100 megahertz, and the quantity of transmit antennas of the terminal device is less than 4.

In a possible implementation, the channel bandwidth of the terminal device is 20 megahertz or 50 megahertz, the quantity of transmit antennas of the terminal device is 1, and a quantity of receive antennas of the terminal device is 2.

In a possible implementation, the first capability set further includes at least one of a quantity of hybrid automatic repeat request HARQ processes supported by the terminal device, a maximum modulation scheme for uplink data transmission, a maximum modulation scheme for downlink data transmission, a physical downlink shared channel PDSCH processing capability, or a physical uplink shared channel PUSCH processing capability. The quantity of HARQ processes is less than or equal to 16, the maximum modulation scheme for uplink data transmission is 64 quadrature amplitude modulation QAM, and the maximum modulation scheme for downlink data transmission is 64QAM.

In a possible implementation, the capability parameter corresponding to the first-type terminal device further includes at least one of the following capability sets: a second capability set, where the second capability set is used to represent a power saving capability of the terminal device; a third capability set, where the third capability set is used to represent a coverage enhancement capability and/or a data transmission rate improvement capability of the terminal device; a fourth capability set, where the fourth capability set is used to represent a short-latency processing capability of the terminal device; a fifth capability set, where the fifth capability set is used to represent a small data transmission capability and/or an inactive data transmission capability of the terminal device; a sixth capability set, where the sixth capability set is used to represent a transmission reliability capability of the terminal device; or a seventh capability set, where the seventh capability set is used to represent an ultra-reliable low-latency communication URLLC data transmission capability of the terminal device.

In a possible implementation, the first information indicates that the capability parameter corresponding to the first-type terminal device further includes at least one of the second capability set, the third capability set, the fourth capability set, the fifth capability set, the sixth capability set, or the seventh capability set.

In a possible implementation, the method further includes: The network device receives second information from the terminal device, where the second information indicates that the capability parameter corresponding to the first-type terminal device further includes at least one of the second capability set, the third capability set, the fourth capability set, the fifth capability set, the sixth capability set, or the seventh capability set.

In a possible implementation, the first information is sent in an initial access phase, and the second information is sent in a connected state.

In a possible implementation, the method further includes: The network device receives third information from the terminal device, where the third information indicates an application scenario of the terminal device, and the application scenario of the terminal device has an association relationship with at least one of the second capability set, the third capability set, the fourth capability set, the fifth capability set, the sixth capability set, or the seventh capability set.

In a possible implementation, when the application scenario of the terminal device is an industrial wireless sensor network IWSN scenario, the application scenario of the terminal device has an association relationship with the second capability set, the fourth capability set, the fifth capability set, and the seventh capability set.

In a possible implementation, the second capability set includes at least one of the following: a maximum quantity of pieces of downlink control information DCI with different DCI sizes that is supported by the terminal device, the terminal device supports cross slot scheduling, the terminal device supports reception of a wakeup signal WUS, or the terminal device supports radio resource management RRM measurement relaxation of a neighboring cell. The maximum quantity of pieces of DCI is less than 4.

In a possible implementation, the third capability set includes at least one of the following: the terminal device supports supplement uplink (supplement uplink, SUL), the terminal device supports repeated transmission of a physical downlink control channel PDCCH, the terminal device supports a time domain resource corresponding to the PDCCH to be greater than three orthogonal frequency division multiplexing OFDM symbols, the terminal device supports a virtual carrier, or the terminal device supports a bandwidth part (bandwidth part, BWP) switching latency to be not longer than radio frequency retuning time.

In a possible implementation, the fourth capability set includes at least one of the following: the terminal device supports mini-slot based uplink data transmission, the terminal device supports mini-slot based downlink data transmission, the terminal device supports grant free uplink data transmission, or the terminal device supports grant free downlink data transmission.

In a possible implementation, the fifth capability set includes at least one of the following: the terminal device supports a 2-step random access transmission manner, the terminal device supports an early data transmission manner, or the terminal device supports a preconfigured uplink resource transmission manner.

In a possible implementation, the sixth capability set includes at least one of the following: the terminal device supports a data transmission manner of receiving a plurality of transmission and reception points TRPs based on a single PDCCH, the terminal device supports a time domain resource corresponding to the PDCCH to be greater than three OFDM symbols, the terminal device supports repeated transmission of a PUSCH, or the terminal device supports repeated transmission of a PDSCH.

In a possible implementation, the seventh capability set includes at least one of the following: the terminal device supports grant free uplink data transmission, the terminal device supports grant free downlink data transmission, the terminal device supports mini-slot based PUSCH/PDSCH transmission, the terminal device supports transmission in a physical uplink control channel PUCCH format 0/2, the terminal device supports repeated transmission of a PDSCH/PUSCH, the terminal device supports transmission of a PDCCH with an aggregation level of 16, or the terminal device supports an MCS-C-RNTI table corresponding to a block error rate BLER of 1e-5.

In a possible implementation, the capability parameter corresponding to the terminal device further includes at least one of the following: a capability set used in an IWSN scenario, a capability set used in a wearable scenario, and a capability set used in a video surveillance scenario.

In a possible implementation, the capability set used in the IWSN scenario includes at least one of the following: a maximum quantity of pieces of DCI with different DCI sizes that is supported by the terminal device, the terminal device supports cross slot scheduling, the terminal device supports mini-slot based uplink data transmission, the terminal device supports mini-slot based downlink data transmission, the terminal device supports grant free uplink data transmission, the terminal device supports grant free downlink data transmission, the terminal device supports a 2-step random access transmission manner, the terminal device supports an EDT transmission manner, or the terminal device supports a PUR transmission manner.

In a possible implementation, the capability parameter corresponding to the terminal device further includes a capability set corresponding to uplink transmission.

In a possible implementation, the terminal device further includes at least one of the following capabilities: the terminal device supports separate common signaling data transmission, the terminal device supports a high-precision synchronization function, the terminal device supports network slice data transmission, the terminal device supports non-public network NPN data transmission, the terminal device supports 5G LAN data transmission, the terminal device supports uplink time difference of arrival UTDOA positioning, or the terminal device supports multicast/broadcast data transmission.

In a possible implementation, the method further includes: The network device receives fourth information from the terminal device, where the fourth information indicates a first parameter f1, a maximum downlink data rate that is of the terminal device and that corresponds to f1 is less than or equal to X megabits/second, and X is 10.

In a possible implementation, the quantity of transmit antennas of the terminal device is 1, the quantity of receive antennas is 2, the channel bandwidth is 20 MHz, the maximum modulation scheme for uplink data transmission is 64QAM or 16QAM, and the maximum modulation scheme for downlink data transmission is 64QAM. A value range of f1 is 0.062-0.10 on a frequency division duplex FDD band, or a value range of f1 is 0.088-0.10 on a time division duplex TDD band.

In a possible implementation, that the network device receives fourth information from the terminal device includes: The network device receives, from the terminal device, at least one piece of fourth information corresponding to at least one band supported by the terminal device.

In a possible implementation, the method further includes: The network device receives fifth information from the terminal device, where the fifth information indicates a second parameter f2, a maximum uplink data rate that is of the terminal device and that corresponds to f2 is not higher than Y megabits/second, and Y is 5.

In a possible implementation, the quantity of transmit antennas of the terminal device is 1, the quantity of receive antennas is 1 or 2, the channel bandwidth is 20 MHz, the maximum modulation scheme for uplink data transmission is 64QAM, and the maximum modulation scheme for downlink data transmission is 64QAM. A value range of f2 is 0.058-0.10 on an FDD band, or a value range of f2 is 0.191-0.20, 0.29-0.30, or 0.191-0.30 on a TDD band.

In a possible implementation, that the network device receives fifth information from the terminal device includes: The network device receives, from the terminal device, at least one piece of fifth information corresponding to at least one band supported by the terminal device.

According to a third aspect, an embodiment of this application provides a communications apparatus. The communications apparatus may be a terminal device, including: a transceiver unit, configured to send first information to a network device, where the first information indicates that the terminal device is a first-type terminal device, a capability parameter corresponding to the first-type terminal device includes a first capability set, the first capability set includes a channel bandwidth supported by the terminal device and a quantity of transmit antennas of the terminal device, the channel bandwidth of the terminal device is less than 100 megahertz, and the quantity of transmit antennas of the terminal device is less than 4.

In a possible implementation, the channel bandwidth of the terminal device is 20 megahertz or 50 megahertz, the quantity of transmit antennas of the terminal device is 1, and a quantity of receive antennas of the terminal device is 2.

In a possible implementation, the first capability set further includes at least one of a quantity of hybrid automatic repeat request HARQ processes supported by the terminal device, a maximum modulation scheme for uplink data transmission, a maximum modulation scheme for downlink data transmission, a physical downlink shared channel PDSCH processing capability, or a physical uplink shared channel PUSCH processing capability. The quantity of HARQ processes is less than or equal to 16, the maximum modulation scheme for uplink data transmission is 64 quadrature amplitude modulation QAM, and the maximum modulation scheme for downlink data transmission is 64QAM.

In a possible implementation, the capability parameter corresponding to the first-type terminal device further includes at least one of the following capability sets: a second capability set, where the second capability set is used to represent a power saving capability of the terminal device; a third capability set, where the third capability set is used to represent a coverage enhancement capability and/or a data transmission rate improvement capability of the terminal device; a fourth capability set, where the fourth capability set is used to represent a short-latency processing capability of the terminal device; a fifth capability set, where the fifth capability set is used to represent a small data transmission capability and/or an inactive data transmission capability of the terminal device; a sixth capability set, where the sixth capability set is used to represent a transmission reliability capability of the terminal device; or a seventh capability set, where the seventh capability set is used to represent an ultra-reliable low-latency communication URLLC data transmission capability of the terminal device.

In a possible implementation, the first information indicates that the capability parameter corresponding to the first-type terminal device further includes at least one of the second capability set, the third capability set, the fourth capability set, the fifth capability set, the sixth capability set, or the seventh capability set.

In a possible implementation, the transceiver unit is further configured to send second information to the network device, where the second information indicates that the capability parameter corresponding to the first-type terminal device further includes at least one of the second capability set, the third capability set, the fourth capability set, the fifth capability set, the sixth capability set, or the seventh capability set.

In a possible implementation, the first information is sent in an initial access phase, and the second information is sent in a connected state.

In a possible implementation, the transceiver unit is further configured to send third information to the network device, where the third information indicates an application scenario of the terminal device, and the application scenario of the terminal device has an association relationship with at least one of the second capability set, the third capability set, the fourth capability set, the fifth capability set, the sixth capability set, or the seventh capability set.

In a possible implementation, when the application scenario of the terminal device is an industrial wireless sensor network IWSN scenario, the application scenario of the terminal device has an association relationship with the second capability set, the fourth capability set, and the seventh capability set.

In a possible implementation, the second capability set includes at least one of the following: a maximum quantity of pieces of downlink control information DCI with different DCI sizes that is supported by the terminal device, the terminal device supports cross slot scheduling, the terminal device supports reception of a wakeup signal WUS, or the terminal device supports radio resource management RRM measurement relaxation of a neighboring cell. The maximum quantity of pieces of DCI is less than 4.

In a possible implementation, the third capability set includes at least one of the following: the terminal device supports supplement uplink (supplement uplink, SUL), the terminal device supports repeated transmission of a physical downlink control channel PDCCH, the terminal device supports a time domain resource corresponding to the PDCCH to be greater than three orthogonal frequency division multiplexing OFDM symbols, the terminal device supports a virtual carrier, or the terminal device supports a bandwidth part (bandwidth part, BWP) switching latency to be not longer than radio frequency retuning time.

In a possible implementation, the fourth capability set includes at least one of the following: the terminal device supports mini-slot based uplink data transmission, the terminal device supports mini-slot based downlink data transmission, the terminal device supports grant free uplink data transmission, or the terminal device supports grant free downlink data transmission.

In a possible implementation, the fifth capability set includes at least one of the following: the terminal device supports a 2-step random access transmission manner, the terminal device supports an early data transmission manner, or the terminal device supports a preconfigured uplink resource transmission manner.

In a possible implementation, the sixth capability set includes at least one of the following: the terminal device supports a data transmission manner of receiving a plurality of transmission and reception points TRPs based on a single PDCCH, the terminal device supports a time domain resource corresponding to the PDCCH to be greater than three OFDM symbols, the terminal device supports repeated transmission of a PUSCH, or the terminal device supports repeated transmission of a PDSCH.

In a possible implementation, the seventh capability set includes at least one of the following: the terminal device supports grant free uplink data transmission, the terminal device supports grant free downlink data transmission, the terminal device supports mini-slot based PUSCH/PDSCH transmission, the terminal device supports transmission in a physical uplink control channel PUCCH format 0/2, the terminal device supports repeated transmission of a PDSCH/PUSCH, the terminal device supports transmission of a PDCCH with an aggregation level of 16, or the terminal device supports an MCS-C-RNTI table corresponding to a block error rate BLER of 1e-5.

In a possible implementation, the capability parameter corresponding to the terminal device further includes at least one of the following: a capability set used in an IWSN scenario, a capability set used in a wearable scenario, and a capability set used in a video surveillance scenario.

In a possible implementation, the capability set used in the IWSN scenario includes at least one of the following: a maximum quantity of pieces of DCI with different DCI sizes that is supported by the terminal device, the terminal device supports cross slot scheduling, the terminal device supports mini-slot based uplink data transmission, the terminal device supports mini-slot based downlink data transmission, the terminal device supports grant free uplink data transmission, the terminal device supports grant free downlink data transmission, the terminal device supports a 2-step random access transmission manner, the terminal device supports an EDT transmission manner, or the terminal device supports a PUR transmission manner.

In a possible implementation, the capability parameter corresponding to the terminal device further includes a capability set corresponding to uplink transmission.

In a possible implementation, the terminal device further includes at least one of the following capabilities: the terminal device supports separate common signaling data transmission, the terminal device supports a high-precision synchronization function, the terminal device supports network slice data transmission, the terminal device supports non-public network NPN data transmission, the terminal device supports 5G LAN data transmission, the terminal device supports uplink time difference of arrival UTDOA positioning, or the terminal device supports multicast/broadcast data transmission.

In a possible implementation, the transceiver unit is further configured to send fourth information to the network device, where the fourth information indicates a first parameter f1, a maximum downlink data rate that is of the terminal device and that corresponds to f1 is less than or equal to X megabits/second, and X is 10.

In a possible implementation, the quantity of transmit antennas of the terminal device is 1, the quantity of receive antennas is 2, the channel bandwidth is 20 MHz, the maximum modulation scheme for uplink data transmission is 64QAM or 16QAM, and the maximum modulation scheme for downlink data transmission is 64QAM. A value range of f1 is 0.062-0.10 on a frequency division duplex FDD band, or a value range of f1 is 0.088-0.10 on a time division duplex TDD band.

In a possible implementation, the transceiver unit is further configured to separately report the fourth information on different bands.

In a possible implementation, the transceiver unit is further configured to send fifth information to the network device, where the fifth information indicates a second parameter f2, a maximum uplink data rate that is of the terminal device and that corresponds to f2 is not higher than Y megabits/second, and Y is 5.

In a possible implementation, the quantity of transmit antennas of the terminal device is 1, the quantity of receive antennas is 1 or 2, the channel bandwidth is 20 MHz, the maximum modulation scheme for uplink data transmission is 64QAM, and the maximum modulation scheme for downlink data transmission is 64QAM. A value range of f2 is 0.058-0.10 on an FDD band, or a value range of f2 is 0.191-0.20, 0.29-0.30, or 0.191-0.30 on a TDD band.

In a possible implementation, the transceiver unit is further configured to report, on at least one band supported by the terminal device, at least one piece of fifth information corresponding to the at least one band.

According to a fourth aspect, an embodiment of this application provides a communications apparatus. The communications apparatus may be a network device, including: a transceiver unit, configured to receive first information from a terminal device, where the first information indicates that the terminal device is a first-type terminal device, a capability parameter corresponding to the first-type terminal device includes a first capability set, the first capability set includes a channel bandwidth supported by the terminal device and a quantity of transmit antennas of the terminal device, the channel bandwidth of the terminal device is less than 100 megahertz, and the quantity of transmit antennas of the terminal device is less than 4.

In a possible implementation, the channel bandwidth of the terminal device is 20 megahertz or 50 megahertz, the quantity of transmit antennas of the terminal device is 1, and a quantity of receive antennas of the terminal device is 2.

In a possible implementation, the first capability set further includes at least one of a quantity of hybrid automatic repeat request HARQ processes supported by the terminal device, a maximum modulation scheme for uplink data transmission, a maximum modulation scheme for downlink data transmission, a physical downlink shared channel PDSCH processing capability, or a physical uplink shared channel PUSCH processing capability. The quantity of HARQ processes is less than or equal to 16, the maximum modulation scheme for uplink data transmission is 64 quadrature amplitude modulation QAM, and the maximum modulation scheme for downlink data transmission is 64QAM.

In a possible implementation, the capability parameter corresponding to the first-type terminal device further includes at least one of the following capability sets: a second capability set, where the second capability set is used to represent a power saving capability of the terminal device; a third capability set, where the third capability set is used to represent a coverage enhancement capability and/or a data transmission rate improvement capability of the terminal device; a fourth capability set, where the fourth capability set is used to represent a short-latency processing capability of the terminal device; a fifth capability set, where the fifth capability set is used to represent a small data transmission capability and/or an inactive data transmission capability of the terminal device; a sixth capability set, where the sixth capability set is used to represent a transmission reliability capability of the terminal device; or a seventh capability set, where the seventh capability set is used to represent an ultra-reliable low-latency communication URLLC data transmission capability of the terminal device.

In a possible implementation, the first information indicates that the capability parameter corresponding to the first-type terminal device further includes at least one of the second capability set, the third capability set, the fourth capability set, the fifth capability set, the sixth capability set, or the seventh capability set.

In a possible implementation, the transceiver unit is further configured to receive second information from the terminal device, where the second information indicates that the capability parameter corresponding to the first-type terminal device further includes at least one of the second capability set, the third capability set, the fourth capability set, the fifth capability set, the sixth capability set, or the seventh capability set.

In a possible implementation, the first information is sent in an initial access phase, and the second information is sent in a connected state.

In a possible implementation, the transceiver unit is further configured to receive third information from the terminal device, where the third information indicates an application scenario of the terminal device, and the application scenario of the terminal device has an association relationship with at least one of the second capability set, the third capability set, the fourth capability set, the fifth capability set, the sixth capability set, or the seventh capability set.

In a possible implementation, when the application scenario of the terminal device is an industrial wireless sensor network IWSN scenario, the application scenario of the terminal device has an association relationship with the second capability set, the fourth capability set, the fifth capability set, and the seventh capability set.

In a possible implementation, the second capability set includes at least one of the following: a maximum quantity of pieces of downlink control information DCI with different DCI sizes that is supported by the terminal device, the terminal device supports cross slot scheduling, the terminal device supports reception of a wakeup signal WUS, or the terminal device supports radio resource management RRM measurement relaxation of a neighboring cell. The maximum quantity of pieces of DCI is less than 4.

In a possible implementation, the third capability set includes at least one of the following: the terminal device supports supplement uplink (supplement uplink, SUL), the terminal device supports repeated transmission of a physical downlink control channel PDCCH, the terminal device supports a time domain resource corresponding to the PDCCH to be greater than three orthogonal frequency division multiplexing OFDM symbols, the terminal device supports a virtual carrier, or the terminal device supports a bandwidth part (bandwidth part, BWP) switching latency to be not longer than radio frequency retuning time.

In a possible implementation, the fourth capability set includes at least one of the following: the terminal device supports mini-slot based uplink data transmission, the terminal device supports mini-slot based downlink data transmission, the terminal device supports grant free uplink data transmission, or the terminal device supports grant free downlink data transmission.

In a possible implementation, the fifth capability set includes at least one of the following: the terminal device supports a 2-step random access transmission manner, the terminal device supports an early data transmission manner, or the terminal device supports a preconfigured uplink resource transmission manner.

In a possible implementation, the sixth capability set includes at least one of the following: the terminal device supports a data transmission manner of receiving a plurality of transmission and reception points TRPs based on a single PDCCH, the terminal device supports a time domain resource corresponding to the PDCCH to be greater than three OFDM symbols, the terminal device supports repeated transmission of a PUSCH, or the terminal device supports repeated transmission of a PDSCH.

In a possible implementation, the seventh capability set includes at least one of the following: the terminal device supports grant free uplink data transmission, the terminal device supports grant free downlink data transmission, the terminal device supports mini-slot based PUSCH/PDSCH transmission, the terminal device supports transmission in a physical uplink control channel PUCCH format 0/2, the terminal device supports repeated transmission of a PDSCH/PUSCH, the terminal device supports transmission of a PDCCH with an aggregation level of 16, or the terminal device supports an MCS-C-RNTI table corresponding to a block error rate BLER of 1e-5.

In a possible implementation, the capability parameter corresponding to the terminal device further includes at least one of the following: a capability set used in an IWSN scenario, a capability set used in a wearable scenario, and a capability set used in a video surveillance scenario.

In a possible implementation, the capability set used in the IWSN scenario includes at least one of the following: a maximum quantity of pieces of DCI with different DCI sizes that is supported by the terminal device, the terminal device supports cross slot scheduling, the terminal device supports mini-slot based uplink data transmission, the terminal device supports mini-slot based downlink data transmission, the terminal device supports grant free uplink data transmission, the terminal device supports grant free downlink data transmission, the terminal device supports a 2-step random access transmission manner, the terminal device supports an EDT transmission manner, or the terminal device supports a PUR transmission manner.

In a possible implementation, the capability parameter corresponding to the terminal device further includes a capability set corresponding to uplink transmission.

In a possible implementation, the terminal device further includes at least one of the following capabilities: the terminal device supports separate common signaling data transmission, the terminal device supports a high-precision synchronization function, the terminal device supports network slice data transmission, the terminal device supports non-public network NPN data transmission, the terminal device supports 5G LAN data transmission, the terminal device supports uplink time difference of arrival UTDOA positioning, or the terminal device supports multicast/broadcast data transmission.

In a possible implementation, the transceiver unit is further configured to receive fourth information from the terminal device, where the fourth information indicates a first parameter f1, a maximum downlink data rate that is of the terminal device and that corresponds to f1 is less than or equal to X megabits/second, and X is 10.

In a possible implementation, the quantity of transmit antennas of the terminal device is 1, the quantity of receive antennas is 2, the channel bandwidth is 20 MHz, the maximum modulation scheme for uplink data transmission is 64QAM or 16QAM, and the maximum modulation scheme for downlink data transmission is 64QAM. A value range of f1 is 0.062-0.10 on a frequency division duplex FDD band, or a value range of f1 is 0.088-0.10 on a time division duplex TDD band.

In a possible implementation, the transceiver unit is further configured to receive, from the terminal device, at least one piece of fourth information corresponding to at least one band supported by the terminal device.

In a possible implementation, the transceiver unit is further configured to receive fifth information from the terminal device, where the fifth information indicates a second parameter f2, a maximum uplink data rate that is of the terminal device and that corresponds to f2 is not higher than Y megabits/second, and Y is 5.

In a possible implementation, the quantity of transmit antennas of the terminal device is 1, the quantity of receive antennas is 1 or 2, the channel bandwidth is 20 MHz, the maximum modulation scheme for uplink data transmission is 64QAM, and the maximum modulation scheme for downlink data transmission is 64QAM. A value range of f2 is 0.058-0.10 on an FDD band, or a value range of f2 is 0.191-0.20, 0.29-0.30, or 0.191-0.30 on a TDD band.

In a possible implementation, the transceiver unit is further configured to receive, from the terminal device, at least one piece of fifth information corresponding to at least one band supported by the terminal device.

According to a fifth aspect, a communications apparatus is provided. The communications apparatus may be a terminal device, including a processor and a memory. The memory is configured to store computer execution instructions, and the processor executes the computer execution instructions stored in the memory, so that the apparatus performs the method according to any implementation of the first aspect.

According to a sixth aspect, a communications apparatus is provided. The communications apparatus may be a network device, including a processor. The processor is configured to be coupled to a memory, and perform the method according to any implementation of the second aspect after reading instructions in the memory.

According to a seventh aspect, a computer-readable storage medium is provided. The computer-readable storage medium stores instructions, and when the instructions are run on a computer, the computer is enabled to perform the method according to any implementation of the first aspect.

According to an eighth aspect, a computer program product including instructions is provided. When the computer program product is run on a computer, the computer is enabled to perform the method according to any implementation of the first aspect.

According to a ninth aspect, a circuit system is provided. The circuit system includes a processing circuit, and the processing circuit is configured to perform the method according to any implementation of any of the foregoing aspects.

According to a tenth aspect, a chip is provided. The chip includes a processor, and the processor is coupled to a memory. The memory stores program instructions, and when the program instructions stored in the memory are executed by the processor, the method according to any implementation of any of the foregoing aspects is implemented.

According to an eleventh aspect, a communications system is provided, where the communications system includes the communications apparatus according to any implementation of the third aspect or any implementation of the fourth aspect.

DESCRIPTION OF EMBODIMENTS

Figure 1:
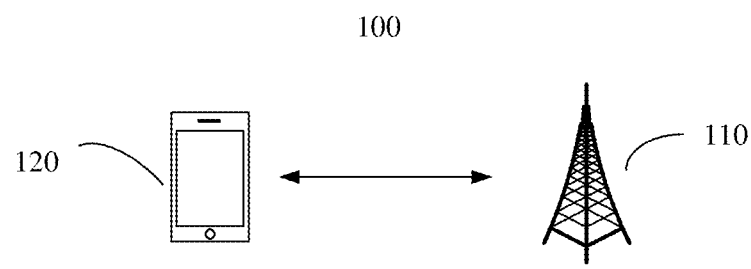
FIG. 1 is a schematic diagram of an architecture of a communications system according to an embodiment of this application.

For clear and brief descriptions of the following embodiments, a related concept or technology is first briefly described.

Currently, 3GPP initiates research on a REDCAP terminal device in an NR system, to design, for an increasingly large quantity of Internet of Things markets such as an IWSN scenario, a video surveillance scenario, and a wearable scenario, a terminal device that meets a performance requirement in the Internet of Things market and has low costs/low implementation complexity, so as to extend application of the NR system in the Internet of Things market.

The IWSN scenario, the video surveillance scenario, and the wearable scenario respectively have different demands (requirements) on data transmission performance such as a data transmission rate, a data transmission latency, data transmission reliability, and power consumption. For example, for battery service life requirements (power consumption requirements) in the video surveillance scenario and the wearable scenario, the video surveillance scenario has no explicit requirement for a battery life. In other words, in the video surveillance scenario, data transmission between an NR REDCAP terminal device and a network device does not require much consideration of impact of power consumption of the NR REDCAP terminal device. However, the wearable scenario has a relatively strict requirement in an aspect of a battery life, to prevent user experience from being affected by frequent charging. In other words, how to reduce power consumption of an NR REDCAP terminal device applied to the wearable scenario needs to be considered. For another example, the IWSN scenario and the wearable scenario are used as examples. In the IWSN scenario, the terminal device may be a wireless sensor. Because IWSN scenarios are mostly indoor scenarios, and a transmission distance is short, so that a coverage requirement in transmission can be basically ensured. However, in the wearable scenario, the terminal device may be a wearable device (for example, a smart watch). The wearable device has a relatively explicit requirement for coverage performance as a user moves in a larger range. Table 1 shows some requirements that are respectively of the IWSN scenario, the video surveillance scenario, and the wearable scenario for data transmission performance such as a data transmission rate, a data transmission latency, data transmission reliability, and power consumption.

TABLE 1

| Scenario | Data transmission rate requirement | Data transmission latency requirement | Data transmission reliability requirement | Battery service life requirement (power consumption requirement) |
|---|---|---|---|---|
| IWSN | Not higher than 2 megabits per second (Mbps) | For a latency sensitive service: 5 to 10 milliseconds (ms); and for a non-latency sensitive service: not greater than 100 ms | Correct transmission rate is not less than 99.99% | At least several years |
| Video surveillance | For economical video surveillance: 2 Mbps to 4 Mbps; and for non-economical video surveillance: 7.5 Mbps to 25 Mbps | Not greater than 500 ms | Correct transmission rate: 99% to 99.9% | Most are active devices, which have no explicit requirement for a battery service life |
| Wearable | Downlink data transmission rate: 10 Mbps to 50 Mbps; and uplink data transmission rate: 5 Mbps | | | One to two weeks |

Different application scenarios have different requirements for a data transmission rate, a data transmission latency, data transmission reliability, and a battery life. Therefore, NR REDCAP terminal devices in different application scenarios may have different transmission features. For example, some other NR REDCAP terminal devices mainly need to meet a requirement in an IWSN market, and some other NR REDCAP terminal devices mainly need to meet a requirement in a wearable market. For an NR REDCAP terminal device that needs to meet the requirement in the IWSN market, a data transmission capability that meets a low data transmission rate and reduces power consumption of the terminal device may be mainly considered. However, for an NR REDCAP terminal device that needs to meet the requirement in the wearable market, a data transmission capability that meets a high data transmission rate and reduces power consumption of the terminal device may be mainly considered.

Based on the foregoing reasons, how to define a capability parameter of a REDCAP terminal device and how to design a method for reporting a capability parameter by a REDCAP terminal device to meet requirements in different application scenarios become urgent problems to be resolved.

In a related technology, a capability of a terminal device may be defined based on a feature associated with a data transmission step (for details, refer to the protocol TS38.822). The terminal device may report a capability feature list (feature list), so that a network device obtains a capability of the terminal device. The capability of the terminal device includes a mandatory capability and an optional capability. The mandatory capability is a capability that the terminal device needs to have, and there is no mandatory requirement for the optional capability of the terminal device. For example, the mandatory capability of the terminal device may include capabilities of the terminal device in aspects of a data transmission waveform (waveform), a modulation (modulation) scheme, a subcarrier spacing (subcarrier spacing, SCS), and a cyclic prefix (cyclic prefix, CP). Using the waveform as an example, a protocol stipulates that for downlink data transmission, the terminal device needs to support a data transmission waveform based on cyclic prefix orthogonal frequency division multiplexing (cyclic prefix orthogonal frequency division multiplexing, CP-OFDM), and that for uplink data transmission, the terminal device needs to support the data transmission waveform based on CP-OFDM and a data transmission waveform based on discrete fourier transform spread orthogonal frequency division multiplexing (discrete fourier transform spread OFDM (orthogonal frequency division multiplexing), DFT-S-OFDM). For another example, a related technology further separately stipulates a mandatory capability and an optional capability of the terminal device in an initial access and mobility (Initial access and mobility) period, a mandatory capability and an optional capability of the terminal device during implementation of data transmission through multiple input multiple output (multiple input multiple output, MIMO), a mandatory capability and an optional capability of the terminal device in receiving a downlink control channel and sending an uplink control channel, and a mandatory capability and an optional capability of the terminal device in a scheduling/HARQ processing aspect.

However, when capabilities of the terminal device are separately defined by using a feature associated with a data transmission step, the capabilities cannot be directly associated with different data transmission requirements in different application scenarios. For example, the IWSN scenario, the video surveillance scenario, and the wearable scenario respectively have different requirements in aspects of energy saving, coverage, and a data transmission rate. If the foregoing technology is based on, capability features in each data transmission step that are associated with different application scenarios need to be separately defined. As a result, capability feature design is fragmented and design is complicated. In addition, signaling consumption in a manner of reporting the capability of the terminal device by reporting the feature list is high.

Embodiments of this application provide an information sending method. A terminal device may send first information to a network device, where the first information indicates that the terminal device is a first-type terminal device (that is, an NR REDCAP terminal device), a capability parameter corresponding to the first-type terminal device includes a first capability set, the first capability set includes a channel bandwidth supported by the terminal device and a quantity of transmit antennas of the terminal device, the channel bandwidth of the terminal device is less than 100 megahertz, and the quantity of transmit antennas of the terminal device is less than 4. In this way, the terminal device may report a type of the terminal device to the network device, so that the network device determines, based on the type of the terminal device, a capability parameter corresponding to the terminal device, thereby reducing resource overheads used by the terminal device to report a capability.

Optionally, the capability parameter corresponding to the first-type terminal device further includes at least one of a second capability set, a third capability set, a fourth capability set, a fifth capability set, a sixth capability set, or a seventh capability set. The second capability set is used to represent a power saving capability of the terminal device, the third capability set is used to represent a coverage enhancement capability and/or a data transmission rate improvement capability of the terminal device, the fourth capability set is used to represent a short-latency processing capability of the terminal device, the fifth capability set is used to represent a small data transmission capability and/or an inactive data transmission capability of the terminal device, the sixth capability set is used to represent a transmission reliability capability of the terminal device, and the seventh capability set is used to represent a URLLC data transmission capability of the terminal device. In other words, a capability set of the first-type terminal device may be defined based on different data transmission requirements, to meet different requirements in different scenarios in aspects such as energy saving, coverage, and a data transmission rate. Therefore, a terminal device manufacturer can implement, based on different requirements in different application scenarios, performance and functions corresponding to the first-type terminal device, and does not need to design a plurality of different types of terminal devices based on different data transmission features, which can avoid market fragmentation caused by excessive types of terminal devices and difficult in managing the terminal devices.

The technical solutions in embodiments of this application may be applied to 5G NR, for example, may be applied to scenarios in an mMTC/MTC service such as an IWSN scenario, a video surveillance scenario, and a wearable scenario. The technical solutions provided in this application may be further applied to a future communications system, such as a sixth generation mobile communications system. This is not limited in this application.

FIG. 1 shows a communications system 100 applicable to this application. The communications system 100 includes a network device 110 and a terminal device 120. The network device 110 communicates with the terminal device 120 by using a wireless network. It should be understood that, the network device 110 in FIG. 1 may include one or more cells. When a transmission direction of the communications system 100 is uplink transmission, the terminal device 120 is a transmit end, and the network device 110 is a receive end. Alternatively, when a transmission direction of the communications system 100 is downlink transmission, the network device 110 is a transmit end, and the terminal device 120 is a receive end.

Figure 2:
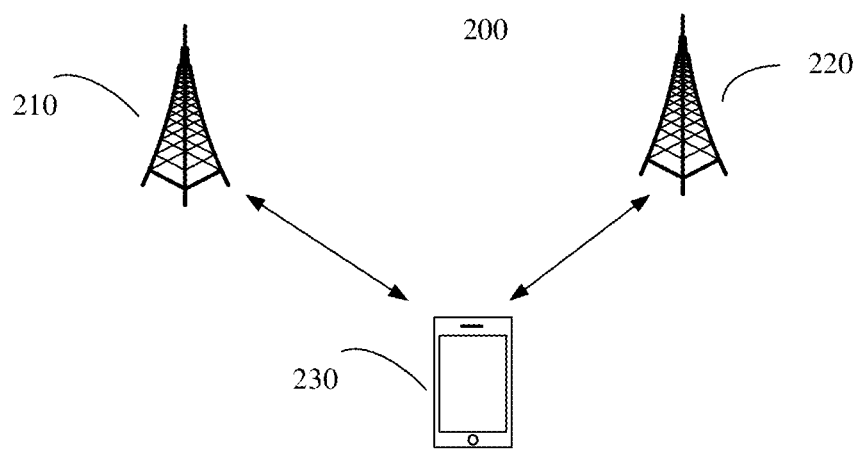
FIG. 2 is a schematic diagram of an architecture of another communications system according to an embodiment of this application.

FIG. 2 shows another communications system 200 applicable to this application. The communications system 200 is in a scenario of dual connectivity/dual connectivity (dual connectivity, DC) or coordinated multipoint transmission/reception (coordinated multipoint transmission/reception, CoMP). The communications system 200 includes a network device 210, a network device 220, and a terminal device 230. The network device 210 is a network device during initial access of the terminal device 230 and is responsible for radio resource control (radio resource control, RRC) communication with the terminal device 230. The network device 220 is added during RRC reconfiguration and is configured to provide an additional radio resource. The terminal device 230 in which CA is configured is connected to the network device 210 and the network device 220. A link between the network device 210 and the terminal device 230 may be referred to as a first link, and a link between the network device 220 and the terminal device 230 may be referred to as a second link.

The foregoing communications system applicable to this application are merely examples for description. A communications system applicable to this application is not limited thereto. For example, a quantity of network devices and a quantity of terminal devices included in the communications system may be other quantities.

The terminal device in embodiments of this application may be user equipment, an access terminal, a subscriber unit, a subscriber station, a mobile station, a remote station, a relay (relay) terminal, a mobile device, a user terminal, a terminal, a wireless communications device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device or another processing device connected to a wireless modem, a vehicle-mounted device, a wearable device, a terminal device in a future 5G network, or a terminal device in a PLMN. This is not limited in embodiments of this application.

By way of example but not limitation, in embodiments of this application, the terminal device may alternatively be a wearable device. The wearable device may also be referred to as a wearable intelligent device, and is a general term for wearable devices, such as glasses, gloves, watches, clothes, and shoes, that are developed by applying wearable technologies to intelligent designs of daily wear. The wearable device is a portable device that is directly worn on a body or integrated into clothes or an accessory of a user. The wearable device is not merely a hardware device, but is used to implement a powerful function through software support, data interaction, and cloud interaction. In a board sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, in embodiments of this application, the terminal device may be a terminal device in an IoT system. The IoT is an important part of future information technology development. A main technical feature of the IoT is connecting an article to a network by using a communications technology, to implement an intelligent network in which a human and a computer are interconnected and things are interconnected. In embodiments of this application, the IoT technology may use, for example, a narrow band (narrow band, NB) technology, to implement massive connection, deep coverage, and power saving of a terminal.

In addition, in embodiments of this application, the terminal device may further include sensors such as an intelligent printer, a train detector, and a gas station. Main functions include collecting data (some terminal devices), receiving control information and downlink data from a network device, sending an electromagnetic wave, and transmitting uplink data to the network device.

The network device in embodiments of this application may be a device configured to communicate with the terminal device. The network device may be a base transceiver station (base transceiver station, BTS), may be a NodeB (NodeB, NB), may be an evolved NodeB (evolved NodeB, eNB or eNodeB), or may be a radio controller in a cloud radio access network (cloud radio access network, CRAN) scenario. Alternatively, the network device may be a relay (Relay) station, a home evolved NodeB (home evolved NodeB, HeNB), a home NodeB (Femto), a micro base station (Pico), an access point, an in-vehicle device, a wearable device, or a network device in a future 5G network. This is not limited in embodiments of this application.

The terminal device or the network device in FIG. 1 or FIG. 2 in embodiments of this application may be implemented by a device or may be a functional module in a device. This is not specifically limited in embodiments of this application. It may be understood that the foregoing function may be a network element in a hardware device, a software function running on dedicated hardware, a virtualized function instantiated on a platform (for example, a cloud platform), or a chip system. In embodiments of this application, the chip system may include a chip, or may include a chip and another discrete component.

Figure 3:
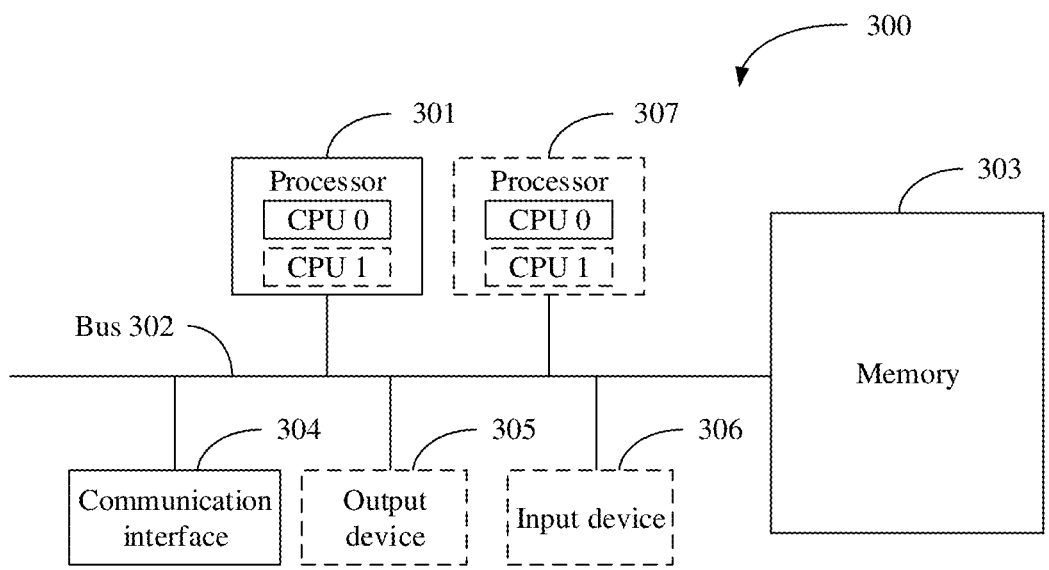
FIG. 3 is a schematic diagram of a structure of a terminal device according to an embodiment of this application.

For example, an apparatus for implementing a function of the terminal device provided in embodiments of this application may be implemented by an apparatus 300 in FIG. 3. FIG. 3 is a schematic diagram of a hardware structure of the apparatus 300 according to an embodiment of this application. The apparatus 300 includes at least one processor 301, configured to implement the function of the terminal device provided in embodiments of this application. The apparatus 300 may further include a bus 302 and at least one communications interface 304. The apparatus 300 may further include a memory 303.

In this embodiment of this application, the processor may be a central processing unit (central processing unit, CPU), a general-purpose processor, a network processor (network processor, NP), a digital signal processor (digital signal processing, DSP), a microprocessor, a microcontroller, or a programmable logic device (programmable logic device, PLD). The processor may be any other apparatus that has a processing function, for example, an application-specific integrated circuit (application-specific integrated circuit, ASIC), a field programmable gate array (field programmable gate array, FPGA) or another programmable logic device, a transistor logic device, a hardware component, a software module, or any combination thereof.

The bus 302 may be configured to transfer information between the foregoing components.

The communications interface 304 is configured to communicate with another device or a communications network such as an Ethernet, a radio access network (radio access network, RAN), or a wireless local area network (wireless local area network, WLAN). The communications interface 304 may be an interface, a circuit, a transceiver, or another apparatus that can implement communication. This is not limited in this application. The communications interface 304 may be coupled to the processor 301. The coupling in embodiments of this application may be an indirect coupling or a communication connection between apparatuses, units, or modules in an electrical form, a mechanical form, or another form, and is used for information exchange between the apparatuses, the units, or the modules.

In embodiments of this application, the memory may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another optical disk storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of instructions or a data structure and that can be accessed by a computer. However, the memory is not limited thereto. The memory may exist independently, or may be coupled to the processor, for example, by using the bus 302. Alternatively, the memory may be integrated with the processor.

The memory 303 is configured to store program instructions, which may be controlled and executed by the processor 301 to implement the method provided in the following embodiments of this application. The processor 301 is configured to invoke and execute the instructions stored in the memory 303, to implement the method provided in the following embodiments of this application.

Optionally, computer-executable instructions in embodiments of this application may also be referred to as application program code. This is not specifically limited in embodiments of this application.

Optionally, the memory 303 may be included in the processor 301.

During specific implementation, in an embodiment, the processor 301 may include one or more CPUs such as a CPU 0 and a CPU 1 in FIG. 3.

During specific implementation, in an embodiment, the apparatus 300 may include a plurality of processors, for example, the processor 301 and a processor 307 in FIG. 3. Each of the processors may be a single-core (single-CPU) processor or a multi-core (multi-CPU) processor. Herein, the processor may be one or more devices, circuits, and/or processing cores configured to process data (for example, computer program instructions).

During specific implementation, in an embodiment, the apparatus 300 may further include an output device 305 and an input device 306. The output device 305 is coupled to the processor 301, and may display information in a plurality of manners. For example, the output device 305 may be a liquid crystal display (liquid crystal display, LCD), a light emitting diode (light emitting diode, LED) display device, a cathode ray tube (cathode ray tube, CRT) display device, or a projector (projector). The input device 306 is coupled to the processor 301, and may receive a user input in a plurality of manners. For example, the input device 306 may be a touchscreen device or a sensing device.

The apparatus 300 may be a general device or a dedicated device. During specific implementation, the terminal device 300 may be an in-vehicle terminal, a transportation device with a built-in computer (processor), or a device having a structure similar to that in FIG. 3. A type of the apparatus 300 is not limited in this embodiment of this application.

Figure 4:
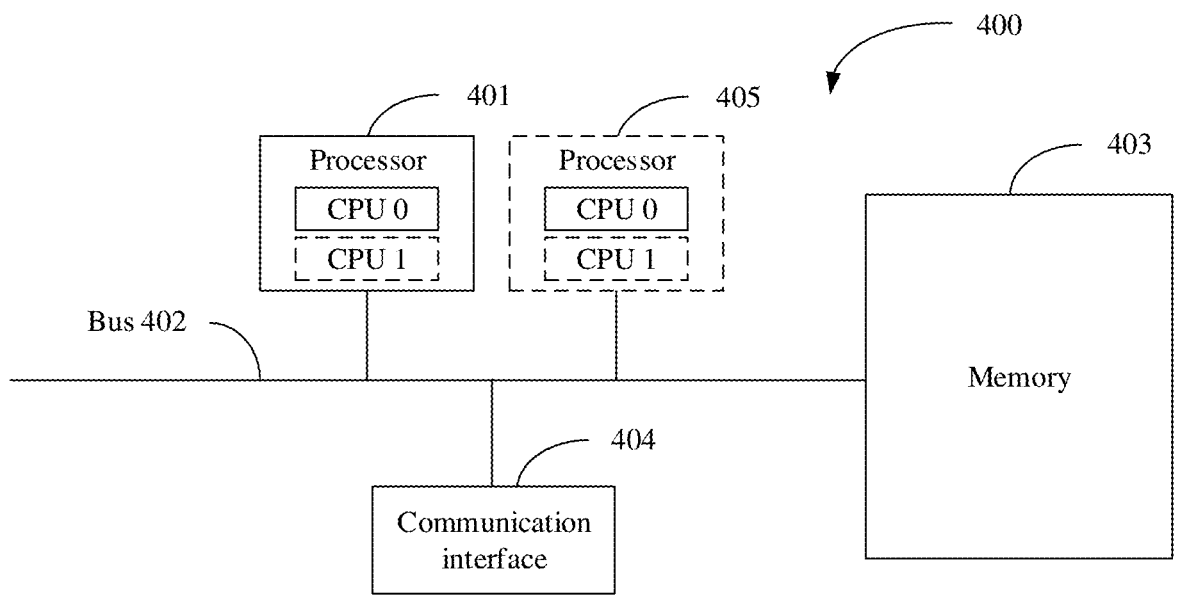
FIG. 4 is a schematic diagram of a structure of a network device according to an embodiment of this application.

For example, an apparatus for implementing a function of the network device provided in embodiments of this application may be implemented by an apparatus 400 in FIG. 4. FIG. 4 is a schematic diagram of a hardware structure of the apparatus 400 according to an embodiment of this application. The apparatus 400 includes at least one processor 401, configured to implement the function of the terminal device provided in embodiments of this application. The apparatus 400 may further include a bus 402 and at least one communications interface 404. The apparatus 400 may further include a memory 403.

The bus 402 may be configured to transfer information between the foregoing components.

The communications interface 404 is configured to communicate with another device or a communications network, such as an Ethernet, a RAN, or a WLAN. The communications interface 404 may be an interface, a circuit, a transceiver, or another apparatus that can implement communication. This is not limited in this application. The communications interface 404 may be coupled to the processor 401.

The memory 403 is configured to store program instructions, which may be controlled and executed by the processor 401 to implement the method provided in the following embodiments of this application. For example, the processor 401 is configured to invoke and execute the instructions stored in the memory 403, to implement the method provided in the following embodiments of this application.

Optionally, the memory 403 may be included in the processor 401.

During specific implementation, in an embodiment, the processor 401 may include one or more CPUs such as a CPU 0 and a CPU 1 in FIG. 4.

During specific implementation, in an embodiment, the apparatus 400 may include a plurality of processors, for example, the processor 401 and a processor 405 in FIG. 4. Each of these processors may be a single-core processor, or may be a multi-core processor. Herein, the processor may be one or more devices, circuits, and/or processing cores configured to process data (for example, computer program instructions).

The apparatus 400 may be a general device or a dedicated device. During specific implementation, the apparatus 400 may be an in-vehicle terminal, a transportation device with a built-in computer (processor), or a device having a structure similar to that in FIG. 4. A type of the apparatus 400 is not limited in this embodiment of this application.

In embodiments of this application, the terminal device or the network device includes a hardware layer, an operating system layer running above the hardware layer, and an application layer running above the operating system layer. The hardware layer includes hardware such as a CPU, a memory management unit (memory management unit, MMU), and a memory (also referred to as a main memory). The operating system may be any one or more computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by the terminal device or the network device, or a functional module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage device (for example, a hard disk, a floppy disk, or a magnetic tape), an optical disc (for example, a CD or a digital versatile disc (digital versatile disc, DVD)), a smart card, and a flash storage device (for example, an EPROM, a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

A network architecture and a service scenario described in embodiments of this application are intended to describe the technical solutions in embodiments of this application more clearly, and do not constitute any limitation on the technical solutions provided in embodiments of this application. A person of ordinary skill in the art may know that with evolution of the network architecture and emergence of a new service scenario, the technical solutions provided in embodiments of this application are also applicable to similar technical problems.

In embodiments of this application, a carrier may be equivalent to a cell.

The following describes technical solutions in embodiments of this application with reference to the accompanying drawings in embodiments of this application. In the descriptions of this application, unless otherwise stated, "at least one" refers to one or more, and "a plurality of" refers to two or more. In addition, to clearly describe the technical solutions in embodiments of this application, words such as "first" and "second" are used in embodiments of this application to distinguish between same items or similar items that have basically the same functions or purposes. A person skilled in the art may understand that the words such as "first" and "second" do not limit a quantity or an execution sequence, and the words such as "first" and "second" do not indicate a definite difference.

For ease of understanding, an information receiving and sending method provided in embodiments of this application is specifically described below with reference to the accompanying drawings.

Figure 5:
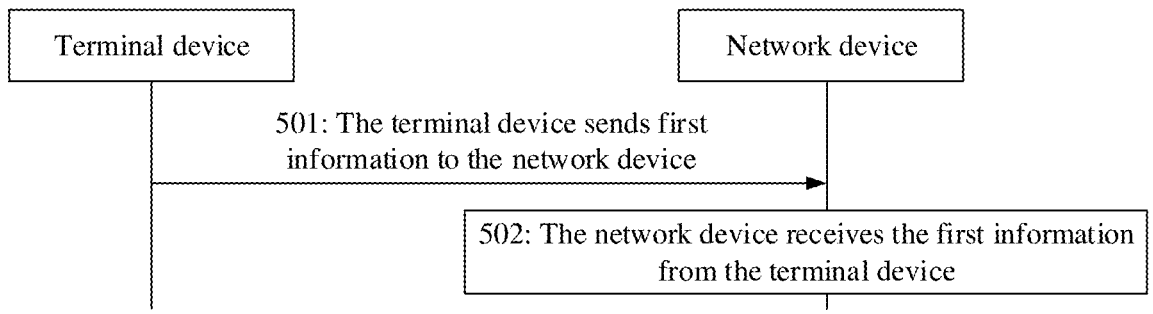
FIG. 5 is a schematic diagram of signal interaction applicable to an information sending and receiving method according to an embodiment of this application.

As shown in FIG. 5, an embodiment of this application provides an information sending and receiving method, including the following steps.

501. A terminal device sends first information to a network device.

The first information indicates that the terminal device is a first-type terminal device, or the first information indicates a category (category) or a type (type) of the terminal device, and the category or the type of the terminal device is a first type. A capability parameter corresponding to the first-type terminal device includes a first capability set (capability set). In other words, the first information may implicitly indicate (indirectly indicate) the first capability set. Alternatively, the first information may be used to indicate that the capability parameter corresponding to the first-type terminal device includes the first capability set, that is, the first information may explicitly indicate (directly indicate) the first capability set.

An NR system may further include another terminal device, such as a second-type terminal device. The first-type terminal device and the second-type terminal device may have at least one of the following distinguishing features.

1. Bandwidth capabilities are different. The bandwidth capability may be represented by a carrier bandwidth. For example, the carrier bandwidth of the first-type terminal device is not greater than 50 MHz, such as at least one of 50 MHz, 40 MHz, 20 MHz, 15 MHz, 10 MHz, or 5 MHz; and the carrier bandwidth of the second-type terminal device is greater than 50 MHz.

2. Quantities of transmit/receive antennas are different. For example, the first-type terminal device may support 2-Rx and 1-Tx (two receive antennas and one transmit antenna) or 1-Rx and 1-Tx (one receive antenna and one transmit antenna). The second-type terminal device may support 4-Rx and 2-Tx (four receive antennas and two transmit antennas). It may be understood that, in a condition of implementing a same data transmission rate, because a quantity of transmit/receive antennas of the first-type terminal device is less than a quantity of transmit/receive antennas of the second-type terminal device, a maximum coverage area that can be implemented in data transmission between the first-type terminal device and a base station is less than a maximum coverage area that can be implemented in data transmission between the second-type terminal device and the base station.

3. Maximum uplink transmit power is different. For example, maximum uplink transmit power of the first-type terminal device may be a value in four decibels relative to one milliwatt (dBm) to 20 dBm, and maximum uplink transmit power of the second-type terminal device may be 23 dBm or 26 dBm.

4. Protocol versions are different. The first-type terminal device may be a terminal device in an NR release-17 (release-17, Rel-17) or a version later than the NR Rel-17. The second-type terminal device may be, for example, a terminal device in an NR release-15 (release-15, Rel-15) or an NR release-16 (release-16, Rel-16). The second-type terminal device may also be referred to as an NR legacy (NR legacy) terminal device.

5. Carrier aggregation capabilities are different. For example, the first-type terminal device does not support carrier aggregation, and the second-type terminal device can support carrier aggregation. For another example, both the first-type terminal device and the second-type terminal device can support carrier aggregation. However, a maximum quantity of aggregated carriers simultaneously supported by the first-type terminal device is less than a maximum quantity of aggregated carriers simultaneously supported by the second-type terminal device. For example, the first-type terminal device simultaneously supports aggregation of a maximum of two carriers, and the second-type terminal device can simultaneously support aggregation of a maximum of five carriers or 32 carriers.

6. Duplex capabilities are different. For example, the first-type terminal device supports half-duplex frequency division duplex (frequency division duplex, FDD), and the second-type terminal device supports full-duplex FDD.

7. Data processing time capabilities are different. For example, a minimum latency between receiving downlink data by the first-type terminal device and sending feedback for the downlink data by the first-type terminal device is greater than a minimum latency between receiving downlink data by the second-type terminal device and sending feedback for the downlink data by the second-type terminal device, and/or a minimum latency between sending uplink data by the first-type terminal device and receiving feedback for the uplink data by the first-type terminal device is greater than a minimum latency between sending uplink data by the second-type terminal device and receiving feedback for the uplink data by the second-type terminal device.

8. Processing capabilities (ability/capability) are different. For example, a baseband processing capability of the first-type terminal device is lower than a baseband processing capability of the second-type terminal device. The baseband processing capability may include at least one of the following: a maximum quantity of MIMO layers supported by a terminal device during data transmission, a quantity of HARQ processes supported by the terminal device, or a maximum transport block size (transmission block size, TBS) supported by the terminal device.

9. Uplink and/or downlink transmission peak rates/peak rates are different. A transmission peak rate/peak rate is a maximum data transmission rate/maximum data rate (maximum data rate) that can be reached by a terminal device in unit time (for example, per second). An uplink peak rate may be a maximum uplink data rate, and a downlink peak rate may be a maximum downlink data rate.

An uplink peak rate supported by the first-type terminal device may be lower than an uplink peak rate supported by the second-type terminal device, and/or a downlink peak rate supported by the first-type terminal device may be lower than a downlink peak rate supported by the second-type terminal device. For example, the uplink peak rate of the first-type terminal device is less than or equal to 50 Mbps, the downlink peak rate of the first-type terminal device is less than or equal to 150 Mbps, the uplink peak rate of the second-type terminal device is greater than or equal to 50 Mbps, and the downlink peak rate of the second-type terminal device is greater than or equal to 150 Mbps. For another example, the uplink peak rate or the downlink peak rate of the first-type terminal device is in an order of magnitude of a hundred Mbps, and the uplink peak rate or the downlink peak rate of the second-type terminal device is in an order of magnitude of Gbps.

10. Buffer (buffer) sizes are different. A buffer may be understood as a total size of a layer 2 (Layer 2, L2) buffer, and indicates the sum of a quantity of bytes cached for all radio bearers by a terminal device in a radio link control (radio link control, RLC) sending window and radio link control receiving and reordering window and a quantity of bytes cached for all the radio bearers by the terminal device in a data packet convergence protocol (packet data convergence protocol, PDCP) reordering window. Alternatively, the buffer may be understood as a total quantity of soft channel bits that can be used for HARQ processing.

Optionally, in this embodiment of this application, the first-type terminal device may be a REDCAP terminal device in an NR system, or the first-type terminal device may be referred to as a low-capability terminal device, a reduced-capability terminal device, REDCAP UE, Reduced Capacity UE, mMTC UE, or the like. The second-type terminal device may be a terminal device with a legacy capability/normal capability/high capability, or may be referred to as a legacy terminal device or Legacy UE or an LTE terminal device. The second-type terminal device and the first-type terminal device have the foregoing distinguishing features.

It should be noted that, if no special descriptions are provided, the terminal device in the following refers to the first-type terminal device, and the first-type terminal device may be, for example, an NR REDCAP terminal device.

In a possible design, the first capability set corresponding to the first-type terminal device includes a channel bandwidth supported by the terminal device and a quantity of transmit antennas of the terminal device. The channel bandwidth of the terminal device is less than 100 MHz, and the quantity of transmit antennas of the terminal device is less than 4. Optionally, the first capability set may further include a quantity of receive antennas of the terminal device, and the quantity of receive antennas is less than or equal to 4. Because both the channel bandwidth supported by the terminal device and the quantity of transmit antennas of the terminal device may directly affect costs and implementation complexity of the terminal device, the first capability set may be used to represent costs and/or implementation complexity of the terminal device. It may be considered that the first capability set is a basic capability set/mandatory capability set of the terminal device, and the basic capability set/mandatory capability set includes a mandatory capability parameter of the terminal device.

In another possible design, the first capability set corresponding to the first-type terminal device includes a quantity of transmit antennas of the terminal device. The quantity of transmit antennas of the terminal device is less than or equal to 4. It may be understood that the quantity of transmit antennas affects a design of a radio frequency (radio frequency, RF) channel of the terminal device and a component size of the terminal device, which significantly affects costs of the terminal device. Therefore, even if a mandatory capability set includes only the quantity of transmit antennas, reduction in the costs of the terminal device can still be represented. In still another possible design, the first capability set corresponding to the first-type terminal device includes a channel bandwidth supported by the terminal device. The channel bandwidth of the terminal device is less than 100 MHz.

The channel bandwidth supported by the terminal device (or the channel bandwidth of the terminal device) refers to a maximum channel bandwidth (a maximum frequency resource) supported by the terminal device, that is, a bandwidth capability of the terminal device. The bandwidth capability of the terminal device may be understood as a channel bandwidth supported by the terminal device on an uplink NR RF carrier or a downlink NR RF carrier, that is, the channel bandwidth of the terminal device corresponds to an uplink NR RF carrier bandwidth or a downlink NR RF carrier bandwidth. In a time division duplex (time division multiplexing, TDD) system, the bandwidth capability of the terminal device may be understood as a channel bandwidth supported by the terminal device on an NR RF carrier. The terminal device may perform data transmission (including receiving downlink data and/or sending uplink data) with the network device (for example, a base station) based on the bandwidth capability of the terminal device. For example, it is assumed that a bandwidth capability of a terminal device is 20 MHz. When the terminal device performs data transmission with a base station, the terminal device may be scheduled in all transmission bandwidths except a guard bandwidth in a frequency resource of 20 MHz, or radio frequency component processing and baseband component processing of the terminal device may process data transmitted in a maximum bandwidth of 20 MHz.

In an implementation, the first capability set may include at least one of 5 MHz, 10 MHz, 20 MHz, or 50 MHz. In this case, it may be considered that all bandwidth capabilities included in the first capability set are mandatory capabilities. In other words, the terminal device can support at least one bandwidth capability in 5 MHz, 10 MHz, 20 MHz, or 50 MHz.

In another implementation, the terminal device can support at least one bandwidth capability in 5 MHz, 10 MHz, 15 MHz, 20 MHz, 40 MHz, or 50 MHz.

In still another implementation, the first capability set includes only 20 MHz, that is, 20 MHz is a mandatory capability of the first-type terminal device. A remaining data transmission bandwidth, for example, 5 MHz or 10 MHz, may be an optional capability of the terminal device.

In still another implementation, the first capability set includes only at least two of 5 MHz, 10 MHz, 15 MHz, and 20 MHz. For example, the first capability set includes 20 MHz and 15 MHz, or the first capability set includes 10 MHz, 15 MHz, and 20 MHz.

Different bands (frequency band) are used in different network deployment, and different bands correspond to different system bandwidths. Therefore, bandwidth capability parameters included in a bandwidth capability set have different values, so that the terminal device performs data transmission with the network device on different bands. In this way, an application market range of the terminal device can be expanded, and batch production of the terminal device can be facilitated, thereby facilitating ecological development of this type of terminal device. For example, if a band bandwidth or a system bandwidth corresponding to a band with network deployment is 10 MHz or 15 MHz (for example, a 10 MHz bandwidth near a 700 MHz band with network deployment in Europe or the like, or a 15 MHz bandwidth near 2.1 GHz with network deployment in Europe), a terminal device whose bandwidth capability is not greater than 15 MHz can perform data transmission with a network device in the network deployment. For another example, if a band bandwidth with network deployment is 20 MHz or 50 MHz, a terminal device whose bandwidth capability is less than 20 MHz or 50 MHz included in the first capability set can perform data transmission with a network device in the network deployment.

In still another implementation, the first-type terminal device supports at least one bandwidth capability, or the first capability set includes at least one bandwidth capability, and the at least one bandwidth capability is less than 20 MHz or less than 50 MHz.

In this embodiment of this application, in an implementation, a bandwidth capability less than 20 MHz may be a mandatory capability of the first-type terminal device, and the mandatory capability may include at least one bandwidth capability less than 20 MHz, for example, 5 MHz, 10 MHz, or 15 MHz. In another implementation, a bandwidth capability less than 50 MHz may be a mandatory capability of the first-type terminal device, and the mandatory capability may include at least one bandwidth capability less than 50 MHz.

The terminal device may separately report another bandwidth capability (for example, 5 MHz, 10 MHz, or 50 MHz)

other than the mandatory capability, or report the another bandwidth capability by using another capability set. In other words, in addition to 20 MHz, the bandwidth capability of the terminal device may be 10 MHz, 5 MHz, or 50 MHz. A terminal device with a bandwidth capability of 10 MHz may work in a system whose system bandwidth is not less than 10 MHz, a terminal device with a bandwidth capability of 5 MHz may work in a system whose system bandwidth is not less than 5 MHz, a terminal device with a bandwidth capability of 20 MHz may work in a system whose system bandwidth is not less than 20 MHz, and a terminal device with a bandwidth capability of 50 MHz may work in a system whose system bandwidth is not less than 50 MHz. The system bandwidth may be understood as a carrier bandwidth of the network device. It may be understood that a terminal device with a relatively small data transmission bandwidth (for example, 5 MHz or 10 MHz) is applied to a scenario in which a data transmission rate requirement is not high, for example, an IWSN scenario or an economical video surveillance scenario. A terminal device with a relatively large data transmission bandwidth (for example, 50 MHz) is applied to a scenario in which a data transmission rate requirement is relatively high, for example, a wearable scenario.

In addition, the channel bandwidth that is in the first capability set and that is supported by the terminal device may be a range, for example, 5 MHz to 10 MHz, 10 MHz to 20 MHz, or 5 MHz to 50 MHz.

A total quantity of transmit/receive antennas of the terminal device may be understood as a quantity of actual physical antennas of the terminal device, or may be a quantity of antenna ports used for data transmission. The quantity of antenna ports used for data transmission is less than or equal to the quantity of actual physical antennas of the terminal device. It should be noted that in this embodiment of this application, the quantity of receive antennas of the terminal device is X, which may also be understood as that a maximum value of a quantity of PDSCH MIMO layers supported by the terminal device is X, where X is an integer greater than or equal to 1. For example, a quantity of receive antennas supported by the terminal device is 2, which may be understood as that a maximum value of a quantity of PDSCH MIMO layers supported by the terminal device is 2. The quantity of transmit antennas of the terminal device is Y, which may be understood as that a quantity of antenna ports corresponding to uplink data transmission of the terminal device is Y, where Y is an integer greater than or equal to 1. For example, the quantity of transmit antennas of the terminal device is 1, which may be understood as that the quantity of antenna ports corresponding to uplink data transmission of the terminal device is 1. Alternatively, a quantity of transmit antennas supported by the terminal device may be represented by whether sounding reference signal (sounding reference signal, SRS) sending switching (switch) are supported and a quantity of PUSCH MIMO layers. For example, if the terminal device does not support SRS sending switching, and the quantity of PUSCH MIMO layers is 1, that is, the terminal device supports single-port MIMO transmission, it may be determined that the quantity of transmit antennas supported by the terminal device is 1.

In addition, a quantity of transmit/receive antennas included by the terminal device in the first capability set may be a range. For example, the quantity of transmit antennas may be 1-2, and the quantity of receive antennas may be 1-2, or the like.

In an implementation, the first capability set may include at least one of the following: transmit/receive antenna configurations are one transmit antenna and two receive antennas (which is referred to as 1T2R for short), one transmit antenna and one receive antenna (which is referred to as 1T1R for short), and two transmit antennas and two receive antennas (which is referred to as 2T2R for short). In this case, it may be considered that all antenna capabilities included in the first capability set are mandatory capabilities. In other words, the terminal device may support at least one of 1T2R, 1T1R, or 2T2R. In another implementation, the first capability set may include only 1T2R. The terminal device may separately report another antenna capability supported by the terminal device, or report the another antenna capability by using another capability set. In other words, 1T2R is a mandatory capability of the terminal device. A remaining transmit/receive antenna configuration (for example, 1T1R or 2T2R) may be an optional capability of the terminal device. It may be understood that a terminal device configured with fewer transmit/receive antennas (for example, 1T1R) is applicable to a scenario in which a data transmission rate requirement is relatively low, for example, an IWSN scenario in which a data transmission rate is not greater than 2 Mbps. In this way, costs can be further reduced during working of the terminal device. A terminal device configured with more antennas (for example, 2T2R) is applicable to a scenario in which a data transmission requirement is relatively high, for example, an intelligent wearable device scenario. In this way, a data transmission rate requirement in the intelligent wearable scenario can be met.

Optionally, the first capability set may further include at least one of a quantity of HARQ processes supported by the terminal device, a maximum modulation scheme for uplink data transmission, a maximum modulation scheme for downlink data transmission, a PDSCH processing capability, or a PUSCH processing capability.

The quantity of HARQ processes supported by the terminal device is less than or equal to 16. A downlink (downlink, DL) HARQ process is used as an example. A DL HARQ process refers to a process in which a base station schedules data transmission one time and the base station receives a positive acknowledgement (acknowledge, ACK)/negative acknowledgement (negative acknowledge, NACK). The quantity of HARQ processes refers to a quantity of concurrent HARQs, that is, a quantity of data transmissions that can be simultaneously processed by the terminal device. A larger quantity of HARQ processes indicates a stronger parallel data processing capability of the terminal device, and correspondingly indicates a higher requirement for component costs of the terminal device and a processing capability of the terminal device.

The maximum modulation scheme for uplink data transmission is 64QAM, and the maximum modulation scheme for downlink data transmission is 64QAM. A lower modulation order corresponding to a maximum data transmission modulation scheme that can be supported by the terminal device indicates lower construction costs of the terminal device. This is because a modulation signal corresponding to higher-order modulation varies in a large range and a peak-to-average ratio of instant power is high, which increases construction costs of a power amplifier.

Optionally, the first capability set may further include a buffer size of the terminal device, and the buffer size may be used to indicate a maximum quantity of information bits that can be received or sent by the terminal device in one time of data transmission scheduling between the terminal device and a base station. The buffer size of the terminal device may be represented by a TBS size. It may be understood that, a larger value of a maximum quantity of information bits that can be transmitted by the terminal device in one time of data transmission scheduling indicates higher component costs of the terminal device.

Optionally, the first capability set may further include another data transmission feature associated with costs or implementation complexity. For example, the first capability set may further include a demodulation reference signal (demodulation reference signal, DMRS) type. Currently, in the NR system, the DMRS type may include a DMRS type 1 and a DMRS type 2. A main difference between the DMRS type 1 and the DMRS type 2 lies in that quantities of antenna ports used for implementing simultaneous data transmission are different. For example, if there is only one front-loaded DMRS symbol, quantities of antenna ports respectively supported by the DMRS type 1 and the DMRS type 2 are 4 and 6. If there are two front-loaded DMRS symbols, quantities of antenna ports respectively supported by the DMRS type 1 and the DMRS type 2 are 8 and 12. A length of a front-loaded DMRS symbol may be one OFDM symbol or may be two OFDM symbols. Front-loaded DMRS symbols of different lengths can support different quantities of antenna ports. For example, in a high-speed movement scenario, a larger length of a front-loaded DMRS symbol indicates better channel estimation performance. In addition, currently, a DMRS configuration in NR further includes an extra (additional) DMRS symbol. The network device may configure one extra DMRS or two extra DMRSs for the terminal device. A quantity of OFDM symbols occupied by each additionally configured DMRS is the same as a quantity of OFDM symbols occupied by a front-loaded DMRS. For example, if one front-loaded DMRS occupies a length of two OFDM symbols, each additional DMRS also occupies a length of two OFDM symbols. Currently, the second-type terminal device can support one front-loaded DMRS symbol and two additional DMRS symbols. However, based on a quantity of receive/transmit antennas of the first-type terminal device and a main application scenario (for example, a non-high-speed movement IWSN scenario, a video surveillance scenario, and a wearable scenario), a DMRS type that can be supported by the first-type terminal device is the type 1. Further, the first-type terminal device can support a DMRS configuration, in the type 1, of one front-loaded DMRS symbol and two additional DMRS symbols. In this way, implementation complexity of the first-type terminal device can be reduced.

Specifically, the PDSCH processing capability corresponds to a first time offset, and the first time offset refers to a time offset between receiving the last symbol (symbol) of a PDSCH by the terminal device and sending the first symbol of a PUCCH by the terminal device. The PDSCH processing capability meets a capability 1, that is, the first time offset is greater than or equal to a first preset threshold. A PUCCH is carried in HARQ-ACK feedback corresponding to a PDSCH, and the HARQ-ACK feedback includes any one of the following: an ACK, a NACK, or discontinuous transmission (discontinuous transmission, DTX).

As shown in Table 2, the first time offset separately corresponds to different lower limit values in different SCSs and different DMRS configurations. In Table 2, SCSs represent maximum values of an SCS corresponding to the PDSCH and an SCS corresponding to the PUCCH.

TABLE 2

| DMRS configuration | SCS = 15 (kilohertz) KHz | SCS = 30 KHz | SCS = 60 KHz | SCS = 120 KHz |
| --- | --- | --- | --- | --- |
| Only a front-loaded DMRS is configured | 0.57 ms | 0.36 ms | 0.30 ms | 0.18 ms |
| A front-loaded DMRS and an additional DMRS are configured | 0.92 ms | 0.46 ms | 0.36 ms | 0.21 ms |

For example, it may be learned from Table 2 that when "SCS=15 KHz" and the DMRS configuration is a front-loaded DMRS, a lower limit value of the first time offset is 0.57 ms, that is, the first time offset is greater than or equal to 0.57 ms. Optionally, the first capability set includes a parameter of the first time offset between the PDSCH and the PUCCH, and a value of the parameter is 0.57 ms.

The terminal device supports the PUSCH processing capability, and the PUSCH processing capability corresponds to a second time offset. The second time offset refers to a time offset between receiving the last symbol of a PDCCH by the terminal device and sending, by the terminal device, the first symbol of a PUSCH scheduled by the PDCCH. The PUSCH processing capability meets a capability 2, that is, the second time offset is greater than or equal to a second preset threshold.

As shown in Table 3, the second time offset separately corresponds to different lower limit values in different SCSs. In Table 3, SCSs represent maximum values of an SCS corresponding to the PDCCH and an SCS corresponding to the PUSCH.

TABLE 3

| SCS = 15 KHz | SCS = 30 KHz | SCS = 60 KHz | SCS = 120 KHz |
| --- | --- | --- | --- |
| 0.71 ms | 0.43 ms | 0.41 ms | 0.32 ms |

For example, it may be learned from Table 3 that when "SCS=30 KHz", a lower limit value of the second time offset is 0.43 ms, that is, the second time offset is greater than or equal to 0.43 ms. Optionally, the first capability set includes a parameter of the second time offset between the PDCCH and the PUSCH, and a value of the parameter is 0.43 ms.

In this embodiment of this application, the PDSCH processing capability corresponds to the first time offset or corresponds to a PDSCH processing time capability 1 of an NR legacy (NR legacy) terminal device. The PUSCH processing capability corresponds to the second time offset or corresponds to an NR legacy PUSCH processing time capability 1. The NR legacy terminal device may be understood as the second-type terminal device. To be specific, the PDSCH processing capability of the first-type terminal device (for example, an NR REDCAP terminal device) may be the same as the PDSCH processing time capability 1 of the NR legacy terminal device, the PUSCH processing capability of the NR REDCAP terminal device may be the same as the NR legacy PUSCH processing time capability 1, and there is no need to relax (extend) the PDSCH processing capability and the PUSCH processing capability. This is because even if the PDSCH processing capability and/or the PUSCH processing capability of the NR REDCAP terminal device are/is relaxed, implementation complexity or costs of the first-type terminal device are not reduced, and a data transmission latency can be ensured when a processing capability the same as the NR legacy processing time capability 1 is remained, to meet a data transmission requirement. Therefore, the PDSCH processing capability of the first-type terminal device may be set to be the same as the PDSCH processing capability of the second-type terminal device, and the PUSCH processing capability of the first-type terminal device may be set to be the same as the PUSCH processing capability of the second-type terminal device.

In conclusion, for example, the first capability set corresponding to the first-type terminal device may include any one of the following combinations.

Combination 1: The channel bandwidth of the terminal device is 20 MHz, the quantity of transmit/receive antennas is 1T2R, and the maximum modulation scheme for uplink and downlink data transmission is 64QAM. The combination 1 helps reduce a data transmission capability of the terminal device. A peak rate may reach dozens of Mbps to 100 Mbps, and may meet a data transmission requirement of the first-type terminal device in most MTC scenarios, for example, the video surveillance scenario, the IWSN scenario, and the wearable scenario that are mentioned above.

Combination 2: The channel bandwidth of the terminal device is 20 MHz, the quantity of transmit/receive antennas is 1T2R, the maximum modulation scheme for uplink and downlink data transmission is 64QAM, the first time offset is any value listed in Table 2, and the second time offset is any value listed in Table 3. The combination 2 cannot only implement an effect of the combination 1, but also have a capability of relatively quickly processing data, and is more applicable to an application scenario relatively sensitive to a latency requirement, for example, an IWSN scenario.

Combination 3: The channel bandwidth of the terminal device is 5 MHz or 10 MHz, the quantity of transmit/receive antennas is 1T1R, and the maximum modulation scheme for uplink and downlink data transmission is 64QAM. The combination 3 may further reduce costs and complexity of the terminal device, and is relatively applicable to a scenario in which a data transmission rate requirement is not high, for example, an IWSN scenario or an economical video surveillance scenario.

Combination 4: The channel bandwidth of the terminal device is 20 MHz, the quantity of transmit/receive antennas is 1T1R, and the maximum modulation scheme for uplink and downlink data transmission is 64QAM.

Combination 5: The channel bandwidth of the terminal device is 20 MHz, and the quantity of transmit/receive antennas is 1T1R.

Combination 6: The channel bandwidth of the terminal device is 20 MHz, the quantity of transmit/receive antennas is 1T2R, the maximum modulation scheme for uplink and downlink data transmission is 64QAM, the PDSCH processing capability is the NR legacy PDSCH processing time capability 1, and the PUSCH processing capability is the NR legacy PUSCH processing time capability 1.

Combination 7: The channel bandwidth of the terminal device is greater than 20 MHz and not greater than 50 MHz, for example, 40 MHz, and the quantity of transmit/receive antennas is 1T1R.

Combination 8: The channel bandwidth of the terminal device is greater than 20 MHz and not greater than 50 MHz, for example, 40 MHz, the quantity of transmit/receive antennas is 1T1R, and the maximum modulation scheme for uplink and downlink data transmission is 64QAM.

Combination 9: The channel bandwidth of the terminal device is greater than 20 MHz and not greater than 50 MHz, for example, 40 MHz, the quantity of transmit/receive antennas is 1T1R, the maximum modulation scheme for uplink and downlink data transmission is 64QAM, the PDSCH processing capability is the NR legacy PDSCH processing time capability 1, and the PUSCH processing capability is the NR legacy PUSCH processing time capability 1.

Optionally, in the foregoing combinations, the channel bandwidths, the quantities of transmit/receive antennas, or the like of the terminal device are merely examples, and may be replaced with other values. This is not limited in this application.

Optionally, the first capability set may include a subcarrier spacing. The first capability set corresponding to the first-type terminal device may include a subcarrier spacing corresponding to any one of the following manners. In a manner, the first capability set includes a 15 KHz subcarrier spacing and a 30 KHz subcarrier spacing, both the 15 KHz subcarrier spacing and the 30 KHz subcarrier spacing are mandatory subcarrier spacings, and there is no other optional subcarrier spacing. In another manner, the first capability set includes a 15 KHz subcarrier spacing and a 30 KHz subcarrier spacing, the 15 KHz subcarrier spacing and the 30 KHz subcarrier spacing are mandatory subcarrier spacings, and a 60 KHz subcarrier spacing may be used as an optional capability. In still another manner, the first capability set includes a 15 KHz subcarrier spacing, a 30 KHz subcarrier spacing, and a 60 KHz subcarrier spacing, and the 15 KHz subcarrier spacing, the 30 KHz subcarrier spacing, and the 60 KHz subcarrier spacing are all mandatory subcarrier spacings.

In some embodiments, the capability parameter corresponding to the first-type terminal device further includes at least one of a second capability set, a third capability set, a fourth capability set, a fifth capability set, a sixth capability set, or a seventh capability set. It may be considered that both the first capability set and at least one of the second capability set to the seventh capability set are mandatory capability sets, or it may be considered that at least one of the second capability set to the seventh capability set is an optional or candidate capability set. The second capability set is used to represent a power saving capability of the terminal device, the third capability set is used to represent a coverage enhancement capability and/or a data transmission rate improvement capability of the terminal device, the fourth capability set is used to represent a short-latency processing capability of the terminal device, the fifth capability set is used to represent a small data transmission capability and/or an inactive data transmission capability of the terminal device, the sixth capability set is used to represent a transmission reliability capability of the terminal device, and the seventh capability set is used to represent a URLLC data transmission capability of the terminal device. In other words, the capability parameter of the first-type terminal device may include a plurality of different capability sets. Different capability sets correspond to different data transmission performance requirements. The data transmission performance requirement may include, for example, a power saving requirement, a coverage requirement, a data transmission rate requirement, a short-latency processing requirement, a small data transmission requirement and/or an inactive data transmission requirement, or a URLLC data transmission requirement. In this way, a plurality of different capability sets may be defined to meet different requirements in different scenarios, and help each terminal manufacturer to implement, based on a corresponding requirement in an application scenario, a terminal device capability adapted to the requirement in the application scenario.

Different capability sets include capabilities (or referred to as capability features/features (feature)) corresponding to different data transmission performance requirements. The capability feature of the terminal device may be used to represent a data transmission capability that can be supported by the terminal device during data transmission with the network device. The network device may complete data transmission with the terminal device in a data transmission capability range supported by the terminal device and by using a data transmission technology adapted to the data transmission capability.

A capability feature included in the second capability set is associated with power consumption of the terminal device. The network device may determine, based on the capability feature in the second capability set, a data transmission manner adapted to the capability feature, to reduce power consumption of the terminal device. The second capability set may also be referred to as an energy saving capability set. The second capability set includes at least one of the following: a maximum quantity of pieces of DCI with different DCI sizes (size) that is supported by the terminal device, the terminal device supports cross slot scheduling (cross slot scheduling), the terminal device supports reception of a WUS, the terminal device supports RRM measurement relaxation of a neighboring cell, the terminal device supports reception of a WUS based on a PDCCH, the terminal device supports reduced-power data transmission in an idle state (idle state) or an in active state (inactive state) (for example, the terminal device supports a paging (paging) enhancement technology), or the terminal device supports extended discontinuous reception (extended discontinuous reception, eDRX).

It may be understood that data transmission between the terminal device and the network device may be scheduled by the network device. In this implementation, the terminal device needs to blindly detect a PDCCH to determine whether the network device schedules the terminal device, and determines specific scheduling information based on DCI carried in the PDCCH to complete data transmission. If the terminal device detects a larger quantity of pieces of DCI with different DCI sizes, it indicates that the terminal device performs a larger quantity of times of blind detection, and correspondingly, power consumption of the terminal device is larger. Therefore, a maximum quantity of pieces of DCI with different DCI sizes that is supported by the terminal device in detection is limited in a cell, so that an upper limit of power consumption consumed by the terminal device during blind detection of the PDCCH may be limited to a certain extent. In other words, the maximum quantity of pieces of DCI with different DCI sizes that is supported by the terminal device may assist the network device in implementing data transmission with the terminal device by using an adapted data transmission technology, thereby reducing power consumption of the terminal device for detecting the PDCCH.

A maximum quantity of pieces of DCI with different DCI sizes that is supported by the first-type terminal device in detection in a cell is less than 4. For example, a maximum quantity of pieces of DCI with different sizes that is supported by the terminal device in detection in a cell may be 2, and the two pieces of DCI with different sizes may be distributed in different search space (search space, SS). For example, there is one DCI size in common search space (common search space, CSS) configured for the terminal device, and there is another DCI size in terminal device specific search space (UE specific search space, USS). Alternatively, different DCI sizes may be distinguished based on a radio network temporary identity (radio network temporary identity, RNTI). For example, a UE specific RNTI (UE specific RNTI) corresponds to one DCI size, and a common (common) RNTI corresponds to another DCI size. As an optional capability, the terminal device may support detection of DCI with three DCI sizes in a cell. In addition, the maximum quantity of pieces of DCI with different DCI sizes that is supported by the terminal device in the second capability set may a range, for example, 1 to 4.

Cross slot scheduling means that control information used to schedule data transmission of the terminal device is not in a same slot as data transmission determined by the terminal device based on the control information. For example, it is assumed that a channel carrying the control information is represented by a PDCCH, a channel carrying data transmission determined based on the control information is represented by a PDSCH. In cross slot scheduling, the PDCCH and the PDSCH are not in a same slot. For example, downlink data transmission is used as an example. After detecting the PDCCH and obtaining, through parsing, DCI carried in the PDCCH, the terminal device may determine a resource occupied by scheduled data transmission, receive data sent by the network device on the corresponding resource, and then process the received data (processing includes but is not limited to demodulation and decoding). On the contrary, if the terminal device does not support a cross slot scheduling capability, that is, the PDCCH and the PDSCH are in a same slot, when detecting the PDCCH, the terminal device in unable to predict a frequency resource occupied by the PDSCH scheduled by the PDCCH. Therefore, the terminal device can only cache data in a maximum frequency resource range that can be supported while detecting the PDCCH. After obtaining, through parsing, the DCI carried in the PDCCH, the terminal device determines, based on indication of the DCI, a valid frequency range that is in the maximum cached frequency resource range and that includes scheduled data. For example, an existing NR terminal device may complete data transmission in an activated bandwidth part (bandwidth part, BWP), and a size of the BWP may be, for example, 20 MHz. In non-cross slot scheduling, when starting to detect the PDCCH, the terminal device needs to cache data in a frequency resource range of 20 MHz. However, it is possible that the network device does not schedule the terminal device (that is, the terminal device blindly detects the PDCCH but does not detect DCI of the terminal device), or that even if the network device schedules the terminal device, a frequency resource corresponding to scheduled data transmission is far less than 20 MHz, for example, only 5 MHz, which causes additional caching power consumption of the terminal device. Based on this, cross slot scheduling may be used to reduce power consumption for caching data by the terminal device during data transmission between the network device and the terminal device. The network device may adaptively configure a cross slot scheduling manner based on the cross slot scheduling function supported by the terminal device, to implement a processing in which the terminal device performs data transmission terminal device with low power consumption. It should be noted that in this embodiment of this application, a time unit may be used to replace a lot in cross slot scheduling. For example, the time unit may be a subframe or a radio frame, which indicates that the control information used to schedule data transmission of the terminal device is not in a same subframe or radio frame as data transmission determined by the terminal device based on the control information. For another example, the time unit may include seven OFDM symbols, four OFDM symbols, or another quantity of symbols, to indicate that the control information used to schedule data transmission of the terminal device is not in same seven symbols, four symbols, or another same quantity of symbols as data transmission determined by the terminal device based on the control information.

The terminal device supports reception of the WUS, which helps the terminal device reduce power consumption, and in particular, reduce power consumption for detecting the PDCCH. The WUS signal may be sent before a DRX cycle (DRX cycle) period corresponding to the terminal device, and indicates whether the terminal device needs to detect the PDCCH in one or more next DRX cycle periods. In particular, for a service type such as instant messaging (instant messaging) and/or webbrowsing (webbrowsing), the terminal device does not need to detect the PDCCH, thereby saving power consumption for detecting the PDCCH.

That the terminal device supports RRM measurement relaxation of a neighboring cell may mean that the terminal device supports a larger RRM measurement period of a neighboring cell, or that the terminal device may not perform RRM measurement on a neighboring cell whose frequency is the same as or different from that of a serving cell. For a terminal device moving at a low speed or a fixed terminal device, a cell on which the terminal device camps usually does not change (that is, cell reselection is not likely to occur). Therefore, RRM measurement does not need to be performed frequently on a neighboring cell. In this case, the terminal device supports RRM measurement relaxation, to prevent the terminal device from performing unnecessary RRM measurement, thereby reducing power consumption.

That the terminal device supports the paging enhancement technology means that the terminal device may receive enhanced paging information. The enhanced paging information may be used to indicate whether the terminal device needs to perform paging detection, and the enhanced paging information may be carried by using a PDCCH or PDSCH. The terminal device may receive the enhanced paging information to stop a subsequent paging detection behavior when determining that the network device does not page the terminal device, for example, stop detecting the PDSCH that carries the paging information, to reduce power consumption.

That the terminal device supports extended discontinuous reception (extended discontinuous reception, eDRX) means that the terminal device can support a larger discontinuous reception (discontinuous reception, DRX) period, so that power consumption of the terminal device can be reduced.

Optionally, the second capability set may further include the following: the terminal device supports reception of a further enhanced WUS in the future (for example, an NR Rel-17 and a later protocol version), and the terminal device supports radio link detection (radio link management, RLM) measurement relaxation, and the like.

A capability feature included in the third capability set is related to ensuring of coverage performance/a data transmission rate of the terminal device. It may be understood that a capability feature used to ensure a data rate of the terminal device may also be used to ensure coverage performance of the terminal device. For example, it is assumed that a coverage area that can be reached by the terminal device at a data transmission rate Rate 1 is Coverage 1 (that is, a data transmission rate between the terminal device in the Coverage 1 and the network device is the Rate 1). If a capability feature 1 can assist the terminal device in implementing a data transmission rate Rate 2 in the Coverage 1, and it is assumed that the Rate 2 is greater than the Rate 1, the coverage area of the terminal device having the capability feature 1 may reach Coverage 2 when it is ensured that the data rate between the terminal device and the network device is the Rate 1, where the Coverage 2 is greater than the Coverage 1. In other words, the capability feature 1 can be used to improve both a data rate of the terminal device and coverage performance of the terminal device. The third capability set may also be referred to as a coverage/data transmission rate capability set. The network device may use, based on the capability feature in the third capability set, a data transmission manner adapted to the capability feature, to ensure coverage/a data transmission rate of the terminal device. Improvement in the data transmission rate of the terminal device may also be equivalent to that the terminal device consumes less time-frequency resources when reaching a target data transmission rate, so that the network device can serve more terminal devices that need to reach the target data transmission rate.

The third capability set includes at least one of the following: the terminal device supports SUL, the terminal device supports repeated transmission of a PDCCH, the terminal device supports a time domain resource corresponding to the PDCCH to be greater than three OFDM symbols, the terminal device supports a virtual carrier, or the terminal device supports a BWP switching latency to be not longer than radio frequency retuning (RF retuning) time.

Figure 6:
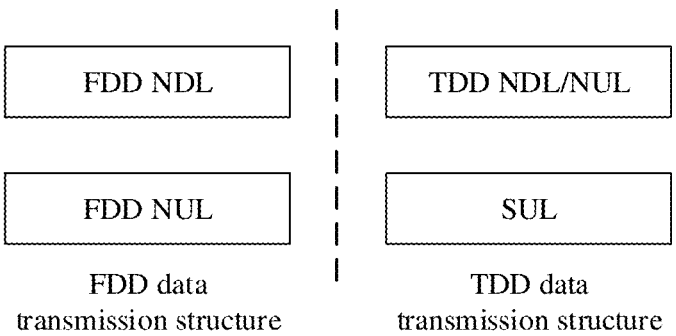
FIG. 6 is a schematic diagram of a comparison between different data transmission structures according to an embodiment of this application.

That the terminal device supports an SUL data transmission manner means that in addition to having a capability of performing data transmission with a base station on an NR uplink (NR uplink, NUL) carrier, the terminal device may further perform data transmission with the base station by using an SUL carrier. Performing data transmission with the base station by using the SUL carrier is equivalent to increasing uplink transmission resources, thereby improving an uplink data transmission rate. In addition, if a center frequency of the SUL carrier is lower than a center frequency of the NUL carrier, an uplink data transmission range in which the terminal device performs data transmission with the base station on the SUL may be larger than an uplink data transmission range in which the terminal device performs data transmission with the base station on the NUL. To reduce costs of the terminal device, when supporting the SUL data transmission manner, the terminal device may use one RF radio frequency transmit link as a mandatory capability, that is, the terminal device has only one uplink transmit link (or uplink RF). In other words, although the terminal device can complete uplink data transmission with the base station by using the NUL or the SUL, the terminal device can complete uplink data transmission with the base station at any moment by using only one type of uplink carrier (the NUL or the SUL). When the terminal device performs data transmission with the base station by using the NUL, and the terminal device performs data transmission with the base station by using the SUL, a baseband (baseband, BB) and a radio frequency RF processing unit can be shared. When the terminal device needs to switch from the SUL to the NUL or switch from the NUL to the SUL, a switching latency may be set to be not shorter than 140 microseconds. In this way, not only a data transmission coverage range of the terminal device can be ensured, but also an uplink carrier can be switched relatively quickly, which has little impact on a service terminal. Optionally, the terminal device may have an SUL data transmission function on an NR TDD (band). To be specific, when the terminal device performs data transmission with the base station by using the NR TDD band, the terminal device may support the SUL data transmission manner to achieve a data transmission rate comparable to that of the LTE CAT 4 (that is, a downlink peak rate is 150 Mbps, and an uplink peak rate is 50 Mbps). FIG. 6 separately shows a data transmission structure in which the terminal device jointly considers SUL on a TDD band and a data transmission structure of the terminal device on an FDD band. On the FDD band, the terminal device supports a capability of performing data transmission with a base station on an NUL carrier and a capability of performing data transmission with the base station on an NR downlink (NR downlink, NDL) carrier. On the TDD band, the terminal device not only supports the capability of performing data transmission with a base station on an NUL carrier and the capability of performing data transmission with a base station on an NDL carrier, but also supports the SUL data transmission manner. To be specific, on the TDD band, SUL is added to the terminal device, so that a data transmission rate can reach a data transmission rate achieved by the terminal device on the FDD band. In addition, the terminal device jointly considers SUL on the TDD band compared with a working manner of the terminal device on the FDD band, so that without changing a hardware specification (that is, no RF is added), a data transmission coverage range and a data transmission rate of data transmission between the terminal device and a base station are improved.

Subsequently, after refarming (refarming) allocation is performed on an LTE band in the NR system, that is, after the band in LTE is reallocated, the network device may include a medium access control (medium access control, MAC) scheduler that has an NR carrier aggregation (carrier aggregation, CA) function. The MAC scheduler may schedule NR UE (for example, the second-type terminal device) that supports CA of an FDD carrier and a TDD carrier, or may support NR REDCAP UE that schedules TDD NUL+SUL. The NR REDCAP UE for TDD NUL+SUL is a terminal device that supports an SUL function on a TDD band. When having the SUL function and particularly has the SUL function on the TDD band, the terminal device can further adapt to a subsequent network deployment scenario to ensure a service.

A maximum quantity of OFDM symbols in a time domain resource corresponding to a PDCCH received by the terminal device is greater than three. The time domain resource corresponding to the PDCCH may be represented by a quantity of OFDM symbols configured in time domain in a control resource set (control resource set, CORESET). When the quantity of OFDM symbols configured in time domain in the CORESET is larger, a quantity of time-frequency resources used to transmit the PDCCH are correspondingly increased, and PDCCH detection performance is better, thereby ensuring a coverage area of receiving a downlink control channel by the terminal device.

A bandwidth of a virtual carrier supported by the terminal device is not less than a bandwidth capability of the terminal device. The virtual carrier may be configured by the network device for the terminal device by using signaling (for example, RRC dedicated signaling) specific to the terminal device. The virtual carrier may include only one synchronization signal block (synchronization signal block, SSB) that is used by the terminal device to camp on. In this way, overheads of the SSB can be reduced. Optionally, in the virtual carrier, the terminal device may perform data transmission with the network device by using a BWP, and a latency of switching between different BWPs may be less than a switching latency corresponding to a case in which the second-type terminal device implements BWP switching. The virtual carrier is configured, so that the terminal device can implement data transmission with the network device in a larger channel bandwidth, thereby improving data transmission performance and coverage performance.

In an implementation, the terminal device (the first-type terminal device) may support a first BWP switching latency, and the first BWP switching latency is shorter than a latency generated when the second-type terminal device performs BWP switching. In another implementation, the terminal device supports at least one BWP switching latency. The at least one BWP switching latency includes the first BWP switching latency, the first BWP switching latency is shorter than a second BWP switching latency, and the second BWP switching latency is the same as the latency generated when the second-type terminal device performs BWP switching. In this way, the first-type terminal device may implement dynamic BWP switching compared with the second-type terminal device. The first BWP switching latency may be time required by the first-type terminal device to perform RF retuning, for example, may be 140 microseconds, or may be another value. This is not specifically limited. Compared with the second-type terminal device, the first-type terminal device supports a shorter BWP switching latency, so that the network device can quickly adjust a BWP corresponding to data transmission with the first-type terminal device, thereby ensuring a selective frequency scheduling gain.

Optionally, the third capability set may further include that the terminal device supports configuration of channel state information (channel state information, CSI) feedback. The CSI feedback may assist a base station in learning of a channel state during data transmission of the terminal device, so that an adapted data transmission parameter such as a modulation coding scheme (modulation coding scheme, MCS) can be configured, to ensure a data transmission rate. Optionally, the third capability set may further include a function of the terminal device of supporting repeated transmission of a PUSCH.

The fourth capability set may be used to represent a short-latency processing capability (short time processing capability) of the terminal device, and the fourth capability set may be referred to as a short-latency processing capability set. The fourth capability set may include at least one of the following: the terminal device supports mini-slot (mini-slot) based uplink data transmission, the terminal device supports mini-slot based downlink data transmission, the terminal device supports grant free (grant free) uplink data transmission or the terminal device supports grant free downlink data transmission, the terminal device supports downlink semi-persistent scheduling (semi-persistent scheduling, SPS) data transmission, and the terminal device supports a short physical uplink control channel format (short physical uplink control channel format, short PUCCH format) 0 or a short PUCCH format 2.

Mini-slot based uplink data transmission and/or downlink data transmission of the terminal device may be understood as that a time unit corresponding to data transmission between the terminal device and the network device is a non-slot. Assuming that one slot includes 14 OFDM symbols, the non-slot refers to a time unit whose quantity of OFDM symbols is less than 14. For example, a quantity of symbols corresponding to PDSCH transmission or PUSCH transmission between the terminal device and the network device may be at least one of the following: two OFDM symbols, four OFDM symbols, and seven OFDM symbols. Compared with slot-based data transmission, in non-slot based data transmission, the network device or the terminal device does not need to receive data in a complete slot before starting to perform data demodulation. A quantity of OFDM symbols corresponding to data transmission between the terminal device and the network device is decreased, and a data transmission latency is reduced, so that short-latency data transmission can be implemented.

That the terminal device supports grant free uplink data transmission may be understood as that the terminal device supports type 1 (Type 1) grant free data transmission or type 2 (Type 2) grant free data transmission. In a Type 1 grant free data transmission manner, various resources associated with uplink data transmission between the network device and the terminal device are all configured by using RRC signaling. In a Type 2 grant free data transmission manner, resources associated with uplink data transmission between the network device and the terminal device are jointly determined through RRC signaling configuration and physical layer signaling indication. In a grant free-based data transmission manner, the network device does not need to send scheduling signaling for each time of data transmission, and therefore the terminal device does not need to detect the scheduling signaling for each time of data transmission, thereby reducing a data processing latency. Compared with Type 2 grant free, when the terminal device supports Type 1 grant free, a data processing latency of the terminal device is shorter.

When the terminal device supports downlink SPS data transmission, a resource associated with downlink data transmission between the terminal device and the network device may be configured based on RRC configuration or based on RRC signaling configuration and physical layer signaling indication. Because a terminal device that supports downlink SPS data transmission does not need to detect, during each time of data transmission, scheduling information sent by the network device, a data transmission latency is reduced. In this embodiment of this application, a resource associated with data transmission may include a time-frequency resource for data transmission, an MCS, a TBS corresponding to data transmission, and the like.

In terms of physical uplink control channel transmission, the terminal device may support a PUCCH transmission format based on a short physical uplink control channel format (short physical uplink control channel format, short PUCCH format) 0 and/or a short PUCCH format 2. The short PUCCH format 0 or the short PUCCH format 2 corresponds to one or two OFDM symbols in time domain. Because a quantity of OFDM symbols corresponding to the foregoing PUCCH format is relatively small, it is convenient to implement PUCCH feedback in a same slot. For example, after receiving a PDSCH, the terminal device may send, by using the foregoing PUCCH format, a HARQ-ACK in a corresponding slot for receiving the PDSCH. In this way, a feedback latency of sending uplink control information (uplink control information, UCI) by the terminal device can be reduced, thereby assisting the network device in quickly implementing subsequent data transmission control based on feedback information.

Optionally, the fourth capability set may further include that the terminal device supports a PDSCH mapping type B and/or a PUSCH mapping type B. The PDSCH mapping type B means that a PDSCH may start to be transmitted on any symbol in a slot, and does not need to start to be transmitted in a specific time window in a slot. The time window may be, for example, from the first OFDM symbol to the fourth OFDM symbol included in a slot. In this way, when transmitting the PDSCH to the terminal device, the network device does not need to wait for a fixed time window, and may start to transmit the PDSCH at a location of any OFDM symbol in a slot based on the PDSCH mapping type B, thereby reducing a processing latency of the terminal device. For the PUSCH mapping type B, refer to the foregoing descriptions of the PDSCH mapping type B. Details are not described herein again. Further, to reduce detection/receiving complexity of the terminal device in the PDSCH mapping type B or the PUSCH mapping type B, a quantity of OFDM symbols supported by the terminal device for data scheduling in the mapping type B may be fixed. For example, the quantity of OFDM symbols for data scheduling may belong to a set {2, 4, 7} or belong to a set {1, 2, 4, 7}.

In addition, the fourth capability set may further include that the terminal device supports a PDSCH mapping type A and/or a PUSCH mapping type A. The PDSCH mapping type A is used to represent that a start location of PDSCH data mapping is in a fixed time window in a slot, and the PUSCH mapping type A is used to represent that a start location of PUSCH data mapping is in a fixed time window in a slot. In a possible implementation, the terminal device may use a data channel (a PDSCH and/or a PUSCH) mapping type B as a mandatory capability, and use a data channel (a PDSCH and/or a PUSCH) mapping type A as an optional capability. In another possible implementation, the terminal device may use both the data channel (a PDSCH and/or a PUSCH) mapping types A and B as mandatory capabilities.

The fifth capability set is used to represent a small data transmission (small data transmission) capability and/or an inactive data transmission (inactive data transmission) capability of the terminal device. That the terminal device has the fifth capability set may represent that the terminal device has the small data transmission/inactive data transmission capability. The data transmission capability is particularly applicable to a data transmission scenario in which a small packet (small data packet) is not frequently transmitted. In a small data/inactive data transmission manner, after entering an active state (active state), the terminal device may directly perform data transmission in an inactive state, thereby reducing a user plane latency. In addition, a process in which the terminal device initiates an RRC connection to enter the active state is omitted, so that energy consumption of the terminal device can be further reduced. The fifth capability set may include at least one of the following: the terminal device supports a two-step random access (2-step RACH (random access channel)) transmission manner, the terminal device supports a 4-step random access (4-step RACH) transmission manner, the terminal device supports an early data transmission (early data transmission, EDT) manner, or the terminal device supports a preconfigured uplink resource (preconfigured uplink resource, PUR) transmission manner.

The sixth capability set is used to represent a transmission reliability capability of the terminal device, and the sixth capability set may also be referred to as a transmission reliability capability set. The sixth capability set includes at least one of the following: the terminal device supports a data transmission manner of receiving a plurality of transmission and reception points (multiple TRP (transmission reception point), multi-TRP) based on a single PDCCH, the terminal device supports a time domain resource corresponding to the PDCCH to be greater than three OFDM symbols, the terminal device supports repeated transmission of a PUSCH or the terminal device supports repeated transmission of a PDSCH, the terminal device supports transmission of a PDCCH with a high aggregation level (aggregation level, AL) (for example, the terminal device supports PDCCH transmission whose AL is equal to 16), or the terminal device supports a modulation coding scheme cell radio network temporary identifier (modulation coding scheme cell radio network temporary identifier, MCS-C-RNTI) table corresponding to a block error ratio (block error ratio, BLER) of 1e-5 (negative five powers of 10).

For example, in an NR industrial Internet of Things (industrial internet of things, IIOT) network, to provide a better service, a plurality of TRPs are often deployed, that is, a multi-TRP data transmission manner is used. In multi-TRP transmission, the terminal device may use a data transmission manner of receiving a plurality of TRPs based on a single PDCCH as a mandatory capability, to reduce implementation complexity of the terminal device. The data transmission manner of receiving a plurality of TRPs based on a single PDCCH means that one TRP sends a PDCCH to the terminal device and a plurality of TRPs send a PDSCH to the terminal device. This cooperative transmission mechanism can reduce interference between different TRPs. The plurality of TRPs may send the PDSCH to the terminal device in the following manner: spatial division multiplexing (spatial division multiplexing, SDM), frequency division multiplexing (frequency division multiplexing, FDM), or time division multiplexing (time division multiplexing, TDM). Optionally, in multi-TRP transmission, the terminal device supports indication of two TCI states by using one transmission configuration indicator (transmission configuration indicator, TCI). The terminal device supports a DMRS entry of {0, 2}, the DMRS entry belongs to two different code division multiplexing (code division multiplexing, CDM) groups (CDM groups), and the two different CDM groups are not used for data transmission. Optionally, the terminal device may support a DMRS entry of {0, 2}, and the DMRS entry belongs to two CDM groups in three different CDM groups, to implement a transmission manner in which DMRS power is improved, thereby ensuring transmission performance of the terminal device. The terminal device may further support two default type-D quasi-colocation (quasi-collocation, QCL) information. Optionally, the terminal device may use an SDM and/or FDM data transmission manner based on a single PDCCH and multi-TRP as mandatory capabilities/a mandatory capability, and use a TDM data transmission manner based on a single PDCCH and multi-TRP as an optional capability, to reduce a data transmission latency.

That the terminal device supports repeated transmission of a PUSCH may be understood as that the terminal device supports slot aggregation (slot aggregation) of the PUSCH. A quantity of repeated transmissions of the PUSCH supported by the terminal device may be represented by a quantity of aggregated slots, and the quantity of aggregated slots may be, for example, 4, 6, or 8. For that the terminal device supports repeated transmission of a PDSCH, refer to related descriptions of that the terminal device supports repeated transmission of a PUSCH. Details are not described herein again.

The terminal device supports transmission of a PDCCH with a high aggregation level, which can ensure data transmission reliability of the terminal device. This is because a higher aggregation level of a PDCCH indicates higher PDCCH transmission reliability.

That the terminal device supports the MCS-C-RNTI table corresponding to the BLER of 1e-5 may be understood as that the terminal device supports data transmission based on a target BLER of 1e-5, and/or the terminal device supports channel quality indicator (channel quality indicator, CQI) reporting based on the target BLER of 1e-5. The terminal device supports data transmission and/or CQI reporting based on the target BLER of 1e-5, to assist the network device in performing adapted data scheduling, thereby ensuring that a highest target BLER of data transmission between the terminal device and the network device is 1e-5.

The seventh capability set is used to represent a URLLC data transmission capability of the terminal device. The seventh capability set may include at least one of the following: a Type 1 grant free data transmission capability, a Type 2 grant free data transmission capability, a downlink SPS data transmission capability, a non-slot (mini-slot) based PUSCH data transmission capability, a non-slot (mini-slot) based PDSCH data transmission capability, a data transmission capability based on a short PUCCH format 0/2, PDSCH slot aggregation, PUSCH slot aggregation, transmission of a PDCCH with an aggregation level of 16, an MCS-C-RNTI table whose target BLER is 1e-5, and intra-UE (Intra-UE) uplink transmission priority processing capability, where uplink transmission includes PUSCH transmission and PUCCH transmission. The seventh capability set may further include a PDSCH processing capability, a PUSCH processing capability, or the like.

The intra-UE (Intra-UE) uplink transmission priority processing capability is used to represent that the terminal device supports a transmission manner associated with different uplink transmission priorities. For example, the terminal device may support reception of downlink control information including a priority indication field. The priority indication field may indicate priorities of different data transmission channels scheduled by the downlink control information. The terminal device may distinguish between the priorities of different data transmission channels based on indication of the control information, to preferably transmit a data channel with a high priority, thereby ensuring a data transmission requirement.

Optionally, because the URLLC data transmission capability of the terminal device has an association relationship with reliability, the short-latency processing capability, and the like of the terminal device, the seventh capability set may further include some or all of capability features in the fourth capability set and/or the sixth capability set.

In a possible design, some capability parameters in different capability sets may be separately combined to form another capability set, or a capability parameter in a capability set A may be included in a capability set B, or different capability sets may be combined to form a capability set. In a possible design, some or all of capability features in any one or more of the second capability set to the seventh capability set may form a new capability set. For example, a capability feature in the sixth capability set that the terminal device supports the data transmission manner of receiving multi-TRP based on a single PDCCH, a capability feature in the fifth capability set that the terminal device supports small data/inactive data, and another capability feature may form a shared (mixed) IIOT capability set. This is because the capability features such as the data transmission manner of receiving multi-TRP based on a single PDCCH and small data/inactive data may represent that the terminal device supports a transmission feature of an IIOT network.

In a possible design, a capability feature included in any one of the foregoing capability sets may also appear in another capability set. For example, for the fifth capability set used to represent that the terminal device has the small data/inactive data transmission capability, because some capability features in the set can reduce power consumption of the terminal device, one or more capability parameters in the capability set may also be included in the second capability set. In addition, because some capability features included in the fifth capability set may further reduce a user plane latency, capability parameters corresponding to the some capability features may be further included in the fourth capability set.

It should be noted that the capability features included in the first capability set to the seventh capability set may be predefined in a protocol, or may be reported by the terminal device. This is not limited herein.

In a possible design, the first information indicates that the capability parameter corresponding to the first-type terminal device further includes at least one of the second capability set, the third capability set, the fourth capability set, the fifth capability set, the sixth capability set, or the seventh capability set. In other words, in addition to indicating (explicitly indicating/implicitly indicating) the first capability set, the first information may further indicate at least one of the second capability set, the third capability set, the fourth capability set, the fifth capability set, the sixth capability set, or the seventh capability set. In this case, it may be considered that the plurality of capability sets indicated by the first information all are mandatory capability sets. Alternatively, in addition to indicating the first capability set, the first information may further indicate at least one capability feature in at least one of the second capability set, the third capability set, the fourth capability set, the fifth capability set, the sixth capability set, or the seventh capability set. In other words, content indicated by the first information corresponds to a mandatory capability set or a mandatory capability parameter of the first-type terminal device. After receiving the first information from the terminal device, the network device may determine, based on the first information, that the terminal device is the first-type terminal device, that is, the terminal device is a type of reduced-capability terminal device. Because the terminal device is the first-type terminal device, the network device may directly determine, based on the device type of the terminal device, some capability parameters of the terminal device, for example, a bandwidth parameter and an antenna parameter of the terminal device. In other words, the first information not only indicates that the terminal device is of a first type, but also implicitly indicates the first capability set of the terminal device by indicating the type of the terminal device.

In another possible design, the terminal device sends second information to the network device, where the second information indicates that the capability parameter corresponding to the first-type terminal device further includes at least one of the second capability set, the third capability set, the fourth capability set, the fifth capability set, the sixth capability set, or the seventh capability set. In other words, the first information indicates only the first capability set, and the second information explicitly indicates at least one of the second capability set, the third capability set, the fourth capability set, the fifth capability set, the sixth capability set, or the seventh capability set. It may be considered that the first capability set indicated by the first information is a mandatory capability set, and that another capability set is autonomously implemented by each terminal manufacturer, and therefore is reported by using the second information. A capability set indicated by the second information is an optional capability set, or a capability set indicated by the second information may be a mandatory capability set.

It may be understood that if the first information does not indicate that the capability parameter corresponding to the first-type terminal device further includes at least one of the second capability set to the seventh capability set, the second information may indicate that the capability parameter corresponding to the first-type terminal device further includes at least one of the second capability set to the seventh capability set. Alternatively, if the first information indicates that the capability parameter corresponding to the first-type terminal device includes at least one of the second capability set to the seventh capability set, the at least one capability set indicated by the first information does not need to be further indicated by the second information. Alternatively, if the first information indicates that the capability parameter corresponding to the first-type terminal device includes at least one capability feature in at least one of the second capability set to the seventh capability set, the at least one capability feature does not need to be indicated by the second information. Alternatively, if the first information does not indicate that the capability parameter corresponding to the first-type terminal device includes at least one capability parameter in at least one of the second capability set to the seventh capability set, the at least one capability parameter may be indicated by the second information. In other words, content indicated by the first information and the second information may not be repeated.

The second information and the first information may be two pieces of information, and content or a format of the second information may be the same or different from that of the first information. The first information and the second information may be reported based on time, for example, reported at different time, or reported in different access phases. For example, the first information is sent in an initial access phase, and the second information is sent in a connected state. In other words, the terminal device may send the first information in the initial access phase and send the second information in the connected state. For example, the first information may be carried in a message (message, MSG) 3 or an MSGA, that is, the first information is sent in the initial access phase by using an uplink channel in an initial access process. The second information may be carried in a PUSCH or a PUCCH after the terminal device establishes an RRC connection to the network device. In other words, capability information (for example, the first capability set, including a bandwidth and a transmit/receive antenna of the terminal device) related to an initial access configuration parameter may be sent in the initial access phase, and capability information (for example, the second capability set) related to data transmission after the RRC connection is entered may be reported in an RRC connected state.

For another example, in an implementation, the first capability set includes both 1T2R and 1T1R, or 1T2R and 1T1R may be reported by using another capability parameter, or 1T2R and 1T1R may be included in another capability set. When being reported by using a capability set, 1T2R and 1T1R may be included in a same capability set or may be included in different capability sets. To help the network device manage and control a type of accessed terminal device and ensure implementation flexibility of the network device, a terminal device (for example, a REDCAP terminal device) having the first capability set sends the first information to the network device in an initial access phase by using an uplink channel in an initial access process to indicate a terminal device type of the terminal device, that is, the REDCAP terminal device. For example, the terminal device may report the first information through a preamble (Preamble). When learning that the terminal device that makes a random access response is the REDCAP terminal device, the network device may consider whether to allow this type of terminal device to access a network. For example, the network device may notify, by using a random access response (random access response, RAR) corresponding to Msg2 or MsgB in a random access process, whether this type of terminal device can access the network. If this type of terminal device does not receive, in a specific time window, a response for the preamble sent by the terminal device, it may be determined that the network device does not allow this type of terminal device to access the network device. Alternatively, in another aspect, the network device may notify, in common information (for example, the common information is information carried in a MIB or a SIB) broadcast in a cell, whether the cell supports access of the REDCAP terminal device. Further, regardless of whether a capability of a terminal device is 1T2R or 1T1R, the terminal device is defined based on one type of REDCAP terminal device. The terminal device may report, in an Msg3 phase or MsgA in random access or a connected state, information indicating different receiving capabilities (for example, 1T2R REDCAP and 1T1R REDCAP) corresponding to a same type of terminal device. The terminal device may report the information in different phases of data transmission between the terminal device and the network device. For example, the terminal device may separately report the information in a phase of sending a preamble during initial access and in a phase of sending Msg3 or sending MsgB during initial access. In this way, definition of the type of the REDCAP terminal device can be simplified, and the network device can distinguish between REDCAP terminal devices with different capabilities, and further manage and control the REDCAP terminal devices with different capabilities, to ensure network performance and data transmission efficiency and optimize a network design. Alternatively, 1T2R and 1T1R are used as examples. Considering that a quantity of receive antennas of a terminal device with 1T1R is decreased compared with that of a terminal device with 1T2R, when other data transmission performance parameters (for example, a modulation scheme and a channel bandwidth capability) are the same, receive power of a same signal received by terminal devices with different receive antenna configurations is different. For example, receive power for receiving an SSB or another reference signal by a terminal device with 1R (a terminal device configured with one receive antenna) is lower than receive power for receiving an SSB or another reference signal by a terminal device with 2R (a terminal device configured with two receive antennas). If different receive power for receiving an SSB or another reference signal corresponds to different random access resources, for example, preamble resources, even if there is only one type of REDCAP terminal device, different preambles may be sent during random access, so that the network device learns whether a REDCAP terminal device with a receive antenna capability of 1R or a REDCAP terminal device with a receive antenna capability of 2R initiates a random access response.

In still another possible design, the terminal device sends third information to the network device, where the third information indicates an application scenario (use case) of the terminal device. It should be noted that the terminal device is the first-type terminal device, that is, the third information indicates some application scenarios in which the first-type terminal device may be applied. The application scenario of the terminal device has an association relationship with at least one of the second capability set, the third capability set, the fourth capability set, the fifth capability set, the sixth capability set, or the seventh capability set. The association relationship may be predefined, that is, both the base station and the terminal device know the association relationship; or the association relationship may be sent by the base station to the terminal device, and the terminal device may report the application scenario of the terminal device based on the association relationship indicated by the base station; or the association relationship may be reported by the terminal device to the base station, and the base station determines a corresponding capability set based on the scenario and the association relationship that are reported by the terminal device. In other words, the first information indicates the first capability set, and the third information implicitly indicates at least one of the second capability set, the third capability set, the fourth capability set, the fifth capability set, the sixth capability set, or the seventh capability set.

For example, Table 4 shows association relationships between different application scenarios and different capability sets.

TABLE 4

| Application scenario | At least one capability set associated with the application scenario |
|---|---|
| IWSN | The second capability set, the fourth capability set, the fifth capability set, and the seventh capability set |
| Video surveillance | The third capability set and the sixth capability set |
| Wearable | The second capability set and the third capability set |

It may be learned from Table 4 that when the application scenario of the terminal device is the IWSN scenario, the application scenario of the terminal device has an association relationship with the second capability set, the fourth capability set, the fifth capability set, and the seventh capability set. When the application scenario of the terminal device is the video surveillance scenario, the application scenario of the terminal device has an association relationship with the third capability set and the sixth capability set. When the application scenario of the terminal device is the wearable scenario, the application scenario of the terminal device has an association relationship with the second capability set and the third capability set.

In addition, capability features included in first capability sets corresponding to different application scenarios may also be different. For example, in the first capability set corresponding to the IWSN scenario, the channel bandwidth supported by the terminal device may be 5 MHz or 10 MHz, and the quantity of receive antennas and the quantity of transmit antennas may be 1-Rx and 1-Tx. In this way, costs and implementation complexity of the IWSN may be further reduced, and a requirement of the IWSN for a low data rate may also be met. However, in the first capability set corresponding to the wearable scenario, the channel bandwidth supported by the terminal device may be 20 MHz or 50 MHz, and the quantity of receive antennas and the quantity of transmit antennas may be 2-Rx and 2-Tx. In this way, a larger data transmission rate can be implemented.

In this way, the first-type terminal device may be associated with different capability sets by reporting the application scenario of the first-type terminal device, to assist the network device in implementing adapted data transmission, thereby meeting requirements in different application scenarios.

In addition, when the capability set is not defined, different application scenarios may be associated with different capability parameters or different capability features (feature). One application scenario may be associated with one or more capability parameters or capability features. For example, the video surveillance scenario may be associated with at least one of the following capability features: a maximum quantity of pieces of DCI with different DCI sizes that is supported by the terminal device is less than 4, the terminal device supports cross slot scheduling, the terminal device supports reception of a WUS, the terminal device supports RRM measurement relaxation of a neighboring cell, the terminal device supports SUL, the terminal device supports repeated transmission of a PDCCH, the terminal device supports a time domain resource corresponding to the PDCCH to be greater than three OFDM symbols, the terminal device supports a virtual carrier, or the terminal device supports a BWP switching latency to be not longer than radio frequency retuning time. In this way, the first-type terminal device may be associated with different capability parameters or capability features by reporting the application scenario of the first-type terminal device, to assist the network device in implementing adapted data transmission, thereby meeting requirements in different application scenarios.

In some other embodiments, the capability parameter corresponding to the terminal device may further include at least one of the following: a capability set used in an IWSN scenario, a capability set used in a wearable scenario, and a capability set used in a video surveillance scenario.

The capability set used in the IWSN scenario includes at least one of the following: a maximum quantity of pieces of DCI with different DCI sizes that is supported by the terminal device, the terminal device supports cross slot scheduling, the terminal device supports mini-slot based uplink data transmission, the terminal device supports mini-slot based downlink data transmission, the terminal device supports grant free uplink data transmission, the terminal device supports grant free downlink data transmission, the terminal device supports a 2-step random access transmission manner, the terminal device supports a 4-step random access (4-step RACH) transmission manner, the terminal device supports an EDT transmission manner, or the terminal device supports a PUR transmission manner.

The capability set used in the wearable scenario includes at least one of the following: the terminal device supports SUL, the terminal device supports repeated transmission of a PDCCH, the terminal device supports a time domain resource corresponding to the PDCCH to be greater than three OFDM symbols, the terminal device supports a virtual carrier, the terminal device supports a BWP switching latency to be not longer than radio frequency retuning time, the terminal device supports a data transmission manner of receiving a plurality of TRPs based on a single PDCCH, the terminal device supports a time domain resource corresponding to the PDCCH to be greater than three OFDM symbols, the terminal device supports repeated transmission of a PUSCH, or the terminal device supports repeated transmission of a PDSCH.

The capability set used in the video surveillance scenario includes at least one of the following: a maximum quantity of pieces of DCI with different DCI sizes that is supported by the terminal device is less than 4, the terminal device supports cross slot scheduling, the terminal device supports reception of a WUS, the terminal device supports RRM measurement relaxation of a neighboring cell, the terminal device supports SUL, the terminal device supports repeated transmission of a PDCCH, the terminal device supports a time domain resource corresponding to the PDCCH to be greater than three OFDM symbols, the terminal device supports a virtual carrier, or the terminal device supports a BWP switching latency to be not longer than radio frequency retuning time.

In a possible design, the first information indicates that the capability parameter corresponding to the first-type terminal device further includes at least one of the capability set used in the IWSN scenario, the capability set used in the wearable scenario, or the capability set used in the video surveillance scenario. In other words, in addition to indicating (explicitly indicating/implicitly indicating) the first capability set, the first information may further indicate at least one of the capability set used in the IWSN scenario, the capability set used in the wearable scenario, or the capability set used in the video surveillance scenario. In this case, it may be considered that the plurality of capability sets indicated by the first information all are mandatory capability sets.

In another possible design, the terminal device sends second information to the network device, where the second information indicates that the capability parameter corresponding to the first-type terminal device further includes at least one of the capability set used in the IWSN scenario, the capability set used in the wearable scenario, or the capability set used in the video surveillance scenario. In other words, the first information indicates only the first capability set, and the second information explicitly indicates at least one of the capability set used in the IWSN scenario, the capability set used in the wearable scenario, or the capability set used in the video surveillance scenario. It may be considered that the first capability set indicated by the first information is a mandatory capability set, and that another capability set is autonomously implemented by each terminal manufacturer, and therefore is reported by using the second information. A capability set indicated by the second information may be an optional capability set or a mandatory capability set.

In still some other embodiments, the capability parameter corresponding to the terminal device may further include a capability set corresponding to uplink transmission and/or a capability set corresponding to uplink transmission. In other words, different capability sets may be separately defined for uplink data transmission and downlink data transmission. In this way, in a scenario in which a quantity of uplink services is unequal to a quantity of downlink services, a capability set in each transmission direction is defined to simplify implementation of the terminal device. For example, in a scenario in which there are more uplink services and fewer downlink services (for example, the video surveillance scenario or the IWSN scenario), an uplink data design may be optimized, that is, a function supported by the terminal device in uplink data transmission is optimized, and complexity of downlink data transmission is simplified, that is, a function supported by the terminal device in downlink data transmission is simplified.

For example, for uplink data transmission, considering reliability of data transmission, the terminal device may have a function of a New 64QAM MCS table for PUSCH. A required downlink data transmission amount is small, and therefore the terminal device may not support the New 64QAM MCS table for PDSCH. It should be understood that if data transmission between the terminal device and the network device is configured based on the New 64QAM MCS table for PUSCH, a higher data modulation scheme such as 256QAM may be implemented, or a lower data transmission BLER may be implemented, for example, the BLER may be 1e-5. The New 64QAM MCS table for PDSCH has the same understanding, and details are not described again. Further, the terminal device may support a function of Dynamic indication of MCS tables using MCS-C-RNTI for PUSCH and does not support a function of Dynamic indication of MCS tables using MCS-C-RNTI for PDSCH. It should be understood that if the terminal device supports the function of Dynamic indication of MCS tables using MCS-C-RNTI for PUSCH, an MCS value corresponding to PUSCH transmission may be dynamically switched in different MCS tables. In this way, data transmission between the network device and the terminal device can be more quickly adapted to a status of a channel between the network device and the terminal device, thereby improving a data transmission rate. However, for a PDSCH, the terminal device may not support the function because a required downlink data transmission amount is small. In addition, in terms of latency, the terminal device may support only an uplink configured grant function, but does not support a DL configured grant function or a semi-persistent scheduling function.

In still some other embodiments, the capability parameter corresponding to the terminal device may further include capability sets corresponding to different data transmission standards. For example, capability sets corresponding to FDD and TDD may be separately defined, to be adapted to different data transmission. Compared with TDD, an uplink frequency resource of FDD is not affected by a TDD uplink-downlink ratio, so that an uplink transmission rate such as a peak rate that can be reached by the terminal device can be ensured. However, a TDD system is limited by the TDD uplink-downlink ratio, an uplink transmission resource is limited, and the uplink data transmission rate of the terminal device is affected. Therefore, a capability feature related to a data transmission rate/coverage performance may be considered in only the TDD system, and the capability feature related to the data transmission rate/coverage performance may be not considered in an FDD system, or the capability feature related to the data transmission rate/coverage performance may be used as an optional capability. For example, the terminal device may support the SUL function on only a TDD band.

In a possible implementation, the terminal device further includes at least one of the following capabilities: the terminal device supports separate common signaling data transmission, the terminal device supports a high-precision synchronization function, the terminal device supports network slice data transmission, the terminal device supports NPN data transmission, the terminal device supports 5G LAN data transmission, the terminal device supports UTDOA positioning, or the terminal device supports multicast/broadcast data transmission. Optionally, the terminal device may further support a data transmission feature pre-scheduled based on a 5G quality of service identifier (5G quality of service identifier, 5G QoS Identifier). The 5QI may identify a service priority, a data packet transmission latency, a bit error rate of data packet transmission, and the like. The terminal device may support a data transmission feature with a specific 5QI.

In a possible design, it may be considered that the capability parameter corresponding to the first-type terminal device may further include an HOT capability set. The HOT capability set may include the following: the terminal device supports separate common signaling data transmission, the terminal device supports a high-precision synchronization function, the terminal device supports network slice data transmission, the terminal device supports NPN data transmission, the terminal device supports 5G LAN data transmission, the terminal device supports UTDOA positioning, or the terminal device supports multicast/broadcast data transmission. In other words, the terminal device may separately report at least one of the foregoing capabilities (for example, a capability that the terminal device supports a function of separate common signaling data transmission, a capability that the terminal device supports a function of network slice data transmission), or may report the foregoing capabilities by using the HOT capability set.

That the terminal device supports separate common signaling data transmission may be understood as that the terminal device supports a data transmission manner based on a separate RACH, a separate system information block type 1 (system information block type 1, SIB1), separate paging, or a separate initial BWP. "Separate" means that the foregoing data of the first-type terminal device is separated from that of the second-type terminal device. For example, NR REDCAP UE and NR legacy UE may respectively correspond to their respective RACHs, SIB1s, paging, and initial BWPs. The terminal device supports separate common signaling data transmission, which can reduce impact on data transmission of an NR legacy terminal device in a system. In addition, a common signaling design of the NR REDCAP UE may be simplified, thereby reducing overheads and saving energy.

That the terminal device supports the high-precision synchronization function may be understood that the terminal device may receive high-precision timing information sent by the network device and perform time synchronization based on the timing information. For example, the base station may broadcast network timing information with a granularity of 10 nanoseconds, to assist in scenarios in which network-wide synchronization is required, for example, a power grid scenario and an industrial control scenario, so that an error in end-to-end time synchronization between devices in the foregoing scenarios is less than 1 us. The terminal device supports the high-precision synchronization function, so that a transmission requirement of a high-latency sensitive service can be met.

The terminal device supports network slice data transmission, and may continue to perform transmission with the network device in a dedicated virtual network. The virtual network may be adapted to an industry-specific requirement or enterprise-specific requirement, thereby expanding an application market of the terminal device.

The terminal device supports NPN data transmission, and may perform data transmission with the network device in a private network of an operator. Currently, some large enterprises or enterprises used in a 5G industrial spectrum want to construct the private network of the operator to ensure operation security and privacy. A terminal device supporting NPN data transmission may perform data transmission with the network device in a network that has a requirement for constructing the private network of the operator, to expand an application market of the terminal device.

That the terminal device supports a 5G LAN may be understood as that the terminal device supports transmission, in a network, of a data packet in a layer 2 (Layer 2) protocol. L2 is an industrial protocol layer. The data packet in the layer 2 protocol mainly refers to a MAC data packet, such as an Ethernet data packet, an EtherCAT data packet, or another data packet. A terminal device supporting the 5G LAN may be directly connected to an industrial/power device, to omit forwarding by an L2 TP device, thereby reducing implementation complexity of the terminal device and improving data transmission efficiency.

Optionally, the IIOT capability set may further include a precise timing transmission capability. The precise timing transmission capability is usually used in a scenario in which precise timing is required in the IIOT network. A terminal device that has the precise timing transmission capability may serve an IIOT that has a timing requirement. Optionally, the IIOT capability set may further include a capability feature in the sixth capability set that the terminal device supports the data transmission manner of receiving multi-TRP based on a single PDCCH, a capability feature in the fifth capability set that the terminal device supports small data/inactive data, and another capability set.

Optionally, based on the foregoing capability set, the terminal device may independently report another optional capability in a feature manner.

Optionally, in addition to a mandatory capability set indicated by the first information, another capability may be independently reported in a feature manner.

Optionally, a mandatory capability of the terminal device (or understood as a capability parameter indicated by the first information or understood as a mandatory capability associated with the first-type terminal device) may include only a bandwidth capability of the terminal device, a quantity of receive antennas of the terminal device, a quantity of transmit antennas of the terminal device, a maximum modulation scheme corresponding to uplink data and/or downlink data transmission, and a capability associated with a data transmission latency. The capability associated with the data transmission latency may include at least one of the following: a PDSCH processing capability (that is, a PDSCH processing time capability) and/or a PUSCH processing capability (that is, a PUSCH processing time capability), a non-slot based data transmission capability, and a corresponding small/inactive data transmission capability. For a parameter value corresponding to each capability, refer to the foregoing descriptions. The corresponding small/inactive data transmission capability (or a capability in a corresponding small/inactive data transmission capability set) includes at least one of the following: the terminal device supports a 2-step random access transmission manner, the terminal device supports a 4-step random access transmission manner, the terminal device supports an early data transmission manner, the terminal device supports a preconfigured uplink resource transmission manner, or the terminal device supports a configured grant type 1 transmission manner. With reference to the foregoing descriptions of each capability parameter value or parameter feature, compared with the second-type terminal device (for example, an NR legacy terminal device), the first-type terminal device that has the foregoing mandatory capability is not higher than the second-type terminal device in terms of one or more capabilities in a channel bandwidth, a quantity of receive antennas, a quantity of transmit antennas, or a maximum modulation scheme for data transmission. Therefore, costs of the first-type terminal device may be reduced compared with that of the NR legacy terminal device. In another aspect, compared with an LTE terminal device, because the first-type terminal device has the capability related to the data transmission latency, a data processing latency is shorter, thereby improving data transmission efficiency and user experience.

502. The network device receives the first information from the terminal device.

After receiving the first information reported by the terminal device, the network device may determine, based on the first information, that the terminal device is the first-type terminal device, and may determine a corresponding capability set, for example, the first capability set. For related descriptions of the first information, refer to the descriptions in step 501. Details are not described herein again.

Optionally, the network device may further receive the second information reported by the terminal device, and may determine, based on the second information, that the capability parameter corresponding to the first-type terminal device further includes at least one of the second capability set, the third capability set, the fourth capability set, the fifth capability set, the sixth capability set, or the seventh capability set. For related descriptions of the second information, refer to the descriptions in step 501. Details are not described herein again.

Optionally, the network device may further receive the third information reported by the terminal device, and may determine an application scenario of the terminal device based on the third information. The application scenario of the terminal device has an association relationship with at least one of the second capability set, the third capability set, the fourth capability set, the fifth capability set, the sixth capability set, or the seventh capability set. For related descriptions of the third information, refer to the descriptions in step 501. Details are not described herein again.

Based on the method provided in this embodiment of this application, the terminal device may send the first information to the network device, where the first information indicates that the terminal device is the first-type terminal device, the capability parameter corresponding to the first-type terminal device includes the first capability set, the first capability set includes the channel bandwidth supported by the terminal device and the quantity of transmit antennas of the terminal device, the channel bandwidth of the terminal device is less than 100 megahertz, and the quantity of transmit antennas of the terminal device is less than 4. In this way, the terminal device may report a type of the terminal device to the network device, so that the network device determines, based on the type of the terminal device, a capability parameter corresponding to the terminal device, thereby reducing resource overheads used by the terminal device to report a capability.

In addition, in this embodiment of this application, a type of terminal device (a first type of terminal device, that is, the REDCAP terminal device) may correspond to different capability sets, and different capability sets may be associated with different data transmission features. For example, the first capability set may be related to complexity/costs of the terminal device, the second capability set is related to the power saving capability of the terminal device, the third capability set is related to the coverage enhancement capability and/or the data transmission rate enhancement capability of the terminal device, the fourth capability set is related to the short-latency processing capability of the terminal device, the fifth capability set is related to the small data transmission capability and/or the inactive data transmission capability of the terminal device, the sixth capability set is related to the transmission reliability capability of the terminal device, and the seventh capability set is related to the URLLC data transmission capability of the terminal device, and the like. In other words, a capability set of the first-type terminal device may be defined based on different data transmission requirements, to meet different requirements in different scenarios in aspects such as energy saving, coverage, and a data transmission rate. Therefore, a terminal device manufacturer can implement, based on different requirements in different application scenarios, performance and functions corresponding to the first-type terminal device, and does not need to design a plurality of different types of terminal devices based on different data transmission features, which can avoid market fragmentation caused by excessive types of terminal devices and difficult in managing the terminal devices.

Optionally, the terminal device may send fourth information to the network device, where the fourth information indicates a first parameter f1. A maximum downlink data rate that is of the terminal device and that corresponds to f1 is not higher than X Mbps, where X may be 150 or 10. In other words, the fourth information indicates the maximum downlink data rate of the terminal device, and the maximum downlink data rate of the terminal device is less than or equal to 10 megabits/s or 150 megabits/s. Optionally, the terminal device may send fifth information to the network device, where the fifth information indicates a second parameter f2. A maximum uplink data rate that is of the terminal device and that corresponds to f2 is not higher than Y Mbps, where Y may be 50 or 5. In other words, the fourth information indicates that the maximum uplink data rate of the terminal device is not higher than Y Mbps, where Y may be 50 or 5.

In one possible design, the fourth information may directly indicate f1. In another possible design, the fourth information may not directly indicate f1, and the fourth information may carry one or more bits, where a value of the bit corresponds to a value of f1. For example, values of every 2 bits may correspond to a value of f1, and 00 01 10 11 may respectively indicate four f1. In this way, the maximum downlink data rate corresponding to the terminal device may be implicitly reported by reporting one or more bits. Similarly, the fifth information may directly carry f2. In another possible design, the fifth information may not directly indicate f2, and the fifth information may carry one or more bits, where a value of the bit corresponds to a value of f2. In this way, the maximum uplink data rate corresponding to the terminal device may be implicitly reported by reporting one or more bits.

It should be noted that the fourth information or the fifth information may also be referred to as a scaling factor (scaling factor). For example, the fourth information may be referred to as a downlink (downlink, DL) scaling factor, and the fifth information may be referred to as an uplink (uplink, UL) scaling factor. Alternatively, the fourth information or the fifth information may have another name, which is not limited in this application.

In the foregoing manner, in an aspect, it may be implemented that even if there is only one type of terminal device (for example, the REDCAP terminal device) in a network, the fourth information or the fifth information corresponds to different data transmission rates, to meet data transmission efficiency in different application scenarios. In another aspect, it may be implemented that even if terminal devices correspond to a same type, the fourth information and/or the fifth information may be reported to indicate different data rates that can be supported by the terminal devices of a same type, to distinguish between different rates of the terminal devices. In still another aspect, it may be further implemented that different types of terminal devices report different fourth information and/or fifth information to distinguish between the different types of terminal devices.

In this application, the fourth information and/or the fifth information are/is introduced to support a requirement of a REDCAP terminal device for a low data transmission rate. Even if there is only one type of REDCAP terminal device, this implementation in this application may be used to support a relatively low maximum uplink/downlink data rate corresponding to a currently identified application scenario. In addition, in this implementation, when there is only one type of REDCAP terminal device, different fourth information and/or fifth information may be used to implement that one type of REDCAP terminal device corresponds to different maximum data rates. This simplifies a type definition for the REDCAP terminal device, avoids type differentiation of the REDCAP terminal device, and helps develop a market of the REDCAP terminal device.

A REDCAP terminal device is used as an example. A maximum data rate that corresponds to the REDCAP terminal device and that is defined in a current standard includes: A maximum DL data rate is 150 Mbps or 10 Mbps, and a maximum UL data rate is 50 Mbps or 5 Mbps. Alternatively, this may be understood as follows: The maximum data rate corresponding to the REDCAP terminal device is that the maximum DL data rate is 150 Mbps and the maximum UL data rate is 10 Mbps; or the maximum data rate corresponding to the REDCAP terminal device is that the maximum DL data rate is 50 Mbps and the maximum UL data rate is 5 Mbps.

Currently, in the NR system, a maximum data rate that can be supported by the terminal device may be determined based on the following parameters: a quantity of carriers that can be supported by the terminal device for simultaneous data transmission, a maximum data transmission modulation scheme (QAM) that can be supported by the terminal device, a quantity of layers that can be supported by the terminal device for simultaneous data transmission, a maximum channel transmission bandwidth that can be supported by the terminal device on different carriers (if the terminal device supports one carrier used for data transmission, a bandwidth of the carrier is the maximum channel transmission bandwidth that can be supported by the terminal device), a scaling factor (scaling factor) reported by the terminal device, and data transmission overheads corresponding to different frequency ranges (frequency range, FR). A maximum data rate of uplink data may be determined by using the foregoing parameters related to uplink data transmission, for example, a maximum uplink data transmission modulation scheme supported by the terminal device, a quantity of layers that can be supported by the terminal device for simultaneous uplink data transmission, and uplink data transmission overheads of the terminal device that correspond to different frequency ranges. A maximum data rate of downlink data may be determined by using the foregoing parameters related to downlink data transmission, for example, a maximum downlink data transmission modulation scheme supported by the terminal device, a quantity of layers that can be supported by the terminal device for simultaneous downlink data transmission, and downlink data transmission overheads of the terminal device that correspond to different frequency ranges.

For example, a maximum data rate (in units of Mbps) that can be supported by the terminal device may be obtained through calculation by using a formula 1':

(Formula 1')
$$X/Y = 10^{-6} \cdot \sum_{j=1}^{J} \left( v_{Layers}^{(j)} \cdot Q_m^{(j)} \cdot f^{(j)} R_{max} \frac{N_{PRB}^{BW(j),\mu} \cdot 12}{T_S^\mu} \cdot (1 - OH^{(j)}) \right)$$

X is the maximum downlink data rate; Y is the maximum uplink data rate; J represents a quantity of aggregated carriers that can be supported by the terminal device on a band or a band combination; a value of Rmax is 948/1024; v represents a maximum quantity of (uplink or downlink) transmission layers that can be supported by the terminal device; Q represents a maximum (uplink or downlink) modulation order that can be supported by the terminal device; f is a scaling factor (scaling factor), where a value of f may be a value in the following set: {1, 0.8, 0.75, 0.4}; u represents a system parameter; T represents an average length of an OFDM symbol in a subframe, where when u is different, T is also different; and N represents a maximum quantity of resource blocks corresponding to a channel bandwidth of the terminal device, where when u is different, N is also different. OH represents overheads. When a center frequency is not higher than a frequency range 1 (frequency range 1, FR1) of 6 GHz, for the maximum downlink data rate, OH=0.14, and for the maximum uplink data rate, OH=0.08. When the center frequency is higher than a frequency range 2 (frequency range 2, FR2) of 6 GHz, for the maximum downlink data rate, OH=0.18, and for the maximum uplink data rate, OH=0.10.

Currently, the value corresponding to the scaling factor includes only {1, 0.8, 0.75, and 0.4}. Therefore, with reference to another configuration (for example, the capability parameter included in the first capability set in this application) of the REDCAP terminal device, it is unable to implement a data transmission rate requirement of the REDCAP terminal device, especially a requirement for a low data transmission rate, in a specific application scenario, for example, a scenario in which a maximum DL data rate is 10 Mbps, and/or a maximum uplink data rate is 5 Mbps.

In this implementation, the formula 1' may be simplified based on the formula 1' and with reference to a feature included in a mandatory capability set (first capability set) corresponding to the REDCAP terminal device, to obtain different fourth information and/or fifth information through calculation, so that the REDCAP terminal device supports a low data transmission rate. Considering costs of the REDCAP terminal device, the REDCAP terminal device may not support a carrier aggregation function, that is, in the formula 1', J=1.

In a possible design, when the first capability set includes different capability parameters, values of the fourth information and the fifth information may be different. As described below, if (1) is met, the value of the fourth information may be separately obtained based on (1-a), (1-b), or (1-c). If (2) is met, the value of the fourth information may be separately obtained based on (2-a), (2-b), or (2-c). If (3) is met, the value of the fifth information may be separately obtained based on (3-a), (3-b), or (3-c). If (4) is met, the value of the fifth information may be separately obtained based on (4-a), (4-b), or (4-c).

(1) The quantity of receive antennas of the terminal device is 2, the channel bandwidth is 20 MHz, and the maximum modulation scheme for downlink data transmission is 64QAM. Optionally, the quantity of transmit antennas of the terminal device is 1, and the maximum modulation scheme for uplink data transmission is 64QAM or 16QAM.

(1-a) On an FDD band, the fourth information is equal to a result calculated by using a formula 1, or the fourth information is a value with a preset quantity of reserved digits that is obtained after the result calculated by using the formula 1 is rounded, where the formula 1 is:

$$f1 = X \cdot 10^6 / ((1-OH) \cdot (N \cdot 12/T) \cdot 2 \cdot 6 \cdot R) \quad \text{(Formula 1)}$$

In the formula 1, X is a maximum downlink data rate. For related descriptions of the remaining parameters, refer to related descriptions of the formula 1'. Details are not described herein again. Values of N and T are shown in Table 5.

TABLE 5

| SCS | N | T |
|---|---|---|
| 15 KHz | 106 | 10^(−3)/(14*1) |
| 30 KHz | 51 | 10^(−3)/(14*2) |
| 60 KHz | 24 | 10^(−3)/(14*4) |

Based on the formula 1, when the maximum downlink data rate is 10 Mbps and the SCS is separately 15 KHz, 30 KHz, or 60 KHz, an implementation of the value of the fourth information may be shown in Table 6.

TABLE 6

| SCS | Fraction | Value range | Optional value |
|---|---|---|---|
| 15 KHz | 10*10^3*1024/((1−OH)* 2*6*948*106*12*14) | 0.0588–0.06 or 0.0588–0.10 | 0.06 or 0.10 |
| 30 KHz | 10*10^3*1024/((1−OH)* 2*6*948*51*12*28) | 0.0611–0.07 or 0.0611–0.10 | 0.06, 0.07, or 0.10 |
| 60 KHz | 10*10^3*1024/((1−OH)* 2*6*948*24*12*56) | 0.0649–0.07 or 0.0649–0.10 | 0.06, 0.07, or 0.10 |

Alternatively, when the maximum downlink data rate supported by the terminal device is 10 Mbps and the terminal device corresponds to different SCSs, to simplify implementation complexity of the terminal device, the terminal device may send same fourth information. For example, when "SCS=15 KHz or 30 KHz", f1 may be a value in a range of 0.06–0.07, or a value in a range of 0.06–0.10, or may be 0.06, 0.07, or 0.10.

Based on the formula 1, when the maximum downlink data rate is 150 Mbps and the SCS is separately 15 KHz, 30 KHz, or 60 KHz, an implementation of the value of the fourth information may be shown in Table 7.

TABLE 7

| SCS | Fraction | Value range | Optional value |
|---|---|---|---|
| 15 KHz | 150*10^3*1024/((1−OH)* 2*6*948*106*12*14) | 0.882–0.90 | 0.90 |
| 30 KHz | 150*10^3*1024/((1−OH)* 2*6*948*51*12*28) | 0.916–0.92 or 0.916–0.95 | 0.95 |
| 60 KHz | 150*10^3*1024/((1−OH)* 2*6*948*24*12*56) | 0.973–0.98 | 0.98 |

Alternatively, when the maximum downlink data rate supported by the terminal device is 150 Mbps and the terminal device corresponds to different SCSs, to simplify implementation complexity of the terminal device, the terminal device may send same fourth information. For example, when "SCS=15 KHz or 30 KHz", f1=0.95.

Alternatively, the REDCAP terminal device may report two f1, where one f1 corresponds to a low maximum downlink data rate (for example, 10 Mbps), the other f1 corresponds to a high maximum downlink data rate (for example, 150 Mbps), and f1 corresponding to the high maximum downlink data rate may be 1.0.

(1-b) On a TDD band on which a downlink DL-uplink UL ratio is 7:3, the fourth information is equal to a result calculated by using a formula 2, or the fourth information is a value with a preset quantity of reserved digits that is obtained after the result calculated by using the formula 2 is rounded, where the formula 2 is:

$$f1 = X \cdot 10^6 / ((1-OH) \cdot (N \cdot 12/T) \cdot 2 \cdot 6 \cdot R \cdot (DL \text{ ratio}))  \quad \text{(Formula 2)}$$

In the formula 2, the DL ratio represents a proportion occupied by a DL symbol or a proportion occupied by a DL slot (or a DL subframe) in a TDD DL-UL period. On the TDD band on which the DL:UL configuration is 7:3, the DL ratio may be 7/10. For example, a typical DL:UL configuration corresponding to a TDD band whose center frequency is 4 GHz or a TDD band whose center frequency is 3.5 GHz is 7:3. Descriptions of other parameters are the same as those described above, and details are not described again.

For a TDD band, if a TDD uplink-downlink ratio on the band is different from the foregoing TDD uplink-downlink ratio, the fourth information may be recalculated based on a related formula (for example, the formula 2).

Based on the formula 2, when the maximum downlink data rate is 10 Mbps and the SCS is separately 15 KHz, 30 KHz, or 60 KHz, an implementation of a fourth value may be shown in Table 8.

TABLE 8

| SCS | Fraction | Value range | Optional value |
|---|---|---|---|
| 15 KHz | (10/7)*10*10^3*1024/((1-OH)*2*6*948*106*12*14) | 0.084-0.10 | 0.085 or 0.10 |
| 30 KHz | (10/7)*10*10^3*1024/((1-OH)*2*6*948*51*12*28) | 0.087-0.10 | 0.09 or 0.10 |
| 60 KHz | (10/7)*10*10^3*1024/((1-OH)*2*6*948*24*12*56) | 0.093-0.10 | 0.095 or 0.10 |

Alternatively, when the maximum downlink data rate supported by the terminal device is 10 Mbps and the terminal device corresponds to different SCSs, to simplify implementation complexity of the terminal device, the terminal device may send same fourth information. For example, when "SCS=15 KHz or 30 KHz", f1 may be 0.09, 0.095, or 0.10.

Optionally, on the TDD band on which "DL:UL ratio=7:3", a maximum downlink data rate corresponding to "f1=1.0" may be a maximum downlink data rate corresponding to "f1=1.0" in an FDD system multiplied by (7/10).

(1-c) On a TDD band on which a downlink DL-uplink UL ratio is 8:2, the fourth information is equal to a result calculated by using a formula 3, or the fourth information is a value with a preset quantity of reserved digits that is obtained after the result calculated by using the formula 3 is rounded, where the formula 3 is:

$$f1 = X \cdot 10^6 / ((1-OH) \cdot (N \cdot 12/T) \cdot 2 \cdot 6 \cdot R \cdot (DL \text{ ratio})) \quad \text{(Formula 3)}$$

In the formula 3, the DL ratio represents a proportion occupied by a DL symbol or a proportion occupied by a DL slot (or a DL subframe) in a TDD DL-UL period. On the TDD band on which the DL:UL configuration is 8:2, the DL ratio may be 8/10. For example, a typical DL:UL configuration corresponding to a TDD band whose center frequency is 2.6 GHz is 8:2. Descriptions of other parameters are the same as those described above, and details are not described again.

Based on the formula 3, when the maximum downlink data rate is 10 Mbps and the SCS is separately 15 KHz, 30 KHz, or 60 KHz, an implementation of a fourth value may be shown in Table 9.

TABLE 9

| SCS | Fraction | Value range | Optional value |
|---|---|---|---|
| 15 KHz | (10/8)*10*10^3*1024/((1-OH)*2*6*948*106*12*14) | 0.074-0.10 | 0.075, 0.08, or 0.10 |
| 30 KHz | (10/8)*10*10^3*1024/((1-OH)*2*6*948*51*12*28) | 0.076-0.10 | 0.08 or 0.10 |
| 60 KHz | (10/8)*10*10^3*1024/((1-OH)*2*6*948*24*12*56) | 0.081-0.10 | 0.08, 0.085, or 0.10 |

Alternatively, when the maximum downlink data rate supported by the terminal device is 10 Mbps and the terminal device corresponds to different SCSs, to simplify implementation complexity of the terminal device, the terminal device may send same fourth information. For example, when "SCS=15 KHz or 30 KHz", f1 may be 0.08 or 0.10.

Optionally, on the TDD band on which the downlink-uplink ratio is "DL:UL ratio=8:2", a maximum downlink data rate corresponding to "f1=1.0" may be a maximum downlink data rate corresponding to "f1=1.0" in an FDD system multiplied by (8/10).

(2) The quantity of receive antennas of the terminal device is 1, the channel bandwidth is 20 MHz, and the maximum modulation scheme for downlink data transmission is 64QAM. Optionally, the quantity of transmit antennas of the terminal device is 1, and the maximum modulation scheme for uplink data transmission is 64QAM or 16QAM.

(2-a) On an FDD band, the fourth information is equal to a result calculated by using a formula 4, or the fourth information is a value with a preset quantity of reserved digits that is obtained after the result calculated by using the formula 4 is rounded, where the formula 4 is:

$$f1 = X \cdot 10^6 / ((1-OH) \cdot (N \cdot 12/T) \cdot 1 \cdot 6 \cdot R) \quad \text{(Formula 4)}$$

For related descriptions of parameters in the formula 4, refer to the foregoing descriptions. Details are not described herein again.

Based on the formula 4, when the maximum downlink data rate is 10 Mbps and the SCS is separately 15 KHz, 30 KHz, or 60 KHz, an implementation of the value of the fourth information may be shown in Table 10.

TABLE 10

| SCS | Fraction | Value range | Optional value |
|---|---|---|---|
| 15 KHz | 10*10^3*1024/((1-OH)*1*6*948*106*12*14) | 0.118-0.15 or 0.118-0.20 | 0.12, 0.15, or 0.20 |
| 30 KHz | 10*10^3*1024/((1-OH)*1*6*948*51*12*28) | 0.122-0.15 or 0.122-0.20 | 0.13, 0.15, or 0.20 |
| 60 KHz | 10*10^3*1024/((1-OH)*1*6*948*24*12*56) | 0.13-0.15 or 0.13-0.20 | 0.13 or 0.20 |

Alternatively, when the maximum downlink data rate supported by the terminal device is 10 Mbps and the terminal device corresponds to different SCSs, to simplify implementation complexity of the terminal device, the terminal device may send same fourth information. For example, when "SCS=15 KHz or 30 KHz", f1 may be 0.15 or 0.20.

Based on the formula 4, on the FDD band, a maximum downlink data rate corresponding to "f1=1" is 75 Mbps to 85 Mbps. To simplify representation, it may be considered that on the FDD band, for different SCSs, a maximum downlink data rate corresponding to the scaling factor is 80 Mbps.

(2-b) On a TDD band on which a DL-UL ratio is 7:3, the fourth information is equal to a result calculated by using a formula 5, or the fourth information is a value with a preset quantity of reserved digits that is obtained after the result calculated by using the formula 5 is rounded, where the formula 5 is:

$$f1 = X \cdot 10^6 / ((1-OH) \cdot (N \cdot 12/T) \cdot 1 \cdot 6 \cdot R \cdot (DL \text{ ratio})) \quad \text{(Formula 5)}$$

The DL ratio may be 7/10, and other parameters are the same as those described above. Details are not described again.

Based on the formula 5, when the maximum downlink data rate is 10 Mbps and the SCS is separately 15 KHz, 30 KHz, or 60 KHz, an implementation of the value of the fourth information may be shown in Table 11.

TABLE 11

| SCS | Fraction | Value range | Optional value |
|---|---|---|---|
| 15 KHz | (10/7)*10*10^3*1024/((1-OH)*1*6*948*106*12*14) | 0.168-0.20 | 0.17 or 0.20 |
| 30 KHz | (10/7)*10*10^3*1024/((1-OH)*1*6*948*51*12*28) | 0.175-0.20 | 0.18 or 0.20 |
| 60 KHz | (10/7)*10*10^3*1024/((1-OH)*1*6*948*24*12*56) | 0.186-0.20 | 0.19 or 0.20 |

Alternatively, when the maximum downlink data rate supported by the terminal device is 10 Mbps and the terminal device corresponds to different SCSs, to simplify implementation complexity of the terminal device, the terminal device may send same fourth information. For example, when "SCS=15 KHz or 30 KHz", f1 may be 0.18 or 0.20.

Optionally, on the TDD band on which the downlink-uplink ratio is "DL:UL ratio=7:3", a maximum downlink data rate corresponding to "f1=1.0" may be a maximum downlink data rate corresponding to "f1=1.0" in an FDD system multiplied by (7/10).

(2-c) On a TDD band on which a DL-UL ratio is 8:2, the fourth information is equal to a result calculated by using a formula 6, or the fourth information is a value with a preset quantity of reserved digits that is obtained after the result calculated by using the formula 6 is rounded, where the formula 6 is:

$$f1 = X \cdot 10^6 / ((1-OH) \cdot (N \cdot 12/T) \cdot 1 \cdot 6 \cdot R \cdot (DL \text{ ratio})) \quad \text{(Formula 6)}$$

The DL ratio may be 8/10, and other parameters are the same as those described above. Details are not described again.

Based on the formula 6, when the maximum downlink data rate is 10 Mbps and the SCS is separately 15 KHz, 30 KHz, or 60 KHz, an implementation of the value of the fourth information may be shown in Table 12.

TABLE 12

| SCS | Fraction | Value range | Optional value |
|---|---|---|---|
| 15 KHz | (10/8)*10*10^3*1024/((1-OH)*1*6*948*106*12*14) | 0.147-0.20 | 0.15 or 0.20 |
| 30 KHz | (10/8)*10*10^3*1024/((1-OH)*1*6*948*51*12*28) | 0.153-0.20 | 0.15, 0.16, or 0.20 |
| 60 KHz | (10/8)*10*10^3*1024/((1-OH)*1*6*948*24*12*56) | 0.162-0.20 | 0.16, 0.17, or 0.20 |

Alternatively, when the maximum downlink data rate supported by the terminal device is 10 Mbps and the terminal device corresponds to different SCSs, to simplify implementation complexity of the terminal device, the terminal device may send same fourth information. For example, when "SCS=15 KHz or 30 KHz", f1 may be 0.15, 0.16, or 0.20.

Optionally, on the TDD band on which the downlink-uplink ratio is "DL:UL ratio=8:2", a maximum downlink data rate corresponding to "f1=1.0" may be a maximum downlink data rate corresponding to "f1=1.0" in an FDD system multiplied by (8/10).

It should be noted that, to reduce implementation complexity of a standard, a value of f1 may be 0.1. In this case, even though a maximum downlink data rate obtained through calculation by adding f1 to the formula 1 is higher than 10 Mbps, it can still be considered that the maximum downlink data rate corresponding to "f1=0.1" is 10 Mbps. Alternatively, this may be understood as that if a terminal device that has the first capability set in (1) reports "f1=0.1", it indicates that a maximum downlink data rate supported by the terminal device includes 10 Mbps.

To simplify implementation of the terminal device, when the maximum downlink data rate obtained through calculation by adding f1 to the formula 1 fluctuates relative to a target maximum downlink data rate, it can still be considered that the target maximum downlink data rate corresponding to the terminal device is 10 Mbps.

It should be noted that a value range corresponding to f1/f2 in this embodiment of this application may indicate that a value corresponding to f1/f2 is greater than or equal to a value on a left side of the value range corresponding to f1/f2 and less than or equal to a value on a right side of the value range corresponding to f1/f2. Using Table 9 as an example, when "SCS=30 KHz", a value range of f1 is 0.076-0.10, which indicates that a value of f1 may be a value greater than or equal to 0.076 and less than or equal to 0.10. These descriptions are also valid for another implementation in this embodiment of this application.

For example, when different SCSs correspond to same f1, in some application scenarios, a downlink peak rate obtained through calculation by adding f1 to the formula 1, the formula 2, or the formula 3 is lower than a target maximum data rate. The case in (1) is used as an example. It is assumed that the target maximum data rate is 10 Mbps and a value of f1 is 0.06. Corresponding to a case of "SCS=30 KHz or 60 KHz", a maximum downlink data rate obtained through calculation by adding f1 to the formula 1 is separately 9.84 Mbps or 9.24 Mbps. Alternatively, in some application scenarios, a maximum downlink data rate obtained through calculation by adding f1 to the formula 1 is slightly higher than a target maximum data rate (the maximum downlink data rate supported by the terminal device). For example, it is assumed that the target maximum data rate is 10 Mbps and a value of f1 is 0.65. Corresponding to a case of "SCS=15 KHz or 30 KHz", a maximum downlink data rate obtained through calculation by adding f1 to the formula 1 is separately 11.2 Mbps or 10.6 Mbps. In one implementation, regardless of a specific result obtained through calculation by adding f1 to a corresponding formula, it can be understood as that a corresponding target maximum peak rate is 10 Mbps. In another implementation, a specific result (for example, one or two digits after a decimal point are reserved) obtained through calculation by adding f1 to a formula is a target maximum peak rate.

In a possible design, the terminal device reports, on at least one band supported by the terminal device, at least one piece of fourth information corresponding to the at least one band. Alternatively, this may be understood as that the terminal device reports, on each band supported by the terminal device/on which the terminal device works, the fourth information corresponding to the band, and a quantity of pieces of fourth information reported by the terminal device is equal to a quantity of bands on which the terminal device works. For example, if the terminal device works on two bands, the terminal device respectively reports, on the two bands, the fourth information corresponding to the bands.

In a possible design, the fourth information is band-specific, that is, the fourth information reported by the terminal device on different bands may be different. For example, the fourth information reported by the terminal device on an FDD band may be different from that reported on a TDD band.

(3) The quantity of transmit antennas of the terminal device is 1, the channel bandwidth is 20 MHz, and the maximum modulation scheme for uplink data transmission is 64QAM. Optionally, the quantity of receive antennas of the terminal device is 1 or 2, and the maximum modulation scheme for downlink data transmission is 64QAM.

(3-a) On an FDD band, the fifth information is equal to a result calculated by using a formula 7, or the fifth information is a value with a preset quantity of reserved digits that is obtained after the result calculated by using the formula 7 is rounded, where the formula 7 is:

$$f2 = Y \cdot 10^6 / ((1-OH) \cdot (N \cdot 12/T) \cdot 2 \cdot 6 \cdot R) \quad \text{(Formula 7)}$$

Y represents the maximum uplink data rate. For other parameters, refer to the descriptions of the formula 1'. Details are not described again.

Based on the formula 7, when the maximum uplink data rate is 5 Mbps and the SCS is separately 15 KHz, 30 KHz, or 60 KHz, an implementation of the value of the fifth information may be shown in Table 13.

TABLE 13

| SCS | Fraction | Value range | Optional value |
|---|---|---|---|
| 15 KHz | 5*10^3*1024/((1-OH)* 1*6*948*106*12*14) | 0.055-0.06 or 0.055-0.10 | 0.06 or 0.10 |
| 30 KHz | 5*10^3*1024/((1-OH)* 1*6*948*51*12*28) | 0.057-0.06 or 0.057-0.10 | 0.06 or 0.10 |
| 60 KHz | 5*10^3*1024/((1-OH)* 1*6*948*24*12*56) | 0.06-0.07 or 0.06-0.10 | 0.06, 0.07, or 0.10 |

Alternatively, when the maximum uplink data rate supported by the terminal device is 5 Mbps and the terminal device corresponds to different SCSs, to simplify implementation complexity of the terminal device, the terminal device may send same fifth information. For example, when "SCS=15 KHz or 30 KHz", f2 may be 0.06, 0.07, or 0.10.

Based on the formula 7, when the maximum uplink data rate is 50 Mbps and the SCS is separately 15 KHz, 30 KHz, or 60 KHz, an implementation of the value of the fifth information may be shown in Table 14.

TABLE 14

| SCS | Fraction | Value range | Optional value |
|---|---|---|---|
| 15 KHz | 50*10^3*1024/((1-OH)* 1*6*948*106*12*14) | 0.55-0.70 | 0.60 or 0.70 |
| 30 KHz | 50*10^3*1024/((1-OH)* 1*6*948*51*12*28) | 0.57-0.70 | 0.60 or 0.70 |
| 60 KHz | 50*10^3*1024/((1-OH)* 1*6*948*24*12*56) | 0.61-0.70 | 0.60 or 0.70 |

Alternatively, when the maximum uplink data rate supported by the terminal device is 50 Mbps and the terminal device corresponds to different SCSs, to simplify implementation complexity of the terminal device, the terminal device may send same fifth information. For example, when "SCS=15 KHz or 30 KHz", f2 may be 0.60 or 0.70.

(3-b) On a TDD band on which a DL-UL ratio is 7:3, the fifth information is equal to a result calculated by using a formula 8, or the fifth information is a value with a preset quantity of reserved digits that is obtained after the result calculated by using the formula 8 is rounded, where the formula 8 is:

$$f2 = Y \cdot 10^6 / ((1-OH) \cdot (N \cdot 12/T) \cdot 2 \cdot 6 \cdot R \cdot (UL \text{ ratio})) \quad \text{(Formula 8)}$$

The DL ratio is 3/10, which represents a proportion occupied by a UL symbol or a proportion occupied by a UL slot (or a UL subframe) in a TDD DL-UL period. On the TDD band on which the DL:UL configuration is 7:3, the UL ratio may be 3/10. Y represents the maximum uplink data rate. For other parameters, refer to the descriptions of the formula 1'. Details are not described again.

Based on the formula 8, when the maximum uplink data rate is 5 Mbps and the SCS is separately 15 KHz, 30 KHz, or 60 KHz, an implementation of the value of the fifth information may be shown in Table 15.

TABLE 15

| SCS | Fraction | Value range | Optional value |
|---|---|---|---|
| 15 KHz | (10/3)*5*10^3*1024/((1-OH)* 1*6*948*106*12*14) | 0.184-0.20 or 0.184-0.25 | 0.20 or 0.25 |
| 30 KHz | (10/3)*5*10^3*1024/((1-OH)* 1*6*948*51*12*28) | 0.19-0.20 or 0.19-0.25 | 0.20 or 0.25 |
| 60 KHz | (10/3)*5*10^3*1024/((1-OH)* 1*6*948*24*12*56) | 0.202-0.25 or 0.202-0.30 | 0.20 or 0.25 |

Alternatively, when the maximum uplink data rate supported by the terminal device is 5 Mbps and the terminal device corresponds to different SCSs, to simplify implementation complexity of the terminal device, the terminal device may send same fifth information. For example, when "SCS=15 KHz or 30 KHz", f2 may be 0.20, 0.25, or 0.30.

Optionally, on the TDD band on which the downlink-uplink ratio is "DL:UL ratio=7:3", a maximum uplink data rate corresponding to "f2=1.0" may be a maximum uplink data rate corresponding to "f2=1.0" in an FDD system multiplied by (310).

(3-c) On a TDD band on which a downlink-uplink ratio is "DL:UL ratio=8:2", the fifth information is equal to a result calculated by using a formula 9, or the fifth information is a value with a preset quantity of reserved digits that is obtained after the result calculated by using the formula 9 is rounded, where the formula 9 is:

$$f2 = Y \cdot 10^6 / ((1-OH) \cdot (N \cdot 12/T) \cdot 2 \cdot 6 \cdot R \cdot (UL \text{ ratio})) \quad \text{(Formula 9)}$$

The UL ratio may be 2/10, and Y represents the maximum uplink data rate. For other parameters, refer to the descriptions of the formula 1'. Details are not described again.

Based on the formula 9, when the maximum uplink data rate is 5 Mbps and the SCS is separately 15 KHz, 30 KHz, or 60 KHz, an implementation of the value of the fifth information may be shown in Table 16.

TABLE 16

| SCS | Fraction | Value range | Optional value |
|---|---|---|---|
| 15 KHz | (10/2)*5*10^3*1024/((1-OH)* 1*6*948*106*12*14) | 0.275-0.30 or 0.275-0.35 | 0.30 or 0.35 |
| 30 KHz | (10/2)*5*10^3*1024/((1-OH)* 1*6*948*51*12*28) | 0.286-0.30 or 0.286-0.35 | 0.30 or 0.35 |
| 60 KHz | (10/2)*5*10^3*1024/((1-OH)* 1*6*948*24*12*56) | 0.30-0.35 or 0.30-0.40 | 0.30, 0.35, or 0.40 |

Alternatively, when the maximum uplink data rate supported by the terminal device is 5 Mbps and the terminal device corresponds to different SCSs, to simplify implementation complexity of the terminal device, the terminal device may send same fifth information. For example, when "SCS=15 KHz or 30 KHz", f2 may be 0.30, 0.35, or 0.40.

Optionally, on the TDD band on which the downlink-uplink ratio is "DL:UL ratio=8:2", a maximum uplink data rate corresponding to "f2=1.0" may be a maximum uplink data rate corresponding to "f2=1.0" in an FDD system multiplied by (2/10).

(4) The quantity of transmit antennas of the terminal device is 1, the channel bandwidth is 20 MHz, and the maximum modulation scheme for uplink data transmission is 16QAM. Optionally, the quantity of receive antennas of the terminal device is 1 or 2, and the maximum modulation scheme for downlink data transmission is 64QAM.

(4-a) On an FDD band, the fifth information is equal to a result calculated by using a formula 10, or the fifth information is a value with a preset quantity of reserved digits that is obtained after the result calculated by using the formula 10 is rounded, where the formula 10 is:

$$f2 = Y \cdot 10^6 / ((1-OH) \cdot (N \cdot 12/T) \cdot 2 \cdot 4 \cdot R) \quad \text{(Formula 10)}$$

Y represents the maximum uplink data rate. For other parameters, refer to the descriptions of the formula 1'. Details are not described again.

Based on the formula 10, when the maximum uplink data rate is 5 Mbps and the SCS is separately 15 KHz, 30 KHz, or 60 KHz, an implementation of the value of the fifth information may be shown in Table 17.

TABLE 17

| SCS | Fraction | Value range | Optional value |
|---|---|---|---|
| 15 KHz | 5*10^3*1024/((1-OH)* 1*4*948*106*12*14) | 0.083-0.10 | 0.09 or 0.10 |
| 30 KHz | 5*10^3*1024/((1-OH)* 1*4*948*51*12*28) | 0.086-0.10 | 0.09 or 0.10 |
| 60 KHz | 5*10^3*1024/((1-OH)* 1*4*948*24*12*56) | 0.091-0.10 | 0.09 or 0.10 |

Alternatively, when the maximum uplink data rate supported by the terminal device is 5 Mbps and the terminal device corresponds to different SCSs, to simplify implementation complexity of the terminal device, the terminal device may send same fifth information. For example, when "SCS=15 KHz or 30 KHz", f2 may be 0.09 or 0.10.

Based on the formula 10, when the maximum uplink data rate is 50 Mbps and the SCS is separately 15 KHz, 30 KHz, or 60 KHz, an implementation of the value of the fifth information may be shown in Table 18.

TABLE 18

| SCS | Fraction | Value range | Optional value |
|---|---|---|---|
| 15 KHz | 50*10^3*1024/((1-OH)* 1*4*948*106*12*14) | 0.82-0.90 or 0.82-1.0 | 0.90, 0.95, or 1.0 |
| 30 KHz | 50*10^3*1024/((1-OH)* 1*4*948*51*12*28) | 0.86-0.90 or 0.86-1.0 | 0.90, 0.95, or 1.0 |
| 60 KHz | 50*10^3*1024/((1-OH)* 1*4*948*24*12*56) | 0.90-0.10 | 0.90, 0.95, or 1.0 |

Alternatively, when the maximum uplink data rate supported by the terminal device is 50 Mbps and the terminal device corresponds to different SCSs, to simplify implementation complexity of the terminal device, the terminal device may send same fifth information. For example, when "SCS=15 KHz or 30 KHz", f2 may be 0.90, 0.95, or 1.0.

(4-b) On a TDD band on which a downlink-uplink ratio is "DL:UL ratio=7:3", the fifth information is equal to a result calculated by using a formula 11, or the fifth information is a value with a preset quantity of reserved digits that is obtained after the result calculated by using the formula 11 is rounded, where the formula 11 is:

$$f2 = Y \cdot 10^6 / ((1-OH) \cdot (N \cdot 12/T) \cdot 2 \cdot 4 \cdot R \cdot (UL \text{ ratio})) \quad \text{(Formula 11)}$$

The UL ratio is 3/10, and Y represents the maximum uplink data rate. For other parameters, refer to the descriptions of the formula 1'. Details are not described again.

Based on the formula 11, when the maximum uplink data rate is 5 Mbps and the SCS is separately 15 KHz, 30 KHz, or 60 KHz, an implementation of the value of the fifth information may be shown in Table 19.

TABLE 19

| SCS | Fraction | Value range | Optional value |
|---|---|---|---|
| 15 KHz | (10/3)*5*10^3*1024/((1-OH)* 1*4*948*106*12*14) | 0.275-0.30 or 0.275-0.35 | 0.30 or 0.35 |
| 30 KHz | (10/3)*5*10^3*1024/((1-OH)* 1*4*948*51*12*28) | 0.285-0.30 or 0.285-0.35 | 0.30 or 0.35 |
| 60 KHz | (10/3)*5*10^3*1024/((1-OH)* 1*4*948*24*12*56) | 0.30-0.35 | 0.30 or 0.35 |

Alternatively, when the maximum uplink data rate supported by the terminal device is 5 Mbps and the terminal device corresponds to different SCSs, to simplify implementation complexity of the terminal device, the terminal device may send same fifth information. For example, when "SCS=15 KHz or 30 KHz", f2 may be 0.30 or 0.35.

Optionally, on the TDD band on which the downlink-uplink ratio is "DL:UL ratio=7:3", a maximum uplink data rate corresponding to "f2=1.0" may be a maximum uplink data rate corresponding to "f2=1.0" in an FDD system multiplied by (3/10).

(4-c) On a TDD band on which a downlink-uplink ratio is "DL:UL ratio=8:2", the fifth information is equal to a result calculated by using a formula 12, or the fifth information is a value with a preset quantity of reserved digits that is obtained after the result calculated by using the formula 12 is rounded, where the formula 12 is:

$$f2 = Y \cdot 10^6 / ((1-OH) \cdot (N \cdot 12/T) \cdot 2 \cdot 4 \cdot R \cdot (UL \text{ ratio})) \quad \text{(Formula 12)}$$

The UL ratio may be 2/10, and Y represents the maximum uplink data rate. For other parameters, refer to the descriptions of the formula 1'. Details are not described again.

Based on the formula 12, when the maximum uplink data rate is 5 Mbps and the SCS is separately 15 KHz, 30 KHz, or 60 KHz, an implementation of the value of the fifth information may be shown in Table 20.

TABLE 20

| SCS | Fraction | Value range | Optional value |
|---|---|---|---|
| 15 KHz | (10/2)*5*10^3*1024/((1-OH)*1*4*948*106*12*14) | 0.41-0.50 | 0.45 or 0.50 |
| 30 KHz | (10/2)*5*10^3*1024/((1-OH)*1*4*948*51*12*28) | 0.43-0.50 | 0.45 or 0.50 |
| 60 KHz | (10/2)*5*10^3*1024/((1-OH)*1*4*948*24*12*56) | 0.45-0.50 | 0.45 or 0.50 |

Alternatively, when the maximum uplink data rate supported by the terminal device is 5 Mbps and the terminal device corresponds to different SCSs, to simplify implementation complexity of the terminal device, the terminal device may send same fifth information. For example, when "SCS=15 KHz or 30 KHz", f2 may be 0.45 or 0.50.

Optionally, on the TDD band on which the downlink-uplink ratio is "DL:UL ratio=8:2", a maximum uplink data rate corresponding to "f2=1.0" may be a maximum uplink data rate corresponding to "f2=1.0" in an FDD system multiplied by (2/8).

In conclusion, optionally, in this embodiment of this application, fourth values or fifth values of low maximum data rates (a maximum downlink data rate is 10 Mbps and a maximum uplink data rate is 5 Mbps) corresponding to terminal devices having different capability parameters may be shown in Table 21. Optionally, the channel bandwidth of the terminal device is 20 MHz.

TABLE 21

| First capability set | 1T2R, DL: 64QAM | 1T1R, DL: 64QAM | 1T1R or 1T2R, UL: 64QAM | 1T1R or 1T2R, UL: 16QAM |
|---|---|---|---|---|
| | f1 | | f2 | |
| FDD | 0.06, 0.07, or 0.10 | 0.15 or 0.20 | 0.06, 0.07, or 0.10 | 0.09 or 0.10 |
| TDD (4 GHz, DL:UL = 7:3) | 0.09, 0.95, or 0.10 | 0.18 or 0.20 | 0.20, 0.25, or 0.30 | 0.30 or 0.35 |
| TDD (2.6 GHz, DL:UL = 8:2) | 0.08 or 0.10 | 0.15, 0.16, or 0.20 | 0.30, 0.35, or 0.40 | 0.45 or 0.50 |

In a possible design, the terminal device reports, on at least one band supported by the terminal device, at least one piece of fifth information corresponding to the at least one band. Alternatively, this may be understood as that the terminal device reports, on each band supported by the terminal device/on which the terminal device works, the fifth information corresponding to the band, and a quantity of pieces of fifth information reported by the terminal device is equal to a quantity of bands on which the terminal device works. For example, if the terminal device works on two bands, the terminal device respectively reports, on the two bands, the fifth information corresponding to the bands.

In a possible design, the fifth information is band-specific, that is, the fifth information reported by the terminal device on different bands may be different. For example, the fifth information reported by the terminal device on an FDD band may be different from that reported on a TDD band.

In a possible design, on different bands, REDCAP terminal devices supporting different capability parameters (for example, a quantity of transmit/receive antennas and a maximum uplink modulation scheme) may report different fourth information and/or fifth information. Different capability parameters supported by the REDCAP terminal devices may be distinguished by using the fourth information and/or the fifth information reported by the REDCAP terminal devices, for example, quantities of transmit/receive antennas and maximum uplink modulation schemes of the REDCAP terminal devices may be distinguished. For example, descriptions are provided in (1) to (6).

(1) On an FDD band, a terminal device with 1T2R may report 0.10 to indicate that a low maximum downlink data rate such as 10 Mbps is supported, and a terminal device with 1T1R may report 0.20 to indicate that a low maximum downlink data rate such as 10 Mbps is supported. Further, optionally, the terminal device with 1T2R and the terminal device with 1T1R may be considered as terminal devices of one type (for example, REDCAP terminal devices). The network device may use different fourth information (for example, the fourth information separately corresponds to 0.10 and 0.20) reported by the terminal device with 1T2R and the terminal device with 1T1R to distinguish between quantities of transmit/receive antennas of the REDCAP terminal devices, for example, 1T1R or 1T2R.

(2) On an FDD band, a terminal device whose maximum uplink modulation scheme is 64QAM may report 0.06, 0.07, or 0.10 to indicate that a low maximum uplink data rate such as 5 Mbps is supported, and a terminal device whose maximum uplink modulation scheme is 16QAM may report 0.09 or 0.10 to indicate that a low maximum uplink data rate such as 5 Mbps is supported. Further, optionally, the terminal device supporting uplink 64QAM and the terminal device supporting uplink 16QAM may be considered as terminal devices of one type (for example, REDCAP terminal devices). The network device may distinguish between the maximum uplink modulation schemes, such as 16QAM or 64QAM, of the two REDCAP terminal devices by using different fifth information reported by the REDCAP terminal devices, for example, the terminal device supporting uplink 64QAM reports 0.06 or 0.07, and the terminal device supporting uplink 16QAM reports 0.10.

(3) On a TDD band on which a downlink-uplink ratio is "DL:UL ratio=7:3", similarly, a terminal device with 1T2R may report 0.10 to indicate that a low maximum downlink data rate such as 10 Mbps is supported, and a terminal device with 1T1R may report 0.20 to indicate that a low maximum downlink data rate such as 10 Mbps is supported. Further, optionally, the terminal device with 1T2R and the terminal device with 1T1R may be considered as terminal devices of one type, for example, REDCAP terminal devices. The network device may use different fourth information (for example, the fourth information separately corresponds to 0.10 and 0.20) reported by the terminal device with 1T2R and the terminal device with 1T1R to distinguish between quantities of transmit/receive antennas of the REDCAP terminal devices, for example, 1T1R or 1T2R.

(4) On a TDD band on which a downlink-uplink ratio is "DL:UL ratio=7:3", a terminal device whose maximum uplink modulation scheme is 64QAM may report 0.20, 0.25, or 0.30 to indicate that a low maximum uplink data rate such as 5 Mbps is supported, and a terminal device whose maximum uplink modulation scheme is 16QAM may report 0.30 or 0.35 to indicate that a low maximum uplink data rate such as 5 Mbps is supported. Further, optionally, the terminal device supporting uplink 64QAM and the terminal device supporting uplink 16QAM may be considered as terminal devices of one type, for example, REDCAP terminal devices. The network device may distinguish between the maximum uplink modulation schemes, such as 16QAM or 64QAM, of the two REDCAP terminal devices by using different fifth information reported by the REDCAP terminal devices, for example, the terminal device supporting uplink 64QAM reports 0.20, 0.25, or 0.30, and the terminal device supporting uplink 16QAM reports 0.35.

(5) On a TDD band on which a downlink-uplink ratio is "DL:UL ratio=8:2", similarly, a terminal device with 1T2R may report 0.10 to indicate that a low maximum downlink data rate such as 10 Mbps is supported, and a terminal device with 1T1R may report 0.20 to indicate that a low maximum downlink data rate such as 10 Mbps is supported. Further, optionally, the terminal device with 1T2R and the terminal device with 1T1R may be considered as terminal devices of one type, for example, REDCAP terminal devices. The network device may use different fourth information (for example, the fourth information separately corresponds to 0.10 and 0.20) reported by the terminal device with 1T2R and the terminal device with 1T1R to distinguish between quantities of transmit/receive antennas of the REDCAP terminal devices, for example, 1T1R or 1T2R.

(6) On a TDD band on which a downlink-uplink ratio is "DL:UL ratio=8:2", a terminal device whose maximum uplink modulation scheme is 64QAM may report 0.30, 0.35, or 0.40 to indicate that a low maximum uplink data rate such as 5 Mbps is supported, and a terminal device whose maximum uplink modulation scheme is 16QAM may report 0.45 or 0.50 to indicate that a low maximum uplink data rate such as 5 Mbps is supported. Further, optionally, the terminal device supporting uplink 64QAM and the terminal device supporting uplink 16QAM may be considered as terminal devices of one type, for example, REDCAP terminal devices. The network device may distinguish between the maximum uplink modulation schemes, such as 16QAM or 64QAM, of the two REDCAP terminal devices by using different fifth information reported by the REDCAP terminal devices, for example, the terminal device supporting uplink 64QAM reports 0.30, 0.35, or 0.40, and the terminal device supporting uplink 16QAM reports 0.45 or 0.50.

Alternatively, regardless of an FDD band or a TDD band, a REDCAP terminal device with 1T2R may report 0.10 to indicate that a low maximum downlink data rate such as 10 Mbps is supported, and a REDCAP terminal device with 1T1R may report 0.20 to indicate that a low maximum downlink data rate such as 10 Mbps is supported. In other words, different capability parameters (for example, quantities of transmit/receive antennas) supported by the RED-CAP terminal devices may be distinguished by using the fourth information and/or the fifth information reported by the REDCAP terminal devices.

(1) For a maximum downlink data rate, the fourth information may be reported without distinguishing between bands, or may be reported by distinguishing between bands. When being reported by distinguishing between bands, corresponding fourth information may be different (for example, fourth information corresponding to 1T2R is 0.10, and fourth information corresponding to 1T1R is 0.20), or may be the same. Further, optionally, for TDD bands with different center frequencies, DL fourth information may be reported by distinguishing between different TDD bands, or may be reported without distinguishing between different TDD bands, that is, one piece of fourth information is reported for TDD bands with different center frequencies. In other words, the fourth information is for all TDD bands that can be supported by the terminal device. In this way, a signaling reporting design can be simplified.

(2) For a maximum uplink data rate, due to limitation of a DL-UL configuration, an FDD band and a TDD band correspond to different fifth information. For example, on the FDD band, a terminal device supporting an uplink modulation scheme 64QAM may report 0.06 or 0.07 to indicate that a supported maximum uplink data rate is 5 Mbps, and a terminal device supporting an uplink modulation scheme 16QAM may report 0.09 or 0.10 to indicate that a supported maximum uplink data rate is 5 Mbps. On the TDD band, one piece of fifth information may be reported for TDD bands with different center frequencies. For example, the terminal device supporting the uplink modulation scheme 64QAM may report 0.30, 0.35, or 0.40 to indicate that the supported maximum uplink data rate is 5 Mbps, and the terminal device supporting the uplink modulation scheme 16QAM may report 0.35, 0.45, or 0.50 to indicate that the supported maximum uplink data rate is 5 Mbps. In other words, optionally, for the TDD bands with different center frequencies, UL fifth information may be reported by distinguishing between the TDD bands, or may be reported without distinguishing between the TDD bands, that is, same fifth information may be reported for the TDD bands with different center frequencies.

Optionally, considering an uplink-downlink ratio on the TDD band, when an uplink resource corresponding to an uplink ratio is comparable to an uplink resource on the FDD band (for example, the uplink-downlink ratio is "UL:DL=9:1" or "UL:DL=8:2"), an uplink scaling factor may be reported uniformly for the FDD band and the TDD band, that is, the uplink scaling factor is reported without distinguishing between the FDD band and the TDD band. In another aspect, when a downlink resource corresponding to a downlink ratio is comparable to a downlink resource on the FDD band (for example, the uplink-downlink ratio is "UL:DL=1:9", "UL:DL=2:8", or "UL:DL=3:7"), a downlink scaling factor may be reported uniformly for the FDD band and the TDD band, that is, the downlink scaling factor is reported without distinguishing between the FDD band and the TDD band.

It should be noted that in this application, on a TDD band, simplification processing is performed for a special subframe or a special slot in a DL:UL ratio or UL:DL ratio. For example, it is assumed that TDD DL:UL=7:3, considering impact of the special subframe or the special slot, a proportion actually used for downlink transmission may be greater than 7/10 and less than 8/10, or a proportion actually used for downlink transmission is less than 6/10 and greater than 5/10. Correspondingly, considering impact of the special subframe or the special slot, a proportion actually used for uplink transmission may be greater than 2/10 and less than 3/10, or a proportion actually used for downlink transmission is greater than 4/10 and less than 5/10.

It is described in the foregoing that different bands may correspond to different fourth information and/or fifth information. To be specific, the fourth information and/or the fifth information corresponding to different bands may be separately reported based on the bands, and values of the fourth information and/or the fifth information corresponding to the different bands may be the same or may be different.

Alternatively, different bands may correspond to same fourth information and/or fifth information. In this way, regardless of an FDD band or a TDD band, through corresponding fourth information and/or fifth information, a REDCAP terminal device can support a maximum downlink data rate of 10 Mbps and/or a maximum uplink data rate of 5 Mbps. A target maximum data rate is not affected by a TDD uplink-downlink ratio, which increases competitiveness of the REDCAP terminal device on the TDD band.

In this embodiment of this application, the terminal device has a same data rate and different scaling factors on different bands. For a specific implementation, refer to the foregoing descriptions.

In this embodiment of this application, the terminal device has a same data rate and different scaling factors on a TDD band and an FDD band. Specifically, a scaling factor of the terminal device on the TDD band is related to an uplink-downlink ratio on the TDD band. For example, UL or DL data rates of the terminal device on both the TDD band and the FDD band are X Mbps (X is not greater than 20), but scaling factors are different. For another example, UL data rates of the terminal device on both the TDD band and the FDD band are 5 Mbps, but scaling factors are different. For another example, DL data rates of the terminal device on both the TDD band and the FDD band are 10 Mbps, but scaling factors are different. For a specific implementation, refer to the foregoing descriptions.

In this embodiment of this application, a difference between data rates of the terminal device on the TDD band and the FDD band is not greater than 1 Mbps or 5 Mbps, but scaling factors on the TDD band and the FDD band are different. Specifically, the scaling factor of the terminal device on the TDD band is related to the uplink-downlink ratio on the TDD band. For example, a UL data rate of the terminal device on the TDD band is 5 Mbps, a UL data rate of the terminal device on the FDD band is 5.5 Mbps, and scaling factors of the terminal device on the FDD band and the TDD band are different. For a specific implementation, refer to the foregoing descriptions.

In this embodiment of this application, a maximum downlink peak rate corresponding to a first scaling factor of the terminal device is not greater than 20 Mbps, and/or a maximum downlink peak rate corresponding to a second scaling factor of the terminal device is not less than 60 Mbps, 80 Mbps, or 150 Mbps. For a specific implementation, refer to the foregoing implementation for determining f1.

In this embodiment of this application, a maximum uplink peak rate corresponding to a third scaling factor of the terminal device is not greater than 10 Mbps, and/or a maximum uplink peak rate corresponding to a fourth scaling factor of the terminal device is not less than 40 Mbps or 50 Mbps. For a specific implementation, refer to the foregoing implementation for determining f2.

In this embodiment of this application, the fourth information may correspond to a DL scaling factor (for example, the first scaling factor and the second scaling factor), and the fifth information may correspond to a UL scaling factor (for example, the third scaling factor and the fourth scaling factor).

In this embodiment of this application, the scaling factor (for example, the first scaling factor, the second scaling factor, the third scaling factor, and the fourth scaling factor) may be reported as a capability parameter. Optionally, the scaling factor may be a parameter included in the first capability set, may be a parameter included in another capability set, or may be directly reported as a capability parameter.

In this embodiment of this application, the scaling factor (for example, the first scaling factor, the second scaling factor, the third scaling factor, and the fourth scaling factor) is the scaling factor, namely, the parameter f, corresponding to the formula 1 or the formula 1'.

In this embodiment of this application, the fourth information or the fifth information reported by the terminal device may be separately determined from one set. A set corresponding to the fourth information is used as an example, where the set includes two values. One value corresponds to a relatively low maximum downlink data rate, and the relatively low maximum downlink data rate is not greater than 20 Mbps, for example, may be 10 Mbps. The other value corresponds to a relatively high maximum data rate, and the relatively high maximum data rate is not less than 60 Mbps, for example, may be 150 Mbps; or the other value may be directly 1.0, and 1.0 indicates a maximum downlink data rate that can be reached by the terminal device or corresponds to the foregoing relatively high maximum downlink data rate. Alternatively, a set corresponding to the fifth information is used as an example, where the set includes two values. One value corresponds to a relatively low maximum uplink data rate, and the relatively low maximum uplink data rate is not greater than 10 Mbps, for example, may be 5 Mbps. The other value corresponds to a relatively high maximum uplink data rate, and the relatively high maximum uplink data rate is not less than 40 Mbps or 50 Mbps, for example, may be 50 Mbps; or the other value may be directly 1.0, and 1.0 indicates a maximum uplink data rate that can be reached by the terminal device or corresponds to the foregoing relatively high maximum uplink data rate.

Optionally, the set corresponding to the fourth information or the set corresponding to the fifth information may further include another value, for example, may include one or more values in {0.8, 0.75, 0.4} stipulated in an existing protocol, so that more different levels of maximum data rates can be implemented.

In this embodiment of this application, optionally, a corresponding value of the fourth information or the fifth information that separately meets a maximum downlink data rate of 10 Mbps and a maximum uplink data rate of 5 Mbps is used by only the REDCAP terminal device, to avoid impact on a peak data rate of an existing delivered eMBB terminal device.

Optionally, in this embodiment of this application, from a perspective of a system side, a corresponding scaling factor set may include an existing scaling factor, for example, {1, 0.8, 0.75, 0.4}, and further include f1 and f2 described above. If no value in f1 and f2 is equal to 1, another value other than f1 and f2 in the set is used for only an eMBB terminal device in NR, or is used for an NR legacy terminal device. If a value in f1 and f2 is equal to 1, another value other than f1 and f2 that is unequal to 1 in the set is used for only the eMBB terminal device in NR, or is used for the NR legacy terminal device.

In this embodiment of this application, in addition to respectively reporting the fourth information and the fifth information for a maximum downlink data rate and a maximum uplink data rate, sixth information may also be reported for the maximum downlink data rate and the maximum uplink data rate. A maximum downlink data rate that is of the terminal device and that corresponds to the sixth information is less than or equal to X megabits/second, where X is 10 or 150, In addition, a maximum uplink data rate that is of the terminal device and that corresponds to the sixth information is not higher than Y megabits/second, where Y is 5 or 50. Based on the foregoing related descriptions, the sixth information may be a larger value in the fourth information and the fifth information that respectively correspond to the maximum downlink data rate and the maximum uplink data rate. In this way, standard implementation can be simplified.

In some embodiments, the terminal device sends fourth information to the network device. The fourth information indicates a first parameter f1, where f1 is a number greater than 0 and less than 1, and a maximum downlink data rate that is of the terminal device and that corresponds to f1 is not higher than a first target rate. The first target rate is 10 Mbps;

or the first target rate is (10+delta1) Mbps, where delta1 is a value greater than or equal to 0 and less than or equal to 5; or the first target rate is not greater than 20 Mbps. In addition, the fourth information may further indicate a second parameter f1', where f1' is a number greater than 0 and less than 1, and a maximum downlink data rate that is of the terminal device and that corresponds to f1' is not less than 60 Mbps. For a calculation manner corresponding to f1', refer to the foregoing implementation.

In some embodiments, the terminal device sends fifth information to the network device. The fifth information indicates a third parameter f2, where f2 is a number greater than 0 and less than 1, and a maximum uplink data rate that is of the terminal device and that corresponds to f2 is not higher than a first target rate. The first target rate is 5 Mbps; or the first target rate is (5+delta2) Mbps, where delta2 is a value greater than or equal to 0 and less than or equal to 2.5;

and a maximum UL data rate is 50 Mbps or 5 Mbps. Alternatively, this may be understood as follows: The maximum data rate corresponding to the REDCAP terminal device is that the maximum DL data rate is 150 Mbps and the maximum UL data rate is 10 Mbps, or that the maximum DL data rate is 50 Mbps and the maximum UL data rate is 5 Mbps.

In this application, different fourth information and/or fifth information are/is introduced to support a requirement of a REDCAP terminal device for a low data transmission rate. For example, even if there is only one type of REDCAP terminal device, this implementation may be used to support an uplink/downlink peak transmission rate corresponding to a currently identified application scenario.

For different capabilities of the REDCAP terminal device, for example, when the first capability set includes different capability parameters, value ranges of the fourth information (f1) and the fifth information (f2) may be shown in Table 22.

TABLE 22

| | First capability set | | | | | | | |
|---|---|---|---|---|---|---|---|---|
| | 1T2R, DL: 64QAM UL: 64QAM | | 1T2R, DL: 64QAM UL: 16QAM | | 1T1R, DL: 64QAM UL: 64QAM | | 1T1R, DL: 64QAM UL: 16QAM | |
| Transmission direction | f1 | f2 | f1 | f2 | f1 | f2 | f1 | f2 |
| FDD | 0.062-0.10 | 0.058-0.10 | 0.062-0.10 | 0.086-0.10 | 0.13-0.20 | 0.058-0.10 | 0.13-0.20 | 0.086-0.10 |
| TDD, DL:UL = 7:3 | 0.088-0.1 | 0.191-0.2 | 0.088-0.1 | 0.29-0.3 | 0.18-0.2 | 0.191-0.2 | 0.18-0.2 | 0.29-0.3 |
| TDD, DL:UL = 8:2 | 0.088-0.1 | 0.29-0.3 | 0.088-0.1 | 0.43-0.5 | 0.16-0.2 | 0.29-0.3 | 0.16-0.2 | 0.43-0.5 | or the first target rate is not greater than 10 Mbps. The fifth information may further indicate a fourth parameter f2', where f2' is a number greater than 0 and less than 1, and a maximum uplink data rate that is of the terminal device and that corresponds to f2' is not less than 40 Mbps. For a calculation manner corresponding to f2', refer to the foregoing implementation.

In some other embodiments, the terminal device sends sixth information to the network device, where a maximum downlink data rate that is of the terminal device and that corresponds to the sixth information is not higher than a first target rate, and a maximum uplink data rate that is of the terminal device and that corresponds to the sixth information is not higher than a second target rate. The first target rate and the second target rate are the same as those described above.

In the foregoing manner, in an aspect, it may be implemented that even if there is only one type of terminal device in a network, different data transmission rates may be implemented, to meet data transmission efficiency in different application scenarios. In another aspect, it may be implemented that even if terminal devices correspond to a same capability parameter, the fourth information and/or the fifth information may be reported to indicate different data rates that can be supported by the terminal devices with a same capability, to identify different rates of the terminal devices. In still another aspect, it may be further implemented that different types of terminal devices report different fourth information and/or fifth information to distinguish between the different types of terminal devices.

A REDCAP terminal device is used as an example. A maximum data rate that corresponds to the REDCAP terminal device and that is defined in a current standard includes: A maximum DL data rate is 150 Mbps or 10 Mbps, In the foregoing embodiments provided in this application, the method provided in embodiments of this application is separately described from perspectives of the terminal device, the network device, and interaction between the terminal device and the network device. To implement functions in the method provided in the foregoing embodiments of this application, the terminal device and the network device may include a hardware structure and/or a software module, and the foregoing functions are implemented in a form of a hardware structure, a software module, or a hardware structure plus a software module. Whether one of the foregoing functions is performed in the manner of a hardware structure, a software module, or a hardware structure and a software module depends on a specific application and design constraints of the technical solutions.

Figure 7:
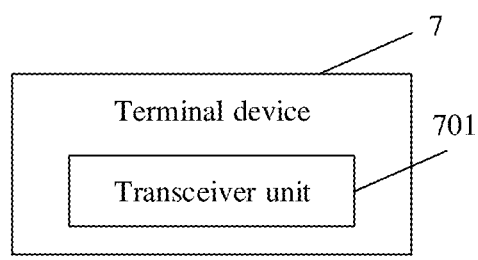
FIG. 7 is a schematic diagram of a structure of another terminal device according to an embodiment of this application.

When each functional module is obtained through division for each function, FIG. 7 is a schematic diagram of a possible structure of a terminal device 7 in the foregoing embodiments. The terminal device 7 includes a transceiver unit 701. In this embodiment of this application, the transceiver unit 701 is configured to send first information to a network device, where the first information indicates that the terminal device is a first-type terminal device, a capability parameter corresponding to the first-type terminal device includes a first capability set, the first capability set includes a channel bandwidth supported by the terminal device and a quantity of transmit antennas of the terminal device, the channel bandwidth of the terminal device is less than 100 megahertz, and the quantity of transmit antennas of the terminal device is less than 4. The transceiver unit 701 may be a sending unit or a transmitter when sending information, and may be a receiving unit or a receiver when receiving information. The transceiver unit may be a transceiver, and the transceiver, the transmitter, or the receiver may be a radio frequency circuit. When the terminal device includes a storage unit, the storage unit is configured to store computer instructions. A processor is communicatively connected to the memory, and the processor executes the computer instructions stored in the memory, so that the terminal device performs the method in the embodiment in FIG. 5. The processor may be a general-purpose central processing unit (CPU), a microprocessor, or an ASIC. When the terminal device is a chip, the transceiver unit 701 may be an input interface and/or an output interface, a pin, a circuit, or the like. The processing unit may execute the computer execution instructions stored in the storage unit, so that the chip in the terminal device performs the method in FIG. 5. Optionally, the storage unit is a storage unit in the chip, such as a register or a cache; or the storage unit may be a storage unit that is in the terminal and that is located outside the chip, such as a ROM or another type of static storage device such as a RAM that can store static information and instructions.

In the method embodiment shown in FIG. 5, the transceiver unit 701 is configured to support the terminal device in performing the process 501 in FIG. 5. All related content of the steps in the method embodiments may be cited in function descriptions of corresponding functional modules. Details are not described herein again.

The transceiver unit 701 may be the communications interface 304 in FIG. 3.

Figure 8:
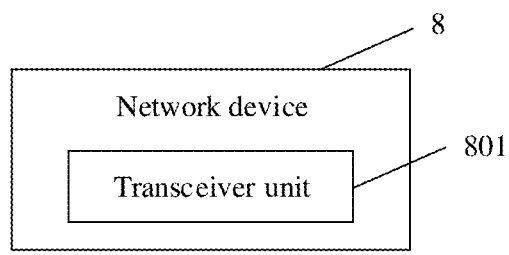
FIG. 8 is a schematic diagram of a structure of another network device according to an embodiment of this application.

When each functional module is obtained through division for each function, FIG. 8 is a schematic diagram of a possible structure of a network device 8 in the foregoing embodiments. The network device 8 includes a transceiver unit 801. In this embodiment of this application, the transceiver unit 801 is configured to receive first information from a terminal device, where the first information indicates that the terminal device is a first-type terminal device, a capability parameter corresponding to the first-type terminal device includes a first capability set, the first capability set includes a channel bandwidth supported by the terminal device and a quantity of transmit antennas of the terminal device, the channel bandwidth of the terminal device is less than 100 megahertz, and the quantity of transmit antennas of the terminal device is less than 4. The transceiver unit 801 may be a sending unit or a transmitter when sending information, and may be a receiving unit or a receiver when receiving information. The transceiver unit may be a transceiver, and the transceiver, the transmitter, or the receiver may be a radio frequency circuit. When the network device includes a storage unit, the storage unit is configured to store computer instructions. A processor is communicatively connected to the memory, and the processor executes the computer instructions stored in the memory, so that the network device performs the method in the embodiment in FIG. 5. The processor may be a general-purpose central processing unit (CPU), a microprocessor, or an ASIC. When the network device is a chip, the transceiver unit 801 may be an input interface and/or an output interface, a pin, a circuit, or the like. The processing unit may execute the computer execution instructions stored in the storage unit, so that the chip in the network device performs the method in FIG. 5. Optionally, the storage unit is a storage unit in the chip, such as a register or a cache; or the storage unit may be a storage unit that is in the terminal and that is located outside the chip, such as a ROM or another type of static storage device such as a RAM that can store static information and instructions.

In the method embodiment shown in FIG. 5, the transceiver unit 801 is configured to support the network device in performing the process 502 in FIG. 5. All related content of the steps in the method embodiments may be cited in function descriptions of corresponding functional modules. Details are not described herein again.

The transceiver unit 801 may be the communications interface 404 in FIG. 4.

For example, in the foregoing apparatus embodiments, the terminal device or the network device may entirely correspond to the terminal device or the network device in the method embodiments. A corresponding module or unit performs a corresponding step, for example, a communications module (transceiver) may perform a sending step and/or a receiving step in the method embodiments. Other steps except sending and receiving may be performed by a processing unit (processor). For a function of a specific unit, refer to a corresponding method embodiment. The sending unit and the receiving unit may form a transceiver unit, and the transmitter and the receiver may form a transceiver, to jointly implement a receiving/sending function. There may be one or more processors.

For example, the functions of the terminal device or the network device may be implemented by using a chip. The processing unit may be implemented by using hardware or may be implemented by using software. When implemented by using hardware, the processing unit may be a logic circuit, an integrated circuit, or the like. When implemented by using software, the processing unit may be a general-purpose processor, and is implemented by reading software code stored in the storage unit. The storage unit may be integrated into the processor, or may be located outside the processor and exist independently.

In the foregoing apparatus embodiments, the terminal device or the network device entirely corresponds to the terminal device or the network device in the method embodiments. A corresponding module or unit performs a corresponding step, for example, a sending module (transmitter) method performs a sending step in the method embodiments, and a receiving module (receiver) performs a receiving step in the method embodiments. Other steps except sending and receiving may be performed by a processing module (processor). For a function of a specific module, refer to a corresponding method embodiment. The sending module and the receiving module may form a transmitter module, and the transmitter and the receiver may form a transceiver, to jointly implement a receiving/sending function. There may be one or more processors.

Division into the modules or the units in embodiments of this application is an example, and is merely a logical function division. During actual implementation, another division manner may be used. In addition, functional modules in embodiments of this application may be integrated into one processor, or each of the modules may exist alone physically, or two or more modules may be integrated into one module. The integrated module may be implemented in a form of hardware, or may be implemented in a form of a software functional module. For example, in embodiments of this application, the receiving unit and the sending unit may be integrated into the transceiver unit.

All or some of the methods in embodiments of this application may be implemented by using software, hardware, firmware, or any combination thereof. When software is used to implement the methods, all or some of the methods may be implemented in a form of a computer program product. The computer program product includes one or more computer instructions. When the computer program instructions are loaded and executed on the computer, all or some of the procedures or functions according to embodiments of this application are generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a magnetic disk, or a magnetic tape), an optical medium (for example, a digital video disc (digital video disc, DVD)), a semiconductor medium (for example, a solid-state drive (solid-state drive, SSD)), or the like.

Clearly, a person skilled in the art can make various modifications and variations to embodiments of this application without departing from the spirit and scope of this application. In this way, this application is intended to cover these modifications and variations of embodiments of this application provided that they fall within the scope of the following claims and their equivalent technologies.

What is claimed is:

1. An information sending method, comprising:
   sending first information to a network device, wherein the first information indicates that the terminal device is a first-type terminal device, wherein the first-type terminal device is a reduced-capability (REDCAP) terminal device, a capability parameter corresponding to the first-type terminal device including a first capability set, the first capability set including a channel bandwidth supported by the terminal device, a quantity of transmit antennas of the terminal device and a quantity of receive antennas of the terminal device, the channel bandwidth of the terminal device is less than 100 megahertz, and the quantity of transmit antennas of the terminal device is less than 4, the quantity of receive antennas of the terminal device is less than 4, and the first information is carried in a preamble, a message 3, Msg3, or a message A, MsgA;
   sending second information to the network device, wherein the second information indicates that the capability parameter corresponding to the first-type terminal device further includes at least one of a second capability set, a third capability set, a fourth capability set, a fifth capability set, and the second information is sent in a connected state, wherein the second capability set is used to represent a power saving capability of the terminal device, the third capability set is used to represent a short-latency processing capability of the terminal device; the fourth capability set is used to represent a small data transmission capability of the terminal device, the fifth capability set is used to represent a transmission reliability capability of the terminal device.

2. The method according to claim 1, wherein the channel bandwidth of the terminal device is 20 megahertz, MHz, the quantity of transmit antennas of the terminal device is 1 or 2; and the quantity of receive antennas of the terminal device is 1 or 2.

3. The method according to claim 1, wherein the second capability set includes a representation of a power saving capability of the terminal device;
   the third capability set is used to represent a short-latency processing capability of the terminal device;
   the fourth capability set is used to represent a small data transmission capability and/or an inactive data transmission capability of the terminal device;
   the fifth capability set is used to represent a transmission reliability capability of the terminal device.

4. The method according to claim 1, wherein the sending the first information includes sending the first information in an initial access phase.

5. The method according to claim 1, wherein
   the second capability set includes at least one of the following: a maximum quantity of pieces of downlink control information, DCI, with different DCI sizes that is supported by the terminal device, the terminal device supports cross slot scheduling, the terminal device supports reception of a wakeup signal, WUS, the terminal device supports radio resource management, RRM, measurement relaxation of a neighboring cell, the terminal device supports reception of a WUS based on a physical downlink control channel, PDCCH, the terminal device supports reduced-power data transmission in an idle state or an in active state, or the terminal device supports extended discontinuous reception, eDRX;
   the third capability set include at least one of the following: the terminal device supports mini-slot based uplink data transmission, the terminal device supports mini-slot based downlink data transmission, the terminal device supports grant free uplink data transmission or the terminal device supports grant free downlink data transmission, the terminal device supports downlink semi-persistent scheduling, SPS data transmission, or the terminal device supports a short physical uplink control channel, PUCCH, format 0 or a short PUCCH format 2;
   the fourth capability set include at least one of the following: the terminal device supports a two-step random access channel, RACH, transmission manner, the terminal device supports a 4-step RACH transmission manner, the terminal device supports an early data transmission, EDT, manner, or the terminal device supports a preconfigured uplink resource, PUR transmission manner;
   the fifth capability set includes at least one of the following: the terminal device supports a data transmission manner of receiving a plurality of transmission and reception points based on a single physical downlink control channel, PDCCH, the terminal device supports a time domain resource corresponding to the PDCCH to be greater than three orthogonal frequency division multiplexing, OFDM, symbols, the terminal device supports repeated transmission of a physical uplink shared channel, PUSCH or the terminal device supports repeated transmission of a PDSCH, the terminal device supports transmission of a PDCCH with a high aggregation level, AL, or the terminal device supports a modulation coding scheme cell radio network temporary identifier, MCS-C-RNTI, table corresponding to a block error ratio, BLER of 1e-5.

6. An information receiving method, comprising:
   receiving, by a network device, first information from a terminal device, wherein the first information indicates that the terminal device is a first-type terminal device, wherein the first-type terminal device is a reduced-capability (REDCAP) terminal device, a capability parameter corresponding to the first-type terminal device including a first capability set, the first capability set including a channel bandwidth supported by the terminal device and a quantity of transmit antennas of the terminal device and a quantity of receive antennas of the terminal device, the channel bandwidth of the terminal device is less than 100 megahertz, and the quantity of transmit antennas of the terminal device is less than 4, the quantity of receive antennas of the terminal device is less than 4, and the first information is carried in a preamble, a message 3, Msg3, or a message A, MsgA;

receiving, by the network device, second information from the terminal device, wherein the second information indicates that the capability parameter corresponding to the first-type terminal device further includes at least one of a second capability set, a third capability set, a fourth capability set, a fifth capability set, and the second information is sent in a connected state, wherein the second capability set is used to represent a power saving capability of the terminal device, the third capability set is used to represent a short-latency processing capability of the terminal device; the fourth capability set is used to represent a small data transmission capability of the terminal device, the fifth capability set is used to represent a transmission reliability capability of the terminal device.

7. The method according to claim 6, wherein the channel bandwidth of the terminal device is 20 megahertz (MHz), the quantity of transmit antennas of the terminal device is 1 or 2; and the quantity of receive antennas of the terminal device is 1 or 2.

8. The method according to claim 6, wherein the receiving the first information includes receiving the first information in an initial access phase.

9. The method according to claim 6, wherein
the second capability set includes at least one of the following: a maximum quantity of pieces of downlink control information, DCI, with different DCI sizes that is supported by the terminal device, the terminal device supports cross slot scheduling, the terminal device supports reception of a wakeup signal, WUS, the terminal device supports radio resource management, RRM, measurement relaxation of a neighboring cell, the terminal device supports reception of a WUS based on a physical downlink control channel, PDCCH, the terminal device supports reduced-power data transmission in an idle state or an in active state, or the terminal device supports extended discontinuous reception, eDRX;
the third capability set include at least one of the following: the terminal device supports mini-slot based uplink data transmission, the terminal device supports mini-slot based downlink data transmission, the terminal device supports grant free uplink data transmission or the terminal device supports grant free downlink data transmission, the terminal device supports downlink semi-persistent scheduling, SPS data transmission, or the terminal device supports a short physical uplink control channel, PUCCH, format 0 or a short PUCCH format 2;
the fourth capability set include at least one of the following: the terminal device supports a two-step random access channel, RACH, transmission manner, the terminal device supports a 4-step RACH transmission manner, the terminal device supports an early data transmission, EDT, manner, or the terminal device supports a preconfigured uplink resource, PUR transmission manner;
the fifth capability set includes at least one of the following: the terminal device supports a data transmission manner of receiving a plurality of transmission and reception points based on a single physical downlink control channel, PDCCH, the terminal device supports a time domain resource corresponding to the PDCCH to be greater than three orthogonal frequency division multiplexing, OFDM, symbols, the terminal device supports repeated transmission of a physical uplink shared channel, PUSCH or the terminal device supports repeated transmission of a PDSCH, the terminal device supports transmission of a PDCCH with a high aggregation level, AL, or the terminal device supports a modulation coding scheme cell radio network temporary identifier, MCS-C-RNTI, table corresponding to a block error ratio, BLER of 1e-5.

10. A communications apparatus, comprising:
a communications interface for communicating with a network device;
a non-transitory computer-readable storage medium storing a program including instructions;
one or more processors connected to the memory, wherein the one or more processors are configured to execute the instructions to:
send first information to a network device via the communications interface, wherein the first information indicates a reduced-capability, a capability parameter corresponding to the reduced capability including a first capability set, the first capability set including a channel bandwidth supported by the communication interface, a quantity of transmit antennas of the communication interface and a quantity of receive antennas of the communication, the channel bandwidth is less than 100 megahertz, and the quantity of transmit antennas is less than 4, the quantity of receive antennas of the terminal device is less than 4, and the first information is carried in a preamble, a message 3, Msg3, or a message A, MsgA;
send second information to the network device, wherein the second information indicates that the capability parameter corresponding to the reduced capability, wherein the second information further includes at least one of a second capability set, a third capability set, a fourth capability set, a fifth capability set, and the second information is sent in a connected state, wherein the second capability set is used to represent a power saving capability of the terminal device, the third capability set is used to represent a short-latency processing capability of the terminal device; the fourth capability set is used to represent a small data transmission capability of the terminal device, the fifth capability set is used to represent a transmission reliability capability of the terminal device.

11. The communications apparatus according to claim 10, wherein
the channel bandwidth supported by the communication interface is 20 megahertz (MHz), the quantity of transmit antennas of the communication interface is 1 or 2; and the quantity of receive antennas of the communication interface is 1 or 2.

12. The communications apparatus according to claim 10, wherein the processor sends the first information in an initial access phase via the communication interface.

13. The communications apparatus according to claim 12, wherein processor sends, via the communication interface, the first information in a preamble, a message 3 (Msg3), or a message A (MsgA).

14. The communications apparatus according to claim 10, wherein
the second capability set includes at least one of the following: a maximum quantity of pieces of downlink control information, DCI, with different DCI sizes that is supported by the terminal device, the terminal device supports cross slot scheduling, the terminal device supports reception of a wakeup signal, WUS, the terminal device supports radio resource management, RRM, measurement relaxation of a neighboring cell, the terminal device supports reception of a WUS based on a physical downlink control channel, PDCCH, the terminal device supports reduced-power data transmission in an idle state or an in active state, or the terminal device supports extended discontinuous reception, eDRX;
the third capability set include at least one of the following: the terminal device supports mini-slot based uplink data transmission, the terminal device supports mini-slot based downlink data transmission, the terminal device supports grant free uplink data transmission or the terminal device supports grant free downlink data transmission, the terminal device supports downlink semi-persistent scheduling, SPS data transmission, or the terminal device supports a short physical uplink control channel, PUCCH, format 0 or a short PUCCH format 2;
the fourth capability set include at least one of the following: the terminal device supports a two-step random access channel, RACH, transmission manner, the terminal device supports a 4-step RACH transmission manner, the terminal device supports an early data transmission, EDT, manner, or the terminal device supports a preconfigured uplink resource, PUR transmission manner;
the fifth capability set includes at least one of the following: the terminal device supports a data transmission manner of receiving a plurality of transmission and reception points based on a single physical downlink control channel, PDCCH, the terminal device supports a time domain resource corresponding to the PDCCH to be greater than three orthogonal frequency division multiplexing, OFDM, symbols, the terminal device supports repeated transmission of a physical uplink shared channel, PUSCH or the terminal device supports repeated transmission of a PDSCH, the terminal device supports transmission of a PDCCH with a high aggregation level, AL, or the terminal device supports a modulation coding scheme cell radio network temporary identifier, MCS-C-RNTI, table corresponding to a block error ratio, BLER of 1e-5.

15. A communications apparatus, comprising:
a communications interface for communicating with a terminal device;
a non-transitory computer-readable storage medium storing a program including instructions; and
one or more processors connected to the memory, wherein the one or more processors are configured to execute the instructions to:
receive, via the communication interface, first information from the terminal device, wherein the first information indicates that the terminal device is a first-type terminal device, wherein the first-type terminal device is a reduced-capability (REDCAP) terminal device, a capability parameter corresponding to the first-type terminal device including a first capability set, the first capability set including a channel bandwidth supported by the terminal device, a quantity of transmit antennas of the terminal device, and a quantity of receive antennas of the terminal device, the channel bandwidth of the terminal device is less than 100 megahertz, and the quantity of transmit antennas of the terminal device is less than 4, the quantity of receive antennas of the terminal device is less than 4, and the first information is carried in a preamble, a message 3, Msg3, or a message A, MsgA;
receive second information from the terminal device, wherein the second information indicates that the capability parameter corresponding to the first-type terminal device, wherein the second information further includes at least one of a second capability set, a third capability set, a fourth capability set, a fifth capability set, and the second information is sent in a connected state, wherein the second capability set is used to represent a power saving capability of the terminal device, the third capability set is used to represent a short-latency processing capability of the terminal device; the fourth capability set is used to represent a small data transmission capability of the terminal device, the fifth capability set is used to represent a transmission reliability capability of the terminal device.

16. The communications apparatus according to claim 15, wherein
the channel bandwidth of the terminal device is 20 (MHz), the quantity of transmit antennas of the terminal device is 1 or 2; and the quantity of receive antennas of the terminal device is 1 or 2.

17. The communications apparatus according to claim 15, wherein
the one or more processors receives the first information in an initial access phase via the communication interface.

18. The communications apparatus according to claim 15, wherein
the second capability set includes at least one of the following: a maximum quantity of pieces of downlink control information, DCI, with different DCI sizes that is supported by the terminal device, the terminal device supports cross slot scheduling, the terminal device supports reception of a wakeup signal, WUS, the terminal device supports radio resource management, RRM, measurement relaxation of a neighboring cell, the terminal device supports reception of a WUS based on a physical downlink control channel, PDCCH, the terminal device supports reduced-power data transmission in an idle state or an in active state, or the terminal device supports extended discontinuous reception, eDRX;
the third capability set include at least one of the following: the terminal device supports mini-slot based uplink data transmission, the terminal device supports mini-slot based downlink data transmission, the terminal device supports grant free uplink data transmission or the terminal device supports grant free downlink data transmission, the terminal device supports downlink semi-persistent scheduling, SPS data transmission, or the terminal device supports a short physical uplink control channel, PUCCH, format 0 or a short PUCCH format 2;

the fourth capability set include at least one of the following: the terminal device supports a two-step random access channel, RACH, transmission manner, the terminal device supports a 4-step RACH transmission manner, the terminal device supports an early data transmission, EDT, manner, or the terminal device supports a preconfigured uplink resource, PUR transmission manner;

the fifth capability set includes at least one of the following: the terminal device supports a data transmission manner of receiving a plurality of transmission and reception points based on a single physical downlink control channel, PDCCH, the terminal device supports a time domain resource corresponding to the PDCCH to be greater than three orthogonal frequency division multiplexing, OFDM, symbols, the terminal device supports repeated transmission of a physical uplink shared channel, PUSCH or the terminal device supports repeated transmission of a PDSCH, the terminal device supports transmission of a PDCCH with a high aggregation level, AL, or the terminal device supports a modulation coding scheme cell radio network temporary identifier, MCS-C-RNTI, table corresponding to a block error ratio, BLER of 1e-5.

* * * * *